US012688437B2

(12) United States Patent
Drees et al.

(10) Patent No.: US 12,688,437 B2

(45) Date of Patent: Jul. 21, 2026

---

(54) BUILDING SYSTEM WITH PERFORMANCE IDENTIFICATION THROUGH EQUIPMENT EXERCISING AND ENTITY RELATIONSHIPS

(71) Applicant: Johnson Controls Technology Company, Auburn Hills, WI (US)

(72) Inventors: Kirk H. Drees, Cedarburg, WI (US); Donald R. Albinger, New Berlin, WI (US); Shawn D. Schubert, Oak Creek, WI (US); Karl F. Reichenberger, Mequon, WI (US); Daniel M. Curtis, Franklin, WI (US); Andrew J. Boettcher, Wauwatosa, WI (US); Jason T. Sawyer, Glendale, WI (US); Miguel Galvez, Milwaukee, WI (US); Walter Martin, Ballymena (GB); Ryan A. Piaskowski, Milwaukee, WI (US); Vaidhyanathan Venkiteswaran, Brookfield, WI (US); Clay G. Nesler, Milwaukee, WI (US); Siddharth Goyal, Milwaukee, WI (US); Thomas M. Seneczko, Milwaukee, WI (US); Young M. Lee, Old Westbury, NY (US); Sudhi R Sinha, Milwaukee, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 983 days.

(21) Appl. No.: 16/685,834

(22) Filed: Nov. 15, 2019

(65) Prior Publication Data

US 2020/0162280 A1 May 21, 2020

Related U.S. Application Data

(60) Provisional application No. 62/769,447, filed on Nov. 19, 2018.

(51) Int. Cl.
| | | |
|---|---|---|
| *G06N 5/02* | (2023.01) | |
| *G06N 3/04* | (2023.01) | |

(Continued)

(52) U.S. Cl.
CPC ........... *G06N 5/022* (2013.01); *G06N 3/0442* (2023.01); *G06N 5/04* (2013.01); *G06N 20/10* (2019.01);

(Continued)

(58) Field of Classification Search
CPC .... G05B 13/0265; G05B 15/02; G06N 5/022; G06N 5/04; G06N 20/10; G06N 3/0454;

(Continued)

(56) References Cited

U.S. PATENT DOCUMENTS

| | | | |
|---|---|---|---|
| 5,301,109 A | 4/1994 | Landauer et al. | |
| 5,446,677 A | 8/1995 | Jensen et al. | |

(Continued)

FOREIGN PATENT DOCUMENTS

| | | |
|---|---|---|
| CN | 101415011 A | 4/2009 |
| CN | 102136099 A | 7/2011 |

(Continued)

OTHER PUBLICATIONS

Hendro Wicaksono et al., Knowledge-based Intelligent Energy Management Using Building Automation Systems, Intelligent Systems and Production Engineering/Process and Data Management in Engineering, FZI Research Center for Information Technologies, Karlsruhe, Germany, IPEC 2010, 1140-1145 (Year: 2010).*

(Continued)

*Primary Examiner* — Van C Mang

(74) *Attorney, Agent, or Firm* — Foley & Lardner LLP

(57) ABSTRACT

A building system of a building including one or more memory devices configured to store one or more instructions that, when executed on one or more processors, cause the (Continued)

1300

1302 — Perform a virtual data walkthrough of a building to collect building data 1304 — Find and identify subsystems of the building based on the collected building data 1306 — Exercise the identified subsystems and collect subsystem data 1308 — Identify faulty subsystems based on the collected subsystem data 1310 — Identify faulty equipment associated with the faulty subsystems based on equipment data one or more processors to exercise a building entity causing building entity data to be generated associated with the building entity, the building entity data indicating a result of exercising the building entity and collect the building entity data. The instructions cause the one or more processors to identify, based on a relational model, one or more relationships between one or more building entities and the building entity, wherein the one or more relationships indicate that exercising the building entity affects operation of the one or more building entities and identify that the building is experiencing a performance issue by analyzing the building entity data and the one or more relationships.

20 Claims, 28 Drawing Sheets

(51) Int. Cl.

| | |
|---|---|
| *G06N 3/0442* | (2023.01) |
| *G06N 5/022* | (2023.01) |
| *G06N 5/04* | (2023.01) |
| *G06N 20/10* | (2019.01) |
| *G16Y 10/80* | (2020.01) |
| *H04L 12/28* | (2006.01) |
| *H04L 41/0631* | (2022.01) |
| *H04L 43/08* | (2022.01) |
| *H04L 67/12* | (2022.01) |
| *H04L 67/125* | (2022.01) |

(52) U.S. Cl.
CPC .......... *G16Y 10/80* (2020.01); *H04L 12/2803* (2013.01); *H04L 12/2821* (2013.01); *H04L 12/2827* (2013.01); *H04L 41/0645* (2013.01); *H04L 43/08* (2013.01); *H04L 67/12* (2013.01); *H04L 67/125* (2013.01)

(58) Field of Classification Search
CPC ...... G06N 3/0472; G06N 3/088; G06N 5/003; G06N 7/005; G06N 3/0445; G06N 3/044; G06N 3/045; G06N 3/047; G06N 5/01; G06N 7/01; G16Y 10/80; H04L 12/2803; H04L 12/2821; H04L 12/2827; H04L 41/0645; H04L 67/12; H04L 41/046; H04L 41/142; H04L 41/145; H04L 43/0876; H04L 41/16; H04L 43/08; H04L 41/0695; H04L 43/065; H04L 67/125; H04L 1/2821
See application file for complete search history.

(56) References Cited

U.S. PATENT DOCUMENTS

| | | | |
|---|---|---|---|
| 5,581,478 | A | 12/1996 | Cruse et al. |
| 5,812,394 | A | 9/1998 | Lewis et al. |
| 5,812,962 | A | 9/1998 | Kovac |
| 5,960,381 | A | 9/1999 | Singers et al. |
| 5,973,662 | A | 10/1999 | Singers et al. |
| 6,014,612 | A | 1/2000 | Larson et al. |
| 6,031,547 | A | 2/2000 | Kennedy |
| 6,134,511 | A | 10/2000 | Subbarao |
| 6,157,943 | A | 12/2000 | Meyer |
| 6,285,966 | B1 | 9/2001 | Brown et al. |
| 6,363,422 | B1 | 3/2002 | Hunter et al. |
| 6,385,510 | B1 | 5/2002 | Hoog et al. |
| 6,389,331 | B1 | 5/2002 | Jensen et al. |
| 6,401,027 | B1 | 6/2002 | Xu et al. |
| 6,437,691 | B1 | 8/2002 | Sandelman et al. |
| 6,477,518 | B1 | 11/2002 | Li et al. |
| 6,487,457 | B1 | 11/2002 | Hull et al. |
| 6,493,755 | B1 | 12/2002 | Hansen et al. |
| 6,577,323 | B1 | 6/2003 | Jamieson et al. |
| 6,626,366 | B2 | 9/2003 | Kayahara et al. |
| 6,646,660 | B1 | 11/2003 | Patty |
| 6,704,016 | B1 | 3/2004 | Oliver et al. |
| 6,732,540 | B2 | 5/2004 | Sugihara et al. |
| 6,764,019 | B1 | 7/2004 | Kayahara et al. |
| 6,782,385 | B2 | 8/2004 | Natsumeda et al. |
| 6,813,532 | B2 | 11/2004 | Eryurek et al. |
| 6,816,811 | B2 | 11/2004 | Seem |
| 6,823,680 | B2 | 11/2004 | Jayanth |
| 6,826,454 | B2 | 11/2004 | Sulfstede |
| 6,865,511 | B2 | 3/2005 | Frerichs et al. |
| 6,925,338 | B2 | 8/2005 | Eryurek et al. |
| 6,986,138 | B1 | 1/2006 | Sakaguchi et al. |
| 7,031,880 | B1 | 4/2006 | Seem et al. |
| 7,401,057 | B2 | 7/2008 | Eder |
| 7,552,467 | B2 | 6/2009 | Lindsay |
| 7,627,544 | B2 | 12/2009 | Chkodrov et al. |
| 7,818,249 | B2 | 10/2010 | Lovejoy et al. |
| 7,889,051 | B1 | 2/2011 | Billig et al. |
| 7,996,488 | B1 | 8/2011 | Casabella et al. |
| 8,078,330 | B2 | 12/2011 | Brickfield et al. |
| 8,104,044 | B1 | 1/2012 | Scofield et al. |
| 8,229,470 | B1 | 7/2012 | Ranjan et al. |
| 8,332,782 | B1 | 12/2012 | Chang et al. |
| 8,401,991 | B2 | 3/2013 | Wu et al. |
| 8,495,745 | B1 | 7/2013 | Schrecker et al. |
| 8,516,016 | B2 | 8/2013 | Park et al. |
| 8,532,808 | B2 | 9/2013 | Drees et al. |
| 8,532,839 | B2 | 9/2013 | Drees et al. |
| 8,600,556 | B2 | 12/2013 | Nesler et al. |
| 8,635,182 | B2 | 1/2014 | Mackay |
| 8,682,921 | B2 | 3/2014 | Park et al. |
| 8,731,724 | B2 | 5/2014 | Drees et al. |
| 8,737,334 | B2 | 5/2014 | Ahn et al. |
| 8,738,334 | B2 | 5/2014 | Jiang et al. |
| 8,751,487 | B2 | 6/2014 | Byrne et al. |
| 8,788,097 | B2 | 7/2014 | Drees et al. |
| 8,805,995 | B1 | 8/2014 | Oliver |
| 8,843,238 | B2 | 9/2014 | Wenzel et al. |
| 8,874,071 | B2 | 10/2014 | Sherman et al. |
| 8,941,465 | B2 | 1/2015 | Pineau et al. |
| 8,990,127 | B2 | 3/2015 | Taylor |
| 9,070,113 | B2 | 6/2015 | Shafiee et al. |
| 9,116,978 | B2 | 8/2015 | Park et al. |
| 9,185,095 | B1 | 11/2015 | Moritz et al. |
| 9,189,527 | B2 | 11/2015 | Park et al. |
| 9,196,009 | B2 | 11/2015 | Drees et al. |
| 9,229,966 | B2 | 1/2016 | Aymeloglu et al. |
| 9,286,582 | B2 | 3/2016 | Drees et al. |
| 9,311,807 | B2 | 4/2016 | Schultz et al. |
| 9,344,751 | B1 | 5/2016 | Ream et al. |
| 9,354,968 | B2 | 5/2016 | Wenzel et al. |
| 9,507,686 | B2 | 11/2016 | Horn et al. |
| 9,524,594 | B2 | 12/2016 | Ouyang et al. |
| 9,558,196 | B2 | 1/2017 | Johnston et al. |
| 9,652,813 | B2 | 5/2017 | Gifford et al. |
| 9,753,455 | B2 | 9/2017 | Drees |
| 9,811,249 | B2 | 11/2017 | Chen et al. |
| 9,813,880 | B2 | 11/2017 | Jactat |
| 9,838,844 | B2 | 12/2017 | Emeis et al. |
| 9,886,478 | B2 | 2/2018 | Mukherjee |
| 9,948,359 | B2 | 4/2018 | Horton |
| 10,055,114 | B2 | 8/2018 | Shah et al. |
| 10,055,206 | B2 | 8/2018 | Park et al. |
| 10,116,461 | B2 | 10/2018 | Fairweather et al. |
| 10,169,454 | B2 | 1/2019 | Ait-Mokhtar et al. |
| 10,169,486 | B2 | 1/2019 | Park et al. |
| 10,171,586 | B2 | 1/2019 | Shaashua et al. |
| 10,187,258 | B2 | 1/2019 | Nagesh et al. |
| 10,425,244 | B2 | 9/2019 | Rao |
| 10,514,963 | B2 | 12/2019 | Shrivastava et al. |
| 10,515,098 | B2 | 12/2019 | Park et al. |
| 10,534,326 | B2 | 1/2020 | Sridharan et al. |
| 10,536,295 | B2 | 1/2020 | Fairweather et al. |
| 10,705,492 | B2 | 7/2020 | Harvey |
| 10,708,078 | B2 | 7/2020 | Harvey |
| 10,845,771 | B2 | 11/2020 | Harvey |
| 10,854,194 | B2 | 12/2020 | Park et al. |

(56)　　　　　　References Cited

U.S. PATENT DOCUMENTS

| 10,862,928 B1 | 12/2020 | Badawy et al. |
|---|---|---|
| 10,921,760 B2 | 2/2021 | Harvey |
| 10,921,972 B2 | 2/2021 | Park et al. |
| 10,969,133 B2 | 4/2021 | Harvey |
| 10,976,068 B2 | 4/2021 | Hallendy et al. |
| 10,986,121 B2 | 4/2021 | Stockdale et al. |
| 11,016,998 B2 | 5/2021 | Park et al. |
| 11,024,292 B2 | 6/2021 | Park et al. |
| 11,038,709 B2 | 6/2021 | Park et al. |
| 11,070,390 B2 | 7/2021 | Park et al. |
| 11,073,976 B2 | 7/2021 | Park et al. |
| 11,108,587 B2 | 8/2021 | Park et al. |
| 11,113,295 B2 | 9/2021 | Park et al. |
| 11,229,138 B1 | 1/2022 | Harvey et al. |
| 11,314,726 B2 | 4/2022 | Park et al. |
| 11,314,788 B2 | 4/2022 | Park et al. |
| 11,451,043 B1 | 9/2022 | Olander et al. |
| 2002/0010562 A1 | 1/2002 | Schleiss et al. |
| 2002/0016639 A1 | 2/2002 | Smith et al. |
| 2002/0059229 A1 | 5/2002 | Natsumeda et al. |
| 2002/0123864 A1 | 9/2002 | Eryurek et al. |
| 2002/0147506 A1 | 10/2002 | Eryurek et al. |
| 2002/0177909 A1 | 11/2002 | Fu et al. |
| 2003/0005486 A1 | 1/2003 | Ridolfo et al. |
| 2003/0014130 A1 | 1/2003 | Grumelart |
| 2003/0073432 A1 | 4/2003 | Meade, II |
| 2003/0158704 A1 | 8/2003 | Triginai et al. |
| 2003/0171851 A1 | 9/2003 | Brickfield et al. |
| 2003/0200059 A1 | 10/2003 | Ignatowski et al. |
| 2004/0068390 A1 | 4/2004 | Saunders |
| 2004/0128314 A1 | 7/2004 | Katibah et al. |
| 2004/0133314 A1 | 7/2004 | Ehlers et al. |
| 2004/0199360 A1 | 10/2004 | Friman et al. |
| 2005/0055308 A1 | 3/2005 | Meyer et al. |
| 2005/0108262 A1 | 5/2005 | Fawcett et al. |
| 2005/0154494 A1 | 7/2005 | Ahmed |
| 2005/0278703 A1 | 12/2005 | Lo et al. |
| 2005/0283337 A1 | 12/2005 | Sayal |
| 2006/0047455 A1* | 3/2006 | Catelani .............. G01D 18/006 |
| | | 702/85 |
| 2006/0052884 A1 | 3/2006 | Staples et al. |
| 2006/0095521 A1 | 5/2006 | Patinkin |
| 2006/0140207 A1 | 6/2006 | Eschbach et al. |
| 2006/0184479 A1 | 8/2006 | Levine |
| 2006/0200476 A1 | 9/2006 | Gottumukkala et al. |
| 2006/0265751 A1 | 11/2006 | Cosquer et al. |
| 2006/0271589 A1 | 11/2006 | Horowitz et al. |
| 2007/0028179 A1 | 2/2007 | Levin et al. |
| 2007/0055757 A1 | 3/2007 | Mairs et al. |
| 2007/0156677 A1 | 7/2007 | Szabo |
| 2007/0203693 A1 | 8/2007 | Estes |
| 2007/0261062 A1 | 11/2007 | Bansal et al. |
| 2007/0273497 A1 | 11/2007 | Kuroda et al. |
| 2007/0273610 A1 | 11/2007 | Baillot |
| 2008/0034425 A1 | 2/2008 | Overcash et al. |
| 2008/0094230 A1 | 4/2008 | Mock et al. |
| 2008/0097816 A1 | 4/2008 | Freire et al. |
| 2008/0154530 A1* | 6/2008 | Murray ............. G01R 31/3167 |
| | | 702/182 |
| 2008/0168375 A1 | 7/2008 | Papadimitriou et al. |
| 2008/0186160 A1 | 8/2008 | Kim et al. |
| 2008/0249756 A1 | 10/2008 | Chaisuparasmikul |
| 2008/0252723 A1 | 10/2008 | Park |
| 2008/0281472 A1 | 11/2008 | Podgorny et al. |
| 2009/0195349 A1 | 8/2009 | Frader-Thompson et al. |
| 2009/0307255 A1 | 12/2009 | Park |
| 2010/0045439 A1 | 2/2010 | Tak et al. |
| 2010/0058248 A1 | 3/2010 | Park |
| 2010/0131533 A1 | 5/2010 | Ortiz |
| 2010/0251129 A1 | 9/2010 | Beringer et al. |
| 2010/0262616 A1 | 10/2010 | Eskolin et al. |
| 2010/0274366 A1 | 10/2010 | Fata et al. |
| 2010/0281387 A1 | 11/2010 | Holland et al. |
| 2010/0286937 A1 | 11/2010 | Hedley et al. |
| 2010/0324962 A1 | 12/2010 | Nesler et al. |
| 2011/0008000 A1 | 1/2011 | Tokushima |
| 2011/0015802 A1 | 1/2011 | Imes |
| 2011/0047418 A1 | 2/2011 | Drees et al. |
| 2011/0061015 A1 | 3/2011 | Drees et al. |
| 2011/0071685 A1 | 3/2011 | Huneycutt et al. |
| 2011/0077779 A1 | 3/2011 | Fuller et al. |
| 2011/0077950 A1 | 3/2011 | Hughston |
| 2011/0087650 A1 | 4/2011 | Mackay et al. |
| 2011/0087988 A1 | 4/2011 | Ray et al. |
| 2011/0088000 A1 | 4/2011 | Mackay |
| 2011/0125737 A1 | 5/2011 | Pothering et al. |
| 2011/0137853 A1 | 6/2011 | Mackay |
| 2011/0153603 A1 | 6/2011 | Adiba et al. |
| 2011/0154363 A1 | 6/2011 | Karmarkar |
| 2011/0157357 A1 | 6/2011 | Weisensale et al. |
| 2011/0178977 A1 | 7/2011 | Drees |
| 2011/0190951 A1 | 8/2011 | Lee |
| 2011/0191343 A1 | 8/2011 | Heaton et al. |
| 2011/0205022 A1 | 8/2011 | Cavallaro et al. |
| 2011/0218777 A1 | 9/2011 | Chen et al. |
| 2012/0011126 A1 | 1/2012 | Park et al. |
| 2012/0011141 A1 | 1/2012 | Park et al. |
| 2012/0022698 A1 | 1/2012 | Mackay |
| 2012/0062577 A1 | 3/2012 | Nixon |
| 2012/0064923 A1 | 3/2012 | Imes et al. |
| 2012/0083930 A1 | 4/2012 | Ilic et al. |
| 2012/0100825 A1 | 4/2012 | Sherman et al. |
| 2012/0101637 A1 | 4/2012 | Imes et al. |
| 2012/0124452 A1 | 5/2012 | Parmet et al. |
| 2012/0135759 A1 | 5/2012 | Imes et al. |
| 2012/0136485 A1 | 5/2012 | Weber et al. |
| 2012/0158633 A1 | 6/2012 | Eder |
| 2012/0259583 A1 | 10/2012 | Noboa et al. |
| 2012/0272228 A1 | 10/2012 | Marndi et al. |
| 2012/0278051 A1 | 11/2012 | Jiang et al. |
| 2013/0007063 A1 | 1/2013 | Kalra et al. |
| 2013/0038430 A1 | 2/2013 | Blower et al. |
| 2013/0038707 A1 | 2/2013 | Cunningham et al. |
| 2013/0060820 A1 | 3/2013 | Bulusu et al. |
| 2013/0086497 A1 | 4/2013 | Ambuhl et al. |
| 2013/0097706 A1 | 4/2013 | Titonis et al. |
| 2013/0103221 A1 | 4/2013 | Raman et al. |
| 2013/0167035 A1 | 6/2013 | Imes et al. |
| 2013/0170710 A1 | 7/2013 | Kuoch et al. |
| 2013/0204836 A1 | 8/2013 | Choi et al. |
| 2013/0212129 A1 | 8/2013 | Lawson et al. |
| 2013/0246916 A1 | 9/2013 | Reimann et al. |
| 2013/0247205 A1 | 9/2013 | Schrecker et al. |
| 2013/0262035 A1 | 10/2013 | Mills |
| 2013/0275174 A1 | 10/2013 | Bennett et al. |
| 2013/0275908 A1 | 10/2013 | Reichard |
| 2013/0297050 A1 | 11/2013 | Reichard et al. |
| 2013/0298244 A1 | 11/2013 | Kumar et al. |
| 2013/0331995 A1 | 12/2013 | Rosen |
| 2013/0346943 A1 | 12/2013 | Bharatia |
| 2014/0032506 A1 | 1/2014 | Hoey et al. |
| 2014/0059483 A1 | 2/2014 | Mairs et al. |
| 2014/0078151 A1 | 3/2014 | Garr et al. |
| 2014/0081652 A1 | 3/2014 | Klindworth |
| 2014/0108837 A1* | 4/2014 | Muller .................. G06F 1/3275 |
| | | 713/320 |
| 2014/0135952 A1 | 5/2014 | Maehara |
| 2014/0152651 A1 | 6/2014 | Chen et al. |
| 2014/0172184 A1 | 6/2014 | Schmidt et al. |
| 2014/0188862 A1 | 7/2014 | Campbell et al. |
| 2014/0189439 A1 | 7/2014 | Herrero Abellanas et al. |
| 2014/0189861 A1 | 7/2014 | Gupta et al. |
| 2014/0207282 A1 | 7/2014 | Angle et al. |
| 2014/0245071 A1* | 8/2014 | Drees ................ H02J 13/00004 |
| | | 714/39 |
| 2014/0258052 A1 | 9/2014 | Khuti et al. |
| 2014/0269614 A1 | 9/2014 | Maguire et al. |
| 2014/0277765 A1 | 9/2014 | Karimi et al. |
| 2014/0278461 A1 | 9/2014 | Artz |
| 2014/0325292 A1 | 10/2014 | Spivey et al. |
| 2014/0327555 A1 | 11/2014 | Sager et al. |
| 2015/0019174 A1 | 1/2015 | Kiff et al. |
| 2015/0019710 A1 | 1/2015 | Shaashua et al. |
| 2015/0042240 A1 | 2/2015 | Aggarwal et al. |

(56)  References Cited

U.S. PATENT DOCUMENTS

| | | |
|---|---|---|
| 2015/0105917 A1 | 4/2015 | Sasaki et al. |
| 2015/0145468 A1 | 5/2015 | Ma et al. |
| 2015/0156031 A1 | 6/2015 | Fadell et al. |
| 2015/0168931 A1 | 6/2015 | Jin |
| 2015/0172300 A1 | 6/2015 | Cochenour |
| 2015/0178421 A1 | 6/2015 | Borrelli et al. |
| 2015/0185261 A1 | 7/2015 | Frader-Thompson et al. |
| 2015/0186777 A1 | 7/2015 | Lecue et al. |
| 2015/0202962 A1 | 7/2015 | Habashima et al. |
| 2015/0204563 A1 | 7/2015 | Imes et al. |
| 2015/0212714 A1 | 7/2015 | Hua et al. |
| 2015/0235267 A1 | 8/2015 | Steube et al. |
| 2015/0241895 A1 | 8/2015 | Lu et al. |
| 2015/0244730 A1 | 8/2015 | Vu et al. |
| 2015/0244732 A1 | 8/2015 | Golshan et al. |
| 2015/0261863 A1 | 9/2015 | Dey et al. |
| 2015/0263900 A1 | 9/2015 | Polyakov et al. |
| 2015/0286969 A1 | 10/2015 | Warner et al. |
| 2015/0295796 A1 | 10/2015 | Hsiao et al. |
| 2015/0304193 A1 | 10/2015 | Ishii et al. |
| 2015/0316918 A1 | 11/2015 | Schleiss et al. |
| 2015/0324422 A1 | 11/2015 | Elder |
| 2015/0331895 A1 | 11/2015 | Zhang et al. |
| 2015/0341212 A1 | 11/2015 | Hsiao et al. |
| 2015/0348417 A1 | 12/2015 | Ignaczak et al. |
| 2015/0379080 A1 | 12/2015 | Jochimski |
| 2016/0011753 A1 | 1/2016 | McFarland et al. |
| 2016/0033946 A1 | 2/2016 | Zhu et al. |
| 2016/0035246 A1 | 2/2016 | Curtis |
| 2016/0065601 A1 | 3/2016 | Gong et al. |
| 2016/0070736 A1 | 3/2016 | Swan et al. |
| 2016/0078229 A1 | 3/2016 | Gong et al. |
| 2016/0090839 A1 | 3/2016 | Stolarczyk |
| 2016/0119434 A1 | 4/2016 | Dong et al. |
| 2016/0127712 A1 | 5/2016 | Alfredsson et al. |
| 2016/0139752 A1 | 5/2016 | Shim et al. |
| 2016/0154547 A1 | 6/2016 | Tokuoka et al. |
| 2016/0163186 A1 | 6/2016 | Davidson et al. |
| 2016/0170390 A1 | 6/2016 | Xie et al. |
| 2016/0171862 A1 | 6/2016 | Das et al. |
| 2016/0173816 A1 | 6/2016 | Huenerfauth et al. |
| 2016/0179315 A1 | 6/2016 | Sarao et al. |
| 2016/0179342 A1 | 6/2016 | Sarao et al. |
| 2016/0179990 A1 | 6/2016 | Sarao et al. |
| 2016/0195856 A1 | 7/2016 | Spero |
| 2016/0203036 A1* | 7/2016 | Mezic ................. G06F 11/0751 |
| | | 714/819 |
| 2016/0212165 A1 | 7/2016 | Singla et al. |
| 2016/0239660 A1 | 8/2016 | Azvine et al. |
| 2016/0239756 A1 | 8/2016 | Aggour et al. |
| 2016/0313751 A1 | 10/2016 | Risbeck et al. |
| 2016/0313752 A1 | 10/2016 | Przybylski |
| 2016/0313902 A1 | 10/2016 | Hill et al. |
| 2016/0342152 A1 | 11/2016 | Bliss et al. |
| 2016/0350364 A1 | 12/2016 | Anicic et al. |
| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0370258 A1 | 12/2016 | Perez |
| 2016/0378306 A1 | 12/2016 | Kresl et al. |
| 2016/0379326 A1 | 12/2016 | Chan-Gove et al. |
| 2017/0006135 A1 | 1/2017 | Siebel |
| 2017/0011318 A1 | 1/2017 | Vigano et al. |
| 2017/0017221 A1 | 1/2017 | Lamparter et al. |
| 2017/0039255 A1 | 2/2017 | Raj et al. |
| 2017/0052536 A1 | 2/2017 | Warner et al. |
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |
| 2017/0084168 A1 | 3/2017 | Janchookiat |
| 2017/0090437 A1 | 3/2017 | Veeramani et al. |
| 2017/0090441 A1* | 3/2017 | Schmitt .................. G05B 15/02 |
| 2017/0093700 A1 | 3/2017 | Gilley et al. |
| 2017/0098086 A1 | 4/2017 | Hoernecke et al. |
| 2017/0103327 A1 | 4/2017 | Penilla et al. |
| 2017/0103403 A1 | 4/2017 | Chu et al. |
| 2017/0111210 A1 | 4/2017 | Chakrobartty et al. |
| 2017/0123389 A1 | 5/2017 | Baez et al. |
| 2017/0123397 A1 | 5/2017 | Billi et al. |
| 2017/0134415 A1 | 5/2017 | Muddu et al. |
| 2017/0177715 A1 | 6/2017 | Chang et al. |
| 2017/0180147 A1 | 6/2017 | Brandman et al. |
| 2017/0188216 A1 | 6/2017 | Koskas et al. |
| 2017/0212482 A1 | 7/2017 | Boettcher et al. |
| 2017/0212668 A1 | 7/2017 | Shah et al. |
| 2017/0220641 A1 | 8/2017 | Chi et al. |
| 2017/0230930 A1 | 8/2017 | Frey |
| 2017/0235817 A1 | 8/2017 | Deodhar et al. |
| 2017/0251182 A1 | 8/2017 | Siminoff et al. |
| 2017/0270124 A1 | 9/2017 | Nagano et al. |
| 2017/0276571 A1* | 9/2017 | Vitullo .................. G06Q 10/06 |
| 2017/0277769 A1 | 9/2017 | Pasupathy et al. |
| 2017/0278003 A1 | 9/2017 | Liu |
| 2017/0293276 A1 | 10/2017 | Hubauer et al. |
| 2017/0294132 A1 | 10/2017 | Colmenares |
| 2017/0315522 A1 | 11/2017 | Kwon et al. |
| 2017/0315697 A1 | 11/2017 | Jacobson et al. |
| 2017/0322534 A1 | 11/2017 | Sinha et al. |
| 2017/0323389 A1 | 11/2017 | Vavrasek |
| 2017/0329289 A1 | 11/2017 | Kohn et al. |
| 2017/0336770 A1 | 11/2017 | MacMillan |
| 2017/0345287 A1 | 11/2017 | Fuller et al. |
| 2017/0351957 A1 | 12/2017 | Lecue et al. |
| 2017/0357225 A1 | 12/2017 | Asp et al. |
| 2017/0357490 A1 | 12/2017 | Park et al. |
| 2017/0357908 A1 | 12/2017 | Cabadi et al. |
| 2018/0012159 A1 | 1/2018 | Kozloski et al. |
| 2018/0013579 A1 | 1/2018 | Fairweather et al. |
| 2018/0024520 A1 | 1/2018 | Sinha et al. |
| 2018/0039238 A1 | 2/2018 | Gärtner et al. |
| 2018/0046151 A1* | 2/2018 | Ahmed .................. G06N 20/20 |
| 2018/0048485 A1 | 2/2018 | Pelton et al. |
| 2018/0069932 A1 | 3/2018 | Tiwari et al. |
| 2018/0114140 A1 | 4/2018 | Chen et al. |
| 2018/0137288 A1 | 5/2018 | Polyakov |
| 2018/0157930 A1 | 6/2018 | Rutschman et al. |
| 2018/0162400 A1 | 6/2018 | Abdar |
| 2018/0176241 A1 | 6/2018 | Manadhata et al. |
| 2018/0195749 A1 | 7/2018 | Sinha et al. |
| 2018/0198627 A1 | 7/2018 | Mullins |
| 2018/0203961 A1 | 7/2018 | Aisu et al. |
| 2018/0232422 A1 | 8/2018 | Park et al. |
| 2018/0232423 A1 | 8/2018 | Park et al. |
| 2018/0232459 A1 | 8/2018 | Park et al. |
| 2018/0239982 A1 | 8/2018 | Rutschman et al. |
| 2018/0275625 A1 | 9/2018 | Park et al. |
| 2018/0276962 A1 | 9/2018 | Butler et al. |
| 2018/0292797 A1 | 10/2018 | Lamparter et al. |
| 2018/0336785 A1 | 11/2018 | Ghannam et al. |
| 2018/0341234 A1 | 11/2018 | Piaskowski et al. |
| 2018/0359111 A1 | 12/2018 | Harvey |
| 2018/0364654 A1 | 12/2018 | Locke et al. |
| 2019/0005025 A1 | 1/2019 | Malabarba |
| 2019/0013023 A1 | 1/2019 | Pourmohammad et al. |
| 2019/0025771 A1 | 1/2019 | Park et al. |
| 2019/0025786 A1 | 1/2019 | Park et al. |
| 2019/0026359 A1 | 1/2019 | Park et al. |
| 2019/0037135 A1 | 1/2019 | Hedge |
| 2019/0042988 A1 | 2/2019 | Brown et al. |
| 2019/0088106 A1 | 3/2019 | Grundstrom |
| 2019/0094824 A1 | 3/2019 | Xie et al. |
| 2019/0095644 A1 | 3/2019 | Park et al. |
| 2019/0095830 A1 | 3/2019 | Epstein et al. |
| 2019/0096217 A1 | 3/2019 | Pourmohammad et al. |
| 2019/0097904 A1 | 3/2019 | Park et al. |
| 2019/0102840 A1 | 4/2019 | Perl et al. |
| 2019/0138512 A1 | 5/2019 | Pourmohammad et al. |
| 2019/0147883 A1 | 5/2019 | Mellenthin et al. |
| 2019/0158309 A1 | 5/2019 | Park et al. |
| 2019/0163152 A1 | 5/2019 | Worrall et al. |
| 2019/0186770 A1* | 6/2019 | Saffre .................. G06F 17/18 |
| 2019/0264942 A1* | 8/2019 | Cheng .................. F24F 11/56 |

(56) References Cited

U.S. PATENT DOCUMENTS

| | | | |
|---|---|---|---|
| 2019/0268178 A1 | 8/2019 | Fairweather et al. | |
| 2019/0287000 A1 | 9/2019 | Smith et al. | |
| 2019/0295125 A1 | 9/2019 | Marino et al. | |
| 2019/0310979 A1 | 10/2019 | Masuzaki et al. | |
| 2019/0391573 A1* | 12/2019 | Wang | G05B 23/0254 |
| 2020/0133252 A1 | 4/2020 | Zhang et al. | |
| 2020/0162354 A1 | 5/2020 | Drees et al. | |
| 2020/0182684 A1* | 6/2020 | Yoskovitz | G01R 33/02 |
| 2020/0226156 A1 | 7/2020 | Borra et al. | |
| 2020/0285203 A1 | 9/2020 | Thakur et al. | |
| 2020/0349484 A1* | 11/2020 | Serven | G06Q 10/06312 |
| 2021/0042299 A1 | 2/2021 | Migliori | |
| 2021/0381711 A1 | 12/2021 | Harvey et al. | |
| 2021/0381712 A1 | 12/2021 | Harvey et al. | |
| 2021/0382445 A1 | 12/2021 | Harvey et al. | |
| 2021/0383041 A1 | 12/2021 | Harvey et al. | |
| 2021/0383042 A1 | 12/2021 | Harvey et al. | |
| 2021/0383200 A1 | 12/2021 | Harvey et al. | |
| 2021/0383219 A1 | 12/2021 | Harvey et al. | |
| 2021/0383235 A1 | 12/2021 | Harvey et al. | |
| 2021/0383236 A1 | 12/2021 | Harvey et al. | |
| 2022/0066402 A1 | 3/2022 | Harvey et al. | |
| 2022/0066405 A1 | 3/2022 | Harvey | |
| 2022/0066432 A1 | 3/2022 | Harvey et al. | |
| 2022/0066434 A1 | 3/2022 | Harvey et al. | |
| 2022/0066528 A1 | 3/2022 | Harvey et al. | |
| 2022/0066722 A1 | 3/2022 | Harvey et al. | |
| 2022/0066754 A1 | 3/2022 | Harvey et al. | |
| 2022/0066761 A1 | 3/2022 | Harvey et al. | |
| 2022/0067226 A1 | 3/2022 | Harvey et al. | |
| 2022/0067227 A1 | 3/2022 | Harvey et al. | |
| 2022/0067230 A1 | 3/2022 | Harvey et al. | |
| 2022/0069863 A1 | 3/2022 | Harvey et al. | |
| 2022/0070293 A1 | 3/2022 | Harvey et al. | |
| 2022/0138684 A1 | 5/2022 | Harvey | |
| 2022/0215264 A1 | 7/2022 | Harvey et al. | |
| 2023/0010757 A1 | 1/2023 | Preciado | |

FOREIGN PATENT DOCUMENTS

| | | |
|---|---|---|
| CN | 102136100 A | 7/2011 |
| CN | 102650876 A | 8/2012 |
| CN | 104040583 A | 9/2014 |
| CN | 104603832 A | 5/2015 |
| CN | 104919484 A | 9/2015 |
| CN | 106204392 A | 12/2016 |
| CN | 106406806 A | 2/2017 |
| CN | 106960269 A | 7/2017 |
| CN | 107147639 A1 | 9/2017 |
| CN | 107598928 A | 1/2018 |
| DE | 102018214175 A1 * | 2/2020 |
| EP | 2 528 033 A1 | 11/2012 |
| EP | 3 324 306 A1 | 5/2018 |
| JP | H10-049552 A | 2/1998 |
| JP | 2003-162573 A | 6/2003 |
| JP | 2007-018322 A | 1/2007 |
| JP | 4073946 B1 | 4/2008 |
| JP | 2008-107930 A | 5/2008 |
| JP | 2013-152618 A | 8/2013 |
| JP | 2014-044457 A | 3/2014 |
| KR | 2016/0102923 A | 8/2016 |
| WO | WO-2009/020158 A1 | 2/2009 |
| WO | WO-2011/100255 A2 | 8/2011 |
| WO | WO-2013/050333 A1 | 4/2013 |
| WO | WO-2015/106702 A1 | 7/2015 |
| WO | WO-2015/145648 A1 | 10/2015 |
| WO | WO-2017/035536 A1 | 3/2017 |
| WO | WO-2017/036886 A1 | 3/2017 |
| WO | WO-2017/192422 A1 | 11/2017 |
| WO | WO-2017/194244 A1 | 11/2017 |
| WO | WO-2017/205330 A1 | 11/2017 |
| WO | WO-2017/213918 A1 | 12/2017 |
| WO | WO-2018049527 A1 * | 3/2018 |
| WO | WO-2019/112581 | 6/2019 |

OTHER PUBLICATIONS

Bhatt et al., Design and Development of Wired Building Automation Systems, Department of Instrumentation and Control Engineering, Faculty of Technology, Dharmsinh Desai University, Nadiad, Gujarat, India, , Energy and Buildings (2015) 396-413 ( Year: 2015).*

Frank Oldewurtel et al., Importance of occupancy information for building climate control, Automatic Control Laboratory, ETH Zurich , Switzerland, Applied Energy, (2012) 521-532 (Year: 2012).*

Frank et al., "Hybrid Model-Based and Data-Driven Fault Detection and Diagnostics for Commercial Buildings", 2016, National Renewable Energy Laboratory (Year: 2011).*

Lazarova-Molnar et al., "Fault detection and diagnosis for smart buildings: State of the art, trends and challenges", 2016, 2016 3rd MEC International Conference on Big Data and Smart City (ICBDSC), vol. 2016, pp. 1-7 (Year: 2016).*

Capozzoli et al., "Fault detection analysis using data mining techniques for a cluster of smart office buildings", 2015, Expert Systems with Applications, 2015, vol. 42 No. 9, pp. 4324-4338 (Year: 2015).*

Habib et al., "Complex building's energy system operation patterns analysis using bag of words representation with hierarchical clustering", 2016, Complex Adaptive Systems Modeling, vol. 4.1, pp. 1-20 (Year: 2016).*

Li et al., "Fault detection and diagnosis for building cooling system with a tree-structured learning method", 2016, Energy and Buildings, vol. 127, pp. 540-551 (Year: 2016).*

West et al., "Automated fault detection and diagnosis of HVAC subsystems using statistical machine learning", 2011, Building Simulation, vol. 2011, pp. 2659-2665 (Year: 2011).*

Regnier et al., "Automated Fault Diagnostics for AHU-VAV Systems: A Bayesian Network Approach", 2016, International High Performance Buildings Conference, vol. 2016, pp. 1-9 (Year: 2016).*

Dibowski et al., "Ontology-Based Fault Propagation in Building Automation Systems", 2017, Ontology-Based Fault Propagation in Building Automation Systems, vol. 18 No. 3, pp. 1-14 (Year: 2017).*

Aloraini et al., "Graphical Model Based Approach for Fault Diagnosis of Wind Turbines", 2014, 2014 13th International Conference on Machine Learning and Applications, vol. 13 (2014), pp. 614-619 (Year: 2014).*

Kordes et al., "Automatic Fault Detection using Cause and Effect Rules for In-vehicle Networks", Mar. 18, 2018, VEHITS 2018—4th International Conference on Vehicle Technology and Intelligent Transport Systems, vol. 4 (2018), pp. 537-544 (Year: 2018).*

Migulanez et al., "Fault diagnosis of a train door system based on semantic knowledge representation", 2008, 2008 4th IET International Conference on Railway Condition Monitoring, vol. 4 (2008), pp. 1-6 (Year: 2008).*

Alippi et al., "A Cognitive Fault Diagnosis System for Distributed Sensor Networks", 2013, IEEE Transactions on Neural Networks and Learning Systems, vol. 24 No. 8, pp. 1213-1226 (Year: 2013).*

Khalastchi et al., "A sensor-based approach for fault detection and diagnosis for robotic systems", 2017, Autonomous Robots, vol. 2017, pp. 1231-1248 (Year: 2017).*

Stanley et al., "A Guide to Fault Detection and Diagnosis", Nov. 11, 2018, retrieved from https://web.archive.org/web/ 20181111073737/ https://gregstanleyandassociates.com/whitepapers/FaultDiagnosis/ faultdiagnosis.htm on Dec. 19, 2024 (Year: 2018).*

Pritoni et al., "Short Paper: A Method for Discovering Functional Relationships Between Air Handling Units and Variable Air-Volume Boxes From Sensor Data", 2015, Proceedings of the 2nd ACM International Conference on Embedded Systems for Energy-Efficient Built Environments, vol. 2(2015), pp. 133-136 (Year: 2018).*

Koh et al., "Quiver: Using Control Perturbations to Increase the Observability of Sensor Data in Smart Buildings", 2016, arXiv, v1, pp. 1-11 (Year: 2016).*

(56)        References Cited

OTHER PUBLICATIONS

Fan et al., "A framework for knowledge discovery in massive building automation data and its application in building diagnostics", 2015, Automation in Construction, vol. 50, pp. 81-90 (Year: 2015).*

Wicaksono et al., "Knowledge-based intelligent energy management using building automation system", 2010, 2010 Conference Proceedings IPEC, vol. 2010, pp. 1140-1145 (Year: 2010).*

Katipamula et al., "Rooftop unit embedded diagnostics: Automated fault detection and diagnostics (AFDD) development, field testing and validation", 2015, Pacific Northwest National Lab (Year: 2015).*

Yu et al., "A novel methodology for knowledge discovery through mining associations between building operational data", 2012, Energy and Buildings, vol. 47, pp. 430-440 (Year: 2012).*

Lazarova-Molnar et al., "A framework for collaborative cloud-based fault detection and diagnosis in smart buildings", 2017, 2017 7th International Conference on Modeling, Simulation, and Applied Optimization (ICMSAO), vol. 7 (2017), pp. 1-6 (Year: 2017).*

Granholm, "Utilization of Cloud Services for Visual Fault Diagnostics of Dental X-ray Systems", May 14, 2018 (Year: 2018).*

Fan et al., "Assessment of building operational performance using data mining techniques: a case study", 2016, 8th International Conference on Sustainability in Energy and Buildings, vol. 8 (2016), pp. 1-9 (Year: 2016).*

Padilla et al., "A combined passive-active sensor fault detection and isolation approach for air handling units", 2015, Energy and Buildings, vol. 99, pp. 214-219 (Year: 2015).*

Balaji et al, "Brick: Towards a Unified Metadata Schema for Buildings," dated Nov. 16-17, 2016, 10 pages.

Brick: Metadata schema for portable smart building applications, dated Feb. 11, 2018, 20 pages.

Malhorta et al. LSTM-based Encoder-Decoder for Multi-sensor Anomaly Detection, Dated Jul. 11, 2016, 5 pages.

Scrabble: Transferrable Semi-Automated Semantic Metada Normalization using Intermediate Representation, dated Nov. 7-8, 2018, 10 pages.

Sinha, Sudhi and Al Huraimel, Khaled, "Reimagining Businesses with AI" John Wiley & Sons, Inc., Hoboken, NJ, USA, first ed. published 2020 (156 pages).

Balaji et al., "Brick: Metadata schema for portable smart building applications," Applied Energy, Sep. 15, 2018, 3 pages, (Abstract).

Balaji et al, "Demo Abstract: Portable Queries Using the Brick Schema for Building Applications," BuildSys '16, Palo Alto, CA, USA, Nov. 16-17, 2016 (2 pages).

Bhattacharya et al., "Short Paper: Analyzing Metadata Schemas for Buildings—The Good, The Bad and The Ugly," BuildSys '15, Seoul, South Korea, Nov. 4-5, 2015 (4 pages).

Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).

Brick, "Brick Schema: Building Blocks for Smart Buildings," URL: chrome-extension://efaidnbmnnnibpcajpcglclefindmkaj/https://www. memoori.com/wp-content/uploads/2016/06/Brick_Schema_Whitepaper. pdf, Mar. 2019 (17 pages).

Brick, "Brick: Towards a Unified Metadata Schema For Buildings," URL: chrome-extension://efaidnbmnnnibpcajpcglclefindmkaj/https:// brickschema.org/papers/Brick_BuildSys_Presentation.pdf, Presented at BuildSys '16, Nov. 2016 (46 pages).

Brick, "Metadata Schema for Buildings," URL: https://brickschema. org/docs/Brick-Leaflet.pdf, retrieved from internet Dec. 24, 2019 (3 pages).

Chinese Office Action on CN Appl. No. 201780003995.9 dated Apr. 8, 2021 (21 pages with English language translation).

Chinese Office action on CN Appl. No. 201780043400.2 dated Apr. 25, 2021 (15 pages with English language translation).

Curry, E. et al., "Linking building data in the cloud: Integrating cross-domain building data using linked data." Advanced Engineering Informatics, 2013, 27 (pp. 206-219).

Digital Platform Litigation Documents Part 1, includes cover letter, dismissal of case DDE-1-21-cv-01796, IPR2023-00022 (documents filed Jan. 26, 2023-Oct. 20, 2022), and IPR2023-00085 (documents filed Jan. 26, 2023-Oct. 23, 2022) (748 pages total).

Digital Platform Litigation Documents Part 10, includes DDE-1-21-cv-01796 (documents filed Nov. 1, 2022-Dec. 22, 2021 (1795 pages total).

Digital Platform Litigation Documents Part 2, includes IPR2023-00085 (documents filed Oct. 20, 2022) (172 pages total).

Digital Platform Litigation Documents Part 3, includes IPR2023-00085 (documents filed Oct. 20, 2022) and IPR2023-00170 (documents filed Nov. 28, 2022-Nov. 7, 2022) (397 pages total).

Digital Platform Litigation Documents Part 4, includes IPR2023-00170 (documents filed Nov. 7, 2022) and IPR2023-00217 (documents filed Jan. 18, 2023-Nov. 15, 2022) (434 pages total).

Digital Platform Litigation Documents Part 5, includes IPR2023-00217 (documents filed Nov. 15, 2022) and IPR2023-00257 (documents filed Jan. 25, 2023-Nov. 23, 2022) (316 pages total).

Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).

Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).

Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 10, 2023 (480 pages total).

Digital Platform Litigation Documents Part 9, includes DDE-1-21-cv-01796 (documents filed Jan. 10, 2023-Nov. 1, 2022 (203 pages total).

El Kaed, C. et al., "Building management insights driven by a multi-system semantic representation approach," 2016 IEEE 3rd World Forum on Internet of Things (WF-IoT), Dec. 12-14, 2016, (pp. 520-525).

Ellis, C. et al., "Creating a room connectivity graph of a building from per-room sensor units." BuildSys '12, Toronto, ON, Canada, Nov. 6, 2012 (7 pages).

Extended European Search Report on EP Application No. 18196948.6 dated Apr. 10, 2019 (9 pages).

Fierro et al., "Beyond a House of Sticks: Formalizing Metadata Tags with Brick," BuildSys '19, New York, NY, USA, Nov. 13-14, 2019 (10 pages).

Fierro et al., "Dataset: An Open Dataset and Collection Tool for BMS Point Labels, " DATA'19, New York, NY, USA, Nov. 10, 2019 (3 pages).

Fierro et al., "Design and Analysis of a Query Processor for Brick," ACM Transactions on Sensor Networks, Jan. 2018, vol. 1, No. 1, art. 1 (25 pages).

Fierro et al., "Design and Analysis of a Query Processor for Brick," BuildSys '17, Delft, Netherlands, Nov. 8-9, 2017 (10 pages).

Fierro et al., "Mortar: An Open Testbed for Portable Building Analytics," BuildSys '18, Shenzhen, China, Nov. 7-8, 2018 (10 pages).

Fierro et al., "Why Brick is a Game Changer for Smart Buildings," URL: https://brickschema.org/papers/Brick_Memoori_Webinar_ Presentation.pdf, Memoori Webinar, 2019 (67 pages).

Fierro, "Writing Portable Building Analytics with the Brick Metadata Schema," UC Berkeley, ACM E-Energy, 2019 (39 pages).

Fierro, G., "Design of an Effective Ontology and Query Processor Enabling Portable Building Applications," Electrical Engineering and Computer Sciences, University of California at Berkeley, Technical Report No. UCB/EECS-2019-106, Jue 27, 2019 (118 pages).

File History for U.S. Appl. No. 12/776,159, filed May 7, 2010 (722 pages).

Final Conference Program, ACM BuildSys 2016, Stanford, CA, USA, Nov. 15-17, 2016 (7 pages).

Gao et al., "A large-scale evaluation of automated metadata inference approaches on sensors from air handling units," Advanced Engineering Informatics, 2018, 37 (pp. 14-30).

(56) References Cited

OTHER PUBLICATIONS

Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).

Harvey, T., "Quantum: The Digital Twin Standard for Buildings," URL: https://www.automatedbuildings.com/news/feb21/articles/passivelogic/210127124501passivelogic.html, Feb. 2021 (6 pages).

Hu, S. et al., "Building performance optimisation: A hybrid architecture for the integration of contextual information and time-series data," Automation in Construction, 2016, 70 (pp. 51-61).

International Search Report and Written Opinion for PCT Appl. Ser. No. PCT/US2017/013831 dated Mar. 31, 2017 (14 pages).

International Search Report and Written Opinion for PCT Appl. Ser. No. PCT/US2017/035524 dated Jul. 24, 2017 (14 pages).

International Search Report and Written Opinion on PCT/US2017/052060, mailed Oct. 5, 2017, 11 pages.

International Search Report and Written Opinion on PCT/US2017/052633, mailed Oct. 23, 2017, 9 pages.

International Search Report and Written Opinion on PCT/US2017/052829, mailed Nov. 27, 2017, 24 pages.

International Search Report and Written Opinion on PCT/US2018/024068, mailed Jun. 15, 2018, 22 pages.

International Search Report and Written Opinion on PCT/US2018/052971, dated Mar. 1, 2019, 19 pages.

International Search Report and Written Opinion on PCT/US2018/052974, mailed Dec. 19, 2018, 13 pages.

International Search Report and Written Opinion on PCT/US2018/052975, mailed Jan. 2, 2019, 13 pages.

International Search Report and Written Opinion on PCT/US2018/052994, mailed Jan. 7, 2019, 15 pages.

International Search Report and Written Opinion on PCT/US2019/015481, dated May 17, 2019, 78 pages.

International Search Report and Written Opinion on PCT/US2020/058381, dated Jan. 27, 2021, 30 pages.

Japanese Office Action on JP Appl. No. 2018-534963 dated May 11, 2021 (16 pages with English language translation).

Koh et al., "Plaster: An Integration, Benchmark, and Development Framework for Metadata Normalization Methods," BuildSys '18, Shenzhen, China, Nov. 7-8, 2018 (10 pages).

Koh et al., "Who can Access What, and When?" BuildSys '19, New York, NY, USA, Nov. 13-14, 2019 (4 pages).

Li et al., "Event Stream Processing with Out-of-Order Data Arrival," International Conferences on Distributed Computing Systems, 2007, (8 pages).

Nissin Electric Co., Ltd., "Smart power supply system (SPSS)," Outline of the scale verification plan, Nissin Electric Technical Report, Japan, Apr. 23, 2014, vol. 59, No. 1 (23 pages).

Passivelogic, "Explorer: Digital Twin Standard for Autonomous Systems. Made interactive." URL: https://passivelogic.com/software/quantum-explorer/, retrieved from internet Jan. 4, 2023 (13 pages).

Passivelogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).

Quantum Alliance, "Quantum Explorer Walkthrough," 2022, (7 pages) (screenshots from video).

Results of the Partial International Search for PCT/US2018/052971, dated Jan. 3, 2019, 3 pages.

Sinha, Sudhi and Al Huraimel, Khaled, "Reimagining Businesses with AI" John Wiley & Sons, Inc., Hoboken, NJ, USA, 2021 (156 pages).

Sinha, Sudhi R. and Park, Youngchoon, "Building an Effective IoT Ecosystem for Your Business," Johnson Controls International, Springer International Publishing, 2017 (286 pages).

Sinha, Sudhi, "Making Big Data Work for Your Business: A guide to effective Big Data analytics," Impackt Publishing Ltd., Birmingham, UK, Oct. 2014 (170 pages).

The Virtual Nuclear Tourist, "Calvert Cliffs Nuclear Power Plant," URL: http://www.nucleartourist.com/us/calvert.htm, Jan. 11, 2006 (2 pages).

University of California at Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2022 (7 pages).

Van Hoof, Bert, "Announcing Azure Digital Twins: Create digital replicas of spaces and infrastructure using cloud, AI and IoT," URL: https://azure.microsoft.com/en-US/blog/announcing- azure-digital-twins-create-digital-replicas-of-spaces-and-infrastructure-using-cloud-ai-and-iot/, Sep. 24, 2018 (11 pages).

W3C, "SPARQL: Query Language for RDF," located on The Wayback Machine, URL: https://web.archive.org/web/20161230061728/http://www.w3.org/TR/rdf-sparql-query/), retrieved from internet Nov. 15, 2022 (89 pages).

Wei et al., "Development and Implementation of Software Gateways of Fire Fighting Subsystem Running on EBI," Control, Automation and Systems Engineering, IITA International Conference on, IEEE, Jul. 2009 (pp. 9-12).

Zhou, Q. et al., "Knowledge-infused and Consistent Complex Event Processing over Real-time and Persistent Streams," Further Generation Computer Systems, 2017, 76 (pp. 391-406).

Kartakis et al. "Reliability or Sustainability: Optimal Data Stream Estimation and Scheduling in Smart Water Networks," ARXIV ID: 170309781, Mar. 2017 (pp. 1-26).

* cited by examiner

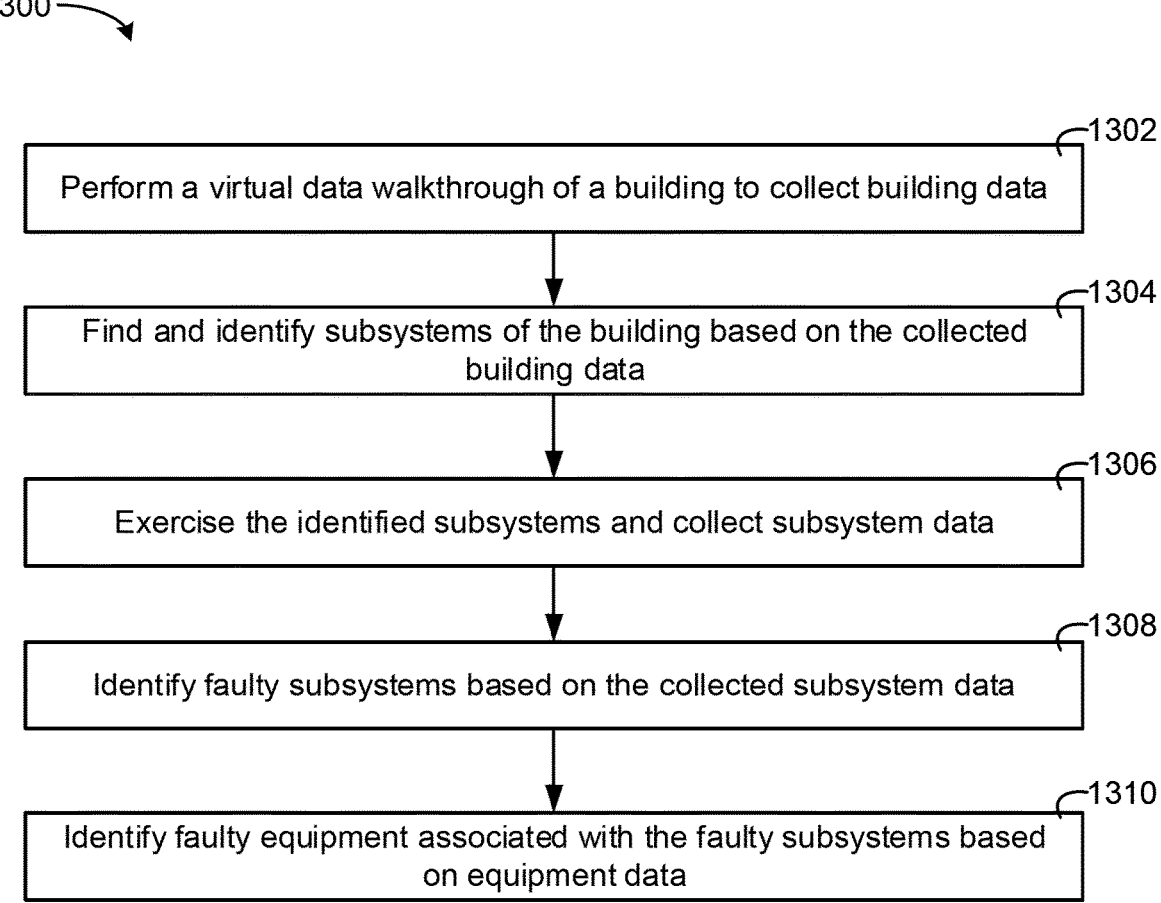

1300

1302
Perform a virtual data walkthrough of a building to collect building data

1304
Find and identify subsystems of the building based on the collected building data 1306
Exercise the identified subsystems and collect subsystem data 1308
Identify faulty subsystems based on the collected subsystem data 1310
Identify faulty equipment associated with the faulty subsystems based on equipment data

FIG. 13

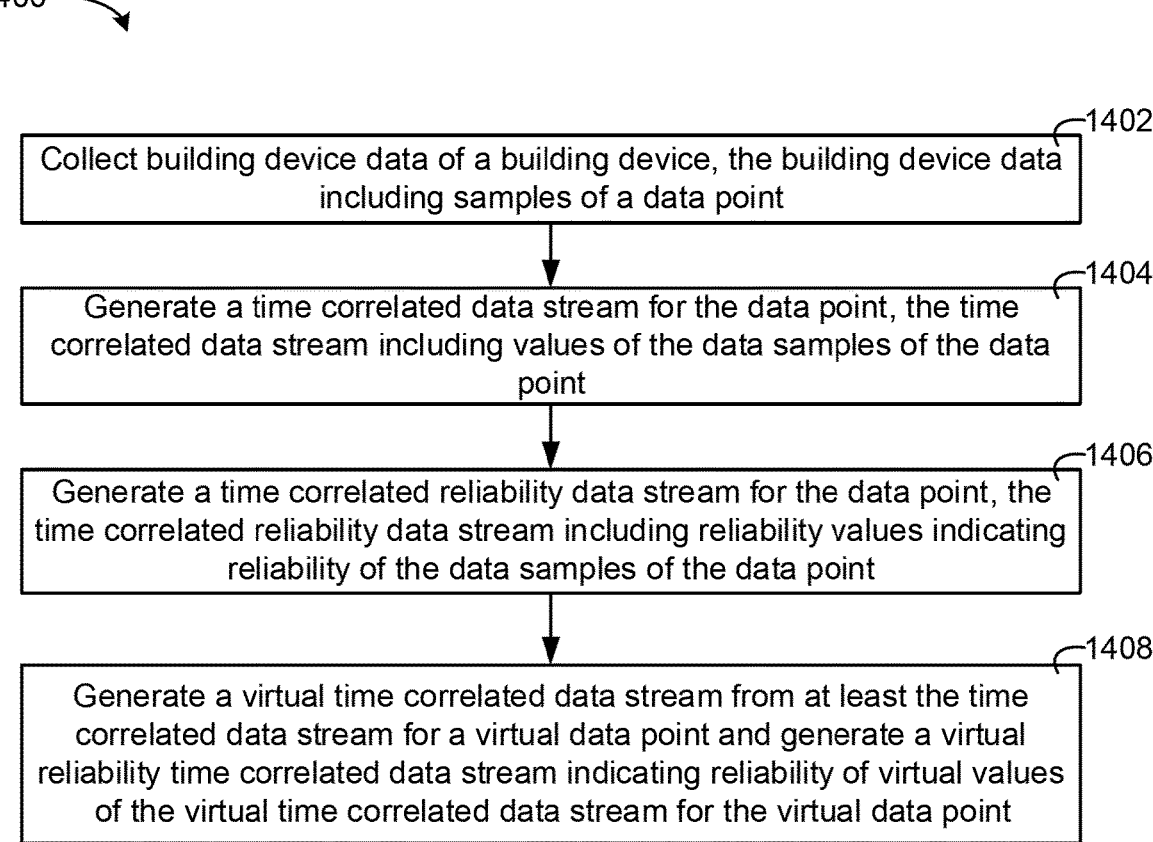

1400

1402
Collect building device data of a building device, the building device data including samples of a data point 1404
Generate a time correlated data stream for the data point, the time correlated data stream including values of the data samples of the data point 1406
Generate a time correlated reliability data stream for the data point, the time correlated reliability data stream including reliability values indicating reliability of the data samples of the data point 1408
Generate a virtual time correlated data stream from at least the time correlated data stream for a virtual data point and generate a virtual reliability time correlated data stream indicating reliability of virtual values of the virtual time correlated data stream for the virtual data point

FIG. 14

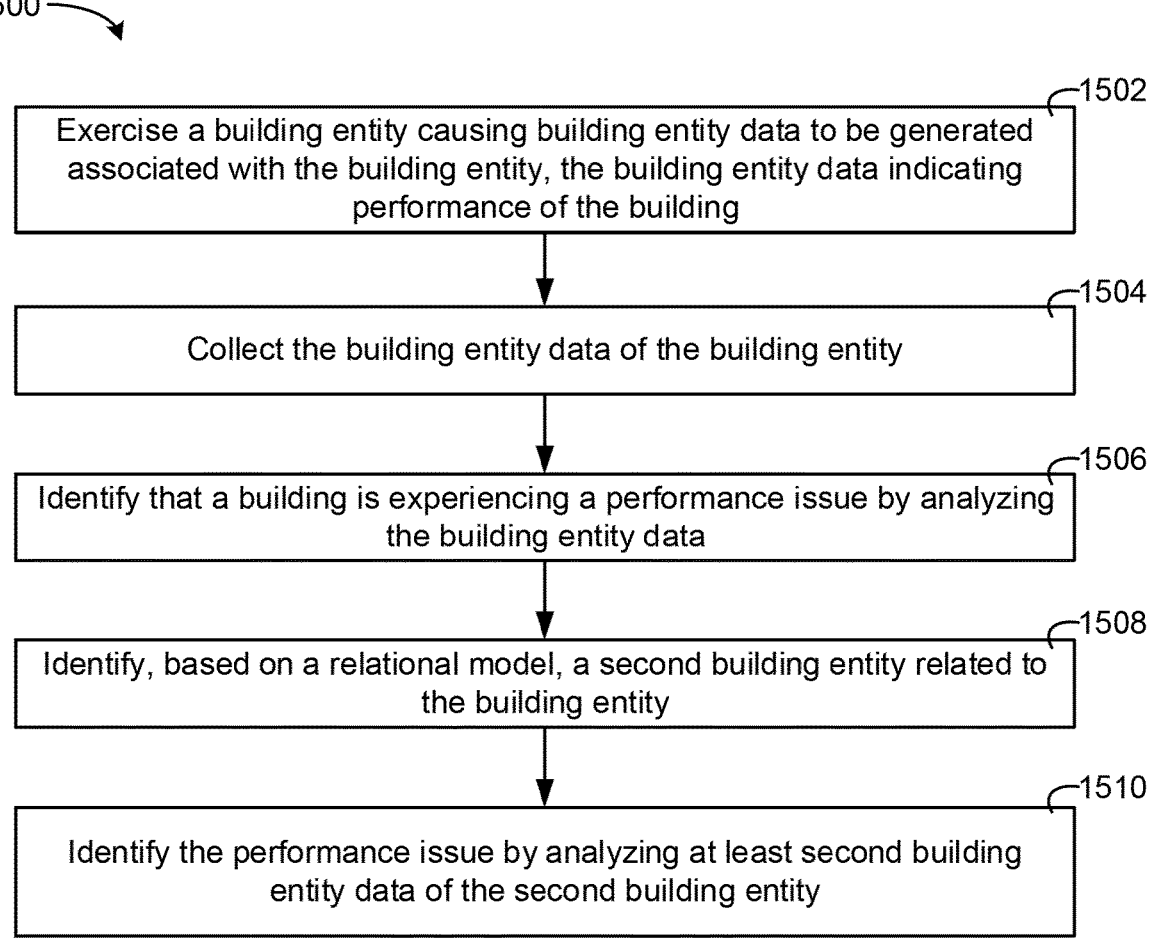

1500

1502
Exercise a building entity causing building entity data to be generated associated with the building entity, the building entity data indicating performance of the building 1504
Collect the building entity data of the building entity 1506
Identify that a building is experiencing a performance issue by analyzing the building entity data 1508
Identify, based on a relational model, a second building entity related to the building entity 1510
Identify the performance issue by analyzing at least second building entity data of the second building entity

BUILDING SYSTEM WITH PERFORMANCE IDENTIFICATION THROUGH EQUIPMENT EXERCISING AND ENTITY RELATIONSHIPS

CROSS-REFERENCE TO RELATED PATENT APPLICATIONS

This application claims the benefit of and priority to U.S. Provisional Patent Application No. 62/769,447 filed Nov. 19, 2018, the entirety of which is incorporated by reference herein.

BACKGROUND

The present disclosure relates generally to building control. The present disclosure relates to building systems that generate building data and artificial intelligence (AI) systems that utilize the building data.

Building sites may include a variety of building systems. For example, the building sites can include heating and cooling systems, access control systems, video surveillance systems, fire response systems, and various other building systems. Each of the systems can collect building data which can be utilized by an AI system. The AI system can be configured to generate decisions or information for the building based on the collected data. However, in many cases, the performance of the AI system is hindered by the quality of the building data it utilizes. For example, the data can be corrupt, produced by building equipment that is unreliable. The data may, in other cases, be inaccurate or may be received from the building equipment in an untimely manner.

SUMMARY

Building System With a Time Correlated Reliability Data Stream

One implementation of the present disclosure is a building system including one or more memory devices configured to store instructions that, when executed on one or more processors, cause the one or more processors to collect building device data of a building device, the building device data including data samples of a data point, generate a time correlated data stream for the data point, the time correlated data stream including values of the data samples of the data point, and generate a time correlated reliability data stream for the data point, the time correlated reliability data stream including reliability values indicating reliability of the values of the data samples of the data point.

In some embodiments, the instructions cause the one or more processors to send, via a network, the time correlated data stream and the time correlated reliability data stream to an artificial intelligence (AI) platform.

In some embodiments, the instructions cause the one or more processors to generate, based on the time correlated data stream for the data point, a virtual time correlated data stream for a virtual data point, the virtual time correlated data stream including virtual values based on the values of the data samples of the data point and generate, based on the time correlated reliability data stream, a virtual time correlated reliability data stream for the virtual data point, the virtual time correlated reliability data stream including virtual reliability values indicating reliability of the virtual values, the virtual reliability values based on the reliability values.

In some embodiments, the time correlated data stream, the time correlated reliability data stream, the virtual time correlated data stream, and the virtual time correlated reliability data stream are each a timeseries data stream including time indicators and timeseries values, each timeseries value of the timeseries values linked to a time indicator of the time indicators.

In some embodiments, the instructions cause the one or more processors to collect second building device data, the second building device data including second data samples of a second data point, generate a second time correlated data stream for the second data point, the second time correlated data stream including second values of the second data samples of the second data point, generate a second time correlated reliability data stream for the second data point, the second time correlated reliability data stream including second reliability values indicating a second reliability of the second values of the second data samples of the second data point, generate, based on the time correlated data stream for the data point and the second time correlated data stream for the second data point, a virtual time correlated data stream for a virtual data point, the virtual time correlated data stream including virtual values based on the values of the data samples of the data point and the second values of the second data samples of the second data point, and generate, based on the time correlated reliability data stream and the second time correlated reliability data stream, a virtual time correlated reliability data stream for the virtual data point, the virtual time correlated reliability data stream including virtual reliability values indicating the reliability of the virtual values of the virtual data point, the virtual reliability values based on the reliability values and the second reliability values.

In some embodiments, the virtual time correlated reliability data stream indicates compounded uncertainty of the virtual time correlated data stream resulting from generation of the virtual time correlated data stream from the time correlated data stream and the second time correlated data stream.

In some embodiments, the instructions cause the one or more processors to collect network traffic level data of a building network of a building, determine whether the building device data is reliable based on the network traffic level data, and generate the time correlated reliability data stream for the data point based on a determination whether the building device data is reliable based on the network traffic level data.

In some embodiments, the instructions cause the one or more processors to determine a period of time associated with a network traffic level above a predefined level based on the network traffic level data, filter the building device data to exclude a portion of the building device data associated with the period of time, and send, via a network, the building device data filtered by the one or more processors to an AI platform.

In some embodiments, the instructions cause the one or more processors to determine network activity associated with the building device based on the network traffic level data, determine whether a data network burst has occurred for the building device by determining whether the network activity is greater than a predefined amount during a predefined period of time, and generate the time correlated reliability data stream for the data point based on a second determination that the data network burst has occurred.

In some embodiments, the instructions cause the one or more processors to determine whether a time period is associated with high network activity by determining whether the network traffic level data indicates a network traffic level greater than a predefined amount during the time period and update the time correlated data stream by reordering one or more data values of the time correlated data stream collected during the time period in response to a second determination that the network traffic level is greater than the predefined amount during the time period.

In some embodiments, the instructions cause the one or more processors to analyze the network traffic level data to generate a building network report for the building network and generate the time correlated reliability data stream for the data point based on the building network report. In some embodiments, the building network report includes at least one of a first indication of equipment requiring service, a second indication of whether resources of network equipment of the building network are being properly utilized, or a third indication to perform one or more software updates for the building network.

Another implementation of the present disclosure is a method of a building system including collecting, by one or more processing circuits, building device data of a building device, the building device data including data samples of a data point, generating, by the one or more processing circuits, a time correlated data stream for the data point, the time correlated data stream including values of the data samples of the data point, and generating, by the one or more processing circuits, a time correlated reliability data stream for the data point, the time correlated reliability data stream including reliability values indicating reliability of the values of the data samples of the data point.

In some embodiments, the method includes collecting, by the one or more processing circuits, network traffic level data of a building network of a building, determining, by the one or more processing circuits, whether the building device data is reliable based on the network traffic level data, and generating, by the one or more processing circuits, the time correlated reliability data stream for the data point based on a determination whether the building device data is reliable based on the network traffic level data.

In some embodiments, the method includes generating, by the one or more processing circuits, based on the time correlated data stream for the data point, a virtual time correlated data stream for a virtual data point, the virtual time correlated data stream including virtual values based on the values of the data samples of the data point and generating, by the one or more processing circuits, based on the time correlated reliability data stream, a virtual time correlated reliability data stream for the virtual data point, the virtual time correlated reliability data stream including virtual reliability values indicating reliability of the virtual values, the virtual reliability values based on the reliability values.

In some embodiments, the time correlated data stream, the time correlated reliability data stream, the virtual time correlated data stream, and the virtual time correlated reliability data stream are each a timeseries data stream including time indicators and timeseries values, each timeseries value of the timeseries values linked to a time indicator of the time indicators.

In some embodiments, the method further includes collecting, by the one or more processing circuits, second building device data, the second building device data including second data samples of a second data point, generating, by the one or more processing circuits, a second time correlated data stream for the second data point, the second time correlated data stream including second values of the second data samples of the second data point, generating, by the one or more processing circuits, a second time correlated reliability data stream for the second data point, the second time correlated reliability data stream including second reliability values indicating a second reliability of the second values of the second data samples of the second data point, generating, by the one or more processing circuits, based on the time correlated data stream for the data point and the second time correlated data stream for the second data point, a virtual time correlated data stream for a virtual data point, the virtual time correlated data stream including virtual values based on the values of the data samples of the data point and the second values of the second data samples of the second data point, and generating, by the one or more processing circuits, based on the time correlated reliability data stream and the second time correlated reliability data stream, a virtual time correlated reliability data stream for the virtual data point, the virtual time correlated reliability data stream including virtual reliability values indicating the reliability of the virtual values of the virtual data point, the virtual reliability values based on the reliability values and the second reliability values.

In some embodiments, the virtual time correlated reliability data stream indicates compounded uncertainty of the virtual time correlated data stream resulting from generation of the virtual time correlated data stream from the time correlated data stream and the second time correlated data stream.

Another implementation of the present disclosure is a building device including one or more memory devices configured to store instructions and one or more processors configured to execute the instructions causing the one or more processors to collect building device data of the building device, the building device data including data samples of a data point, generate a time correlated data stream for the data point, the time correlated data stream including values of the data samples of the data point, and generate a time correlated reliability data stream for the data point based on the data samples, the time correlated reliability data stream including reliability values indicating reliability of the values of the data samples of the data point.

In some embodiments, the one or more processors are configured to execute the instructions causing the one or more processors to generate, based on the time correlated data stream for the data point, a virtual time correlated data stream for a virtual data point, the virtual time correlated data stream including virtual values based on the values of the data samples of the data point and generate, based on the time correlated reliability data stream, a virtual time correlated reliability data stream for the virtual data point, the virtual time correlated reliability data stream including virtual reliability values indicating reliability of virtual values, the virtual reliability values based on the reliability values.

In some embodiments, the one or more processors are configured to execute the instructions causing the one or more processors to identify a data analysis problem associated with the building device data, select an anomaly detection model from anomaly detection models based on the data analysis problem, wherein each of the anomaly detection models is associated with one data analysis problem of data analysis problems, determine an anomaly score for the building device data based on the anomaly detection model and the building device data, and ingest the building device data with an artificial intelligence (AI) service in response to a determination that the anomaly score is less than a predefined level.

Building System With Performance Identification Through Equipment Exercising and Entity Relationships One implementation of the present disclosure is a building system of a building including one or more memory devices configured to store one or more instructions that, when executed on one or more processors, cause the one or more processors to exercise a building entity causing building entity data to be generated associated with the building entity, the building entity data indicating a result of exercising the building entity, collect the building entity data, identify, based on a relational model, one or more relationships between one or more building entities and the building entity, wherein the one or more relationships indicate that exercising the building entity affects operation of the one or more building entities, and identify that the building is experiencing a performance issue by analyzing the building entity data and the one or more relationships.

In some embodiments, the one or more instructions cause the one or more processors to identify the performance issue by analyzing at least second building entity data of the one or more building entities, wherein performance of the building entity is related to performance of the one or more building entities.

In some embodiments, the relational model is a building graph. In some embodiments, the one or more instructions cause the one or more processors to receive at least a portion of the building graph, the building graph including nodes representing building entities and edges between the nodes representing relationships between the building entities and identify, based on the portion of the building graph, the one or more building entities by identifying a particular edges of the edges between a first node of the nodes representing the building entity and one or more second nodes of the nodes representing the one or more building entities.

In some embodiments, the building entity is a space of the building. In some embodiments, the one or more instructions cause the one or more processors to exercise the building entity by operating building equipment associated with the space of the building.

In some embodiments, the one or more memory devices are devices of at least one of a cloud platform located remote from the building entity and configured to collect the building entity data via one or more networks, an on-premises server located within the building, wherein the building entity is located within the building, wherein the on-premises server is configured to receive the building entity data via one or more building networks of the building, a gateway device located within the building, the gateway device configured to collect the building entity data via the one or more building networks and push at least one of the building entity data an indication of the performance issue to a building control platform, or a piece of building equipment, wherein the building entity and the one or more building entities are components of the piece of building equipment.

In some embodiments, the performance issue is at least one of an equipment fault, a configuration error, or a user error.

In some embodiments, the one or more instructions cause the one or more processors to perform building entity exercises, wherein each exercise of the building entity exercises causes particular building entity data to be generated and in response to completing each of the building entity exercises determine whether the performance issue is identified by the particular building entity data of the exercise and one or more results of one or more previous exercises of the building entity exercises and perform a subsequent exercise in response to a determination that the performance issue is not identified by the particular building entity data and the one or more results of the one or more previous exercises.

In some embodiments, each of the building entity exercises corresponds to one control level of control levels of a control algorithm.

In some embodiments, the building entity is a first building subsystem of building subsystems including pieces of equipment. In some embodiments, the one or more instructions cause the one or more processors to collect subsystem data of the building subsystems, identify each of the building subsystems based on the subsystem data, identify the first building subsystem of the building subsystems experiencing the performance issue by analyzing the subsystem data, and identify one piece of equipment of the pieces of equipment of the building based on equipment data of the pieces of equipment in response to an identification of the first building subsystem experiencing the performance issue.

In some embodiments, the one or more instructions cause the one or more processors to identify the first building subsystem experiencing the performance issue by comparing the subsystem data to other subsystem data of buildings similar to the building and identify the one piece of equipment of the pieces of equipment based on the equipment data by comparing the equipment data to other equipment data of equipment similar to the one piece of equipment of the buildings similar to the building.

In some embodiments, the system further includes a building device including a processing circuit configured to collect building device data of the building device, the building device data indicating operations of the building device and environmental conditions measured by a sensor of the building device, perform a self-analysis with the building device data to determine a device performance flag indicating performance of the building device, and send, via a network, the building device data with the device performance flag to at least one of an artificial intelligence (AI) platform or the one or more processors.

In some embodiments, the processing circuit of the building device includes a memory device configured to store manufacturer data indicating design characteristics of the building device. In some embodiments, the processing circuit of the building device is configured to send, via the network, the manufacturer data to at least one the AI platform or the one or more processors.

In some embodiments, the processing circuit of the building device is configured to determine whether the one or more memory devices store a filter and one or more filter parameters for the filter, filter the environmental conditions with the filter and the one or more filter parameters in response to a determination that the one or more memory devices store the filter, generate a filter flag based on whether the one or more memory devices store the filter and the one or more filter parameters for the filter, and send, via the network, the building device data with the device performance flag and the filter flag to at least one of the AI platform or the one or more processors.

In some embodiments, the processing circuit of the building device is configured to perform a calibration of the building device and record a calibration time indication identifying when the building device was calibrated, generate a calibration flag based on the calibration time indication, and send, via the network, the device performance flag and the calibration flag to at least one of the AI platform or the one or more processors.

Another implementation of the present disclosure is a method of a building system including exercising, by one or more processing circuits, a building entity of a building causing building entity data to be generated associated with the building entity, the building entity data indicating a result of exercising the building entity, collecting, by the one or more processing circuits, the building entity data, identifying, by the one or more processing circuits, based on a relational model, one or more relationships between one or more building entities and the building entity, wherein the one or more relationships indicate that exercising the building entity affects operation of the one or more building entities, and identifying, by the one or more processing circuits, that the building is experiencing a performance issue by analyzing the building entity data and the one or more relationships.

In some embodiments, the method further includes identifying, by the one or more processing circuits, the performance issue by analyzing at least second building entity data of the one or more building entities, wherein performance of the building entity is related to performance of the one or more building entities.

In some embodiments, the relational model is a building graph. In some embodiments, the method further includes receiving, by the one or more processing circuits, at least a portion of the building graph, the building graph including nodes representing building entities and edges between the nodes representing relationships between the building entities and identifying, by the one or more processing circuits, based on the portion of the building graph, the one or more building entities by identifying one or more particular edges of the edges between a first node of the nodes representing the building entity and a one or more second nodes of the nodes representing the one or more building entities.

In some embodiments, the building entity is a space of the building. In some embodiments, the method further includes exercising, by the one or more processing circuits, the building entity by operating building equipment associated with the space of the building.

Another implementation of the present disclosure is a building management system of a building including one or more memory devices configured to store instructions and one or more processors configured to execute the instructions causing the one or more processors to exercise a building entity causing building entity data to be generated associated with the building entity, the building entity data indicating a result of exercising the building entity, collect the building entity data, identify, based on a relational model, one or more relationships between one or more building entities and the building entity, wherein the one or more relationships indicate that exercising the building entity affects operation of the one or more building entities, exercise the one or more building entities to generate second building entity data, and identify that the building is experiencing a performance issue by analyzing the building entity data and the second building entity data.

In some embodiments, the one or more processors are configured to execute the instructions causing the one or more processors to identify a data analysis problem associated with the building entity data, select an anomaly detection model from anomaly detection models based on the data analysis problem, wherein each of the anomaly detection models is associated with one data analysis problem of data analysis problems, determine an anomaly score for the building entity data based on the anomaly detection model and the building entity data, and ingest the building entity data with an artificial intelligence (AI) service in response to a determination that the anomaly score is less than a predefined level.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 13 is a flow diagram of a process of performing a virtual data walkthrough that can be performed by the BMS and/or the building cloud platform of FIG. 5, according to an exemplary embodiment.

FIG. 14 is a flow diagram of a process of generating a time correlated reliability data stream for a data point that can be performed by the timeseries generator of FIG. 10, according to an exemplary embodiment.

FIG. 15 is a flow diagram of a process of exercising a building entity and identifying performance issues of a building based on relationships between building entities of the building, according to an exemplary embodiment.

FIG. 20 is a block diagram of one of the data anomaly detection models of FIG. 18, where the data anomaly detection model is a long-short term memory (LSTM) model, according to an exemplary embodiment.

DETAILED DESCRIPTION

Overview

Figure 1:
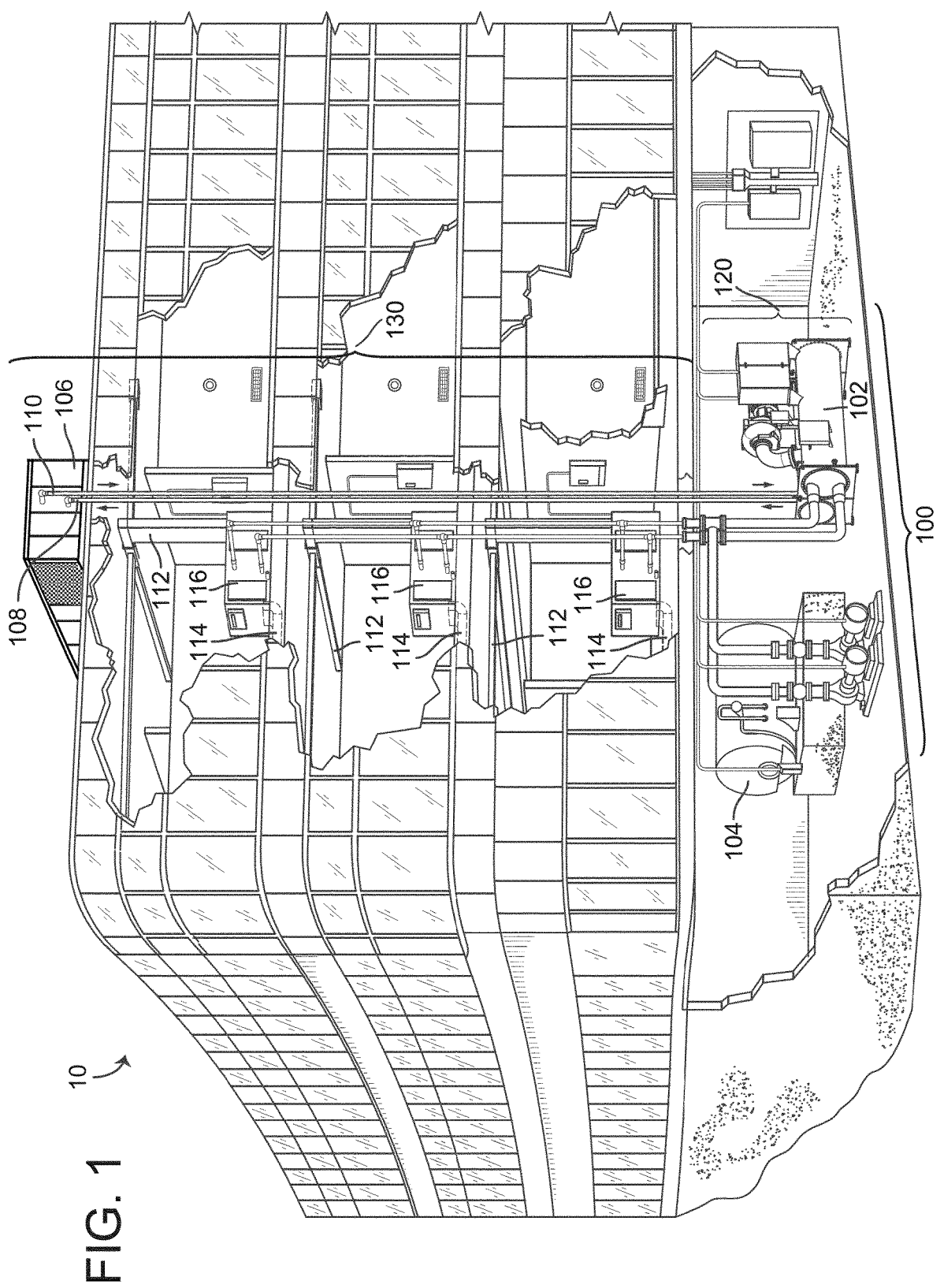
FIG. 1 is a drawing of a building equipped with a heating, ventilating, or air conditioning (HVAC) system, according to an exemplary embodiment.

Referring generally to the FIGURES, a building system with data preparation for artificial intelligence (AI) is shown, according to various exemplary embodiments. In a building, raw building data is collected by building systems. However, this raw data may be unreliable in training artificial intelligence (AI) learning systems since the raw data may include inaccuracies or may otherwise be corrupt. Inaccurate or corrupt raw data can be the result of faults or issues pertaining to the equipment that collects and/or generates the building data. These faults or issues can be the result of temporal faults, configuration faults, measurement uncertainty, commissioning, and/or frequency domain faults.

If the building data that is corrupt or otherwise unreliable can be cleansed, flagged, enhanced, and/or otherwise improved by the building system, data from a building management system (BMS) could be provided to (e.g., sold to), and utilized by, an AI Platform. Cleansed data or flagged data can provide the AI platform a higher number of reliable dimensions for AI models and learning systems to consider, improving the performance of the AI. AI can determine models of greater complexity by analyzing trends in reliable building data.

Cleansed data utilized in an AI platform can allow the AI platform to perform analysis for control and operational applications. For example, applications such as energy management to control the energy usage of a building and/or campus can utilize the determinations of the AI platform. Furthermore, a building system can provide reports and/or predictions for a building in the form of a performance report. A performance reporting application can, in some cases, rely on determinations made by the AI platform. Furthermore, the building system may utilize a fault detection diagnostics (FDD) system. With cleansed and/or flagged building data, the AI platform can be implemented to perform FDD for the building. Some applications can be configured to generate building equipment and/or system alarms, the applications can leverage the learning of the AI platform to generate the alarms. Furthermore, the AI platform can improve maintenance applications for performing and/or scheduling maintenance on equipment and/or employee productivity to save salary on salary budgets and/or maintenance truck rolls.

Temporal Faults

Data collected by building equipment may have temporal faults, specifically when the collected data is in the form of a timeseries (e.g., a data structure including data values and time values for each data value). Temporal faults can be a fault associated with the time values or otherwise the time-based nature of the timeseries. For example, raw building data can include gaps in data timeseries, i.e., data from the timeseries may be missing. Furthermore, raw building data can become stuck, e.g., a single measurement may span multiple points in time over a time period in a data timeseries. Raw building data may have unrealistic values that are not physically possible. Furthermore, raw building data may have unrealistic rates of change that are not physically possible. Raw building data may have excessive quantization, e.g., values of a data timeseries constrained to an unrealistic discrete intervals, in some cases. Also, raw building data may have timestamp errors and predicting when a data sample was collected may be difficult.

Configuration Faults

In some cases, the unreliable data is the result of equipment configuration. In this regard, the settings of equipment and/or relationships between equipment may cause the data collected and/or generated by the equipment to be unreliable for the AI platform. In some cases, raw building data can be improperly tagged, e.g., a data point for a temperature sensor may be improperly tagged as a humidity measurement. Raw building data can be associated with building systems or building structures improperly, e.g., temperature measurements of a sensor within a Zone A may mistakenly be associated with a Zone B. Furthermore, Change On Value (COV) measurement schemes may be improperly configured for equipment with inappropriate trigger levels, e.g., important data may not be measured when important changes occur if those changes are below/above the trigger level.

Measurement Uncertainty

In some cases, there may be uncertainty in the measurements of building equipment. This uncertainty may make the data collected by building equipment unusable or otherwise poor, for the AI platform. Measurements of a sensor may have an uncertainty, e.g., a temperature measured in a chiller well may have an inappropriate level due to self-heating of a circuit. In some cases, if multiple data points are utilized to calculate another data point, the uncertainties of the data points in the calculation can be compounded.

Commissioning

In some cases, the unreliability of the data of the equipment is linked to improper commissioning. For example, sensors may be improperly calibrated, leading to poor measurements. In other cases, sensors may be inappropriately located, leading to poor measurements.

Frequency Domain Faults

Furthermore, in some cases, equipment data errors may be the result of transients. For example, data collected by building equipment may only be reliable in a steady state. Transients during a startup or shutdown phase of equipment of an equipment system may result in the equipment being unreliable. The equipment may include hardware circuit filters and/or digital filters. These filters can handling high frequency noise in measurements. However, the filters may be configured with inappropriate parameters and/or filter types. Some equipment may not include filters at all.

Building Management System

Figure 2:
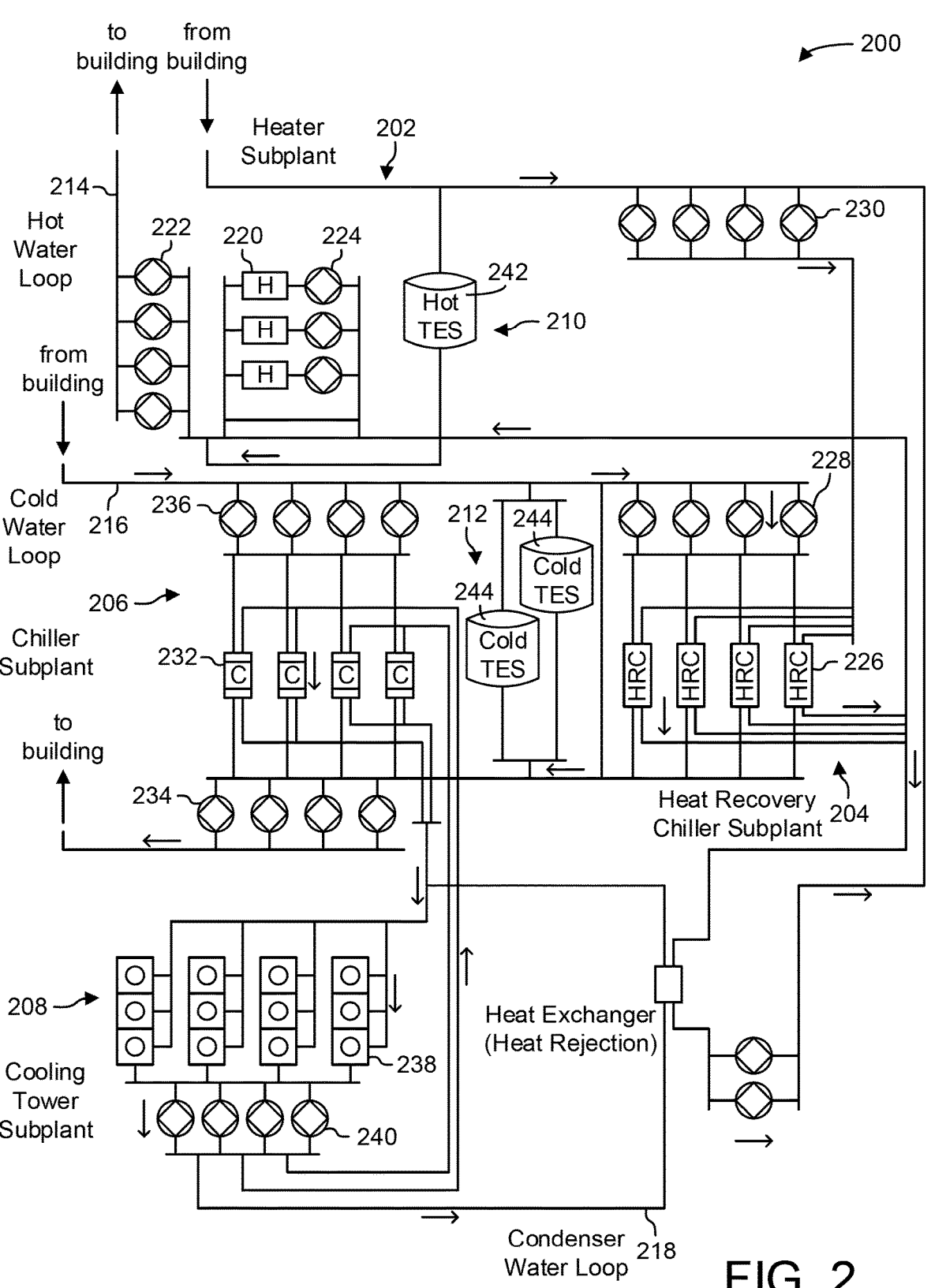
FIG. 2 is a block diagram of a waterside system that may be used in conjunction with the building of FIG. 1, according to an exemplary embodiment.
Figure 3:
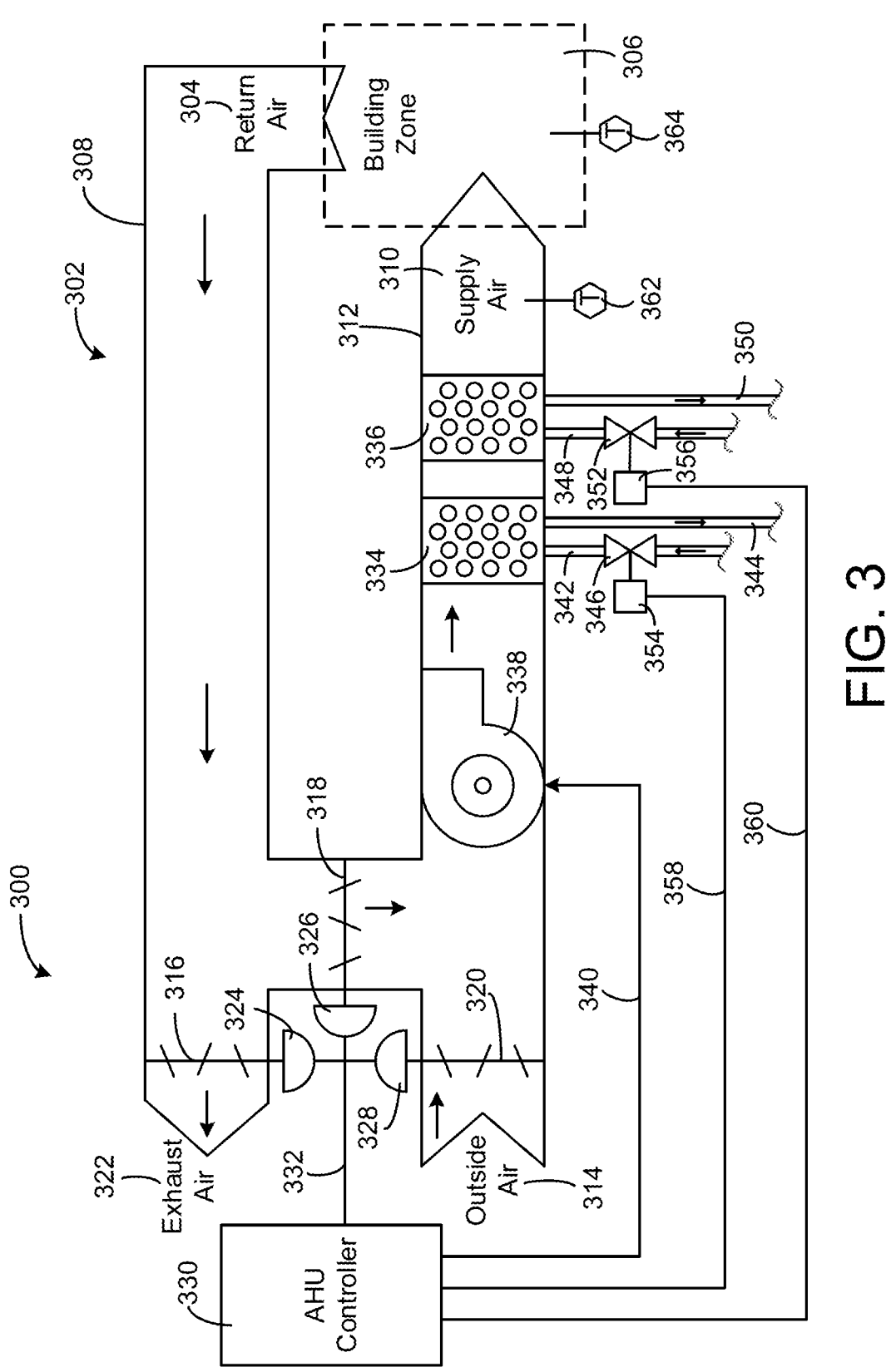
FIG. 3 is a block diagram of an airside system that may be used in conjunction with the building of FIG. 1, according to an exemplary embodiment.

Referring now to FIGS. 1-3, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust air damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from water-side system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200(e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, set-points, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
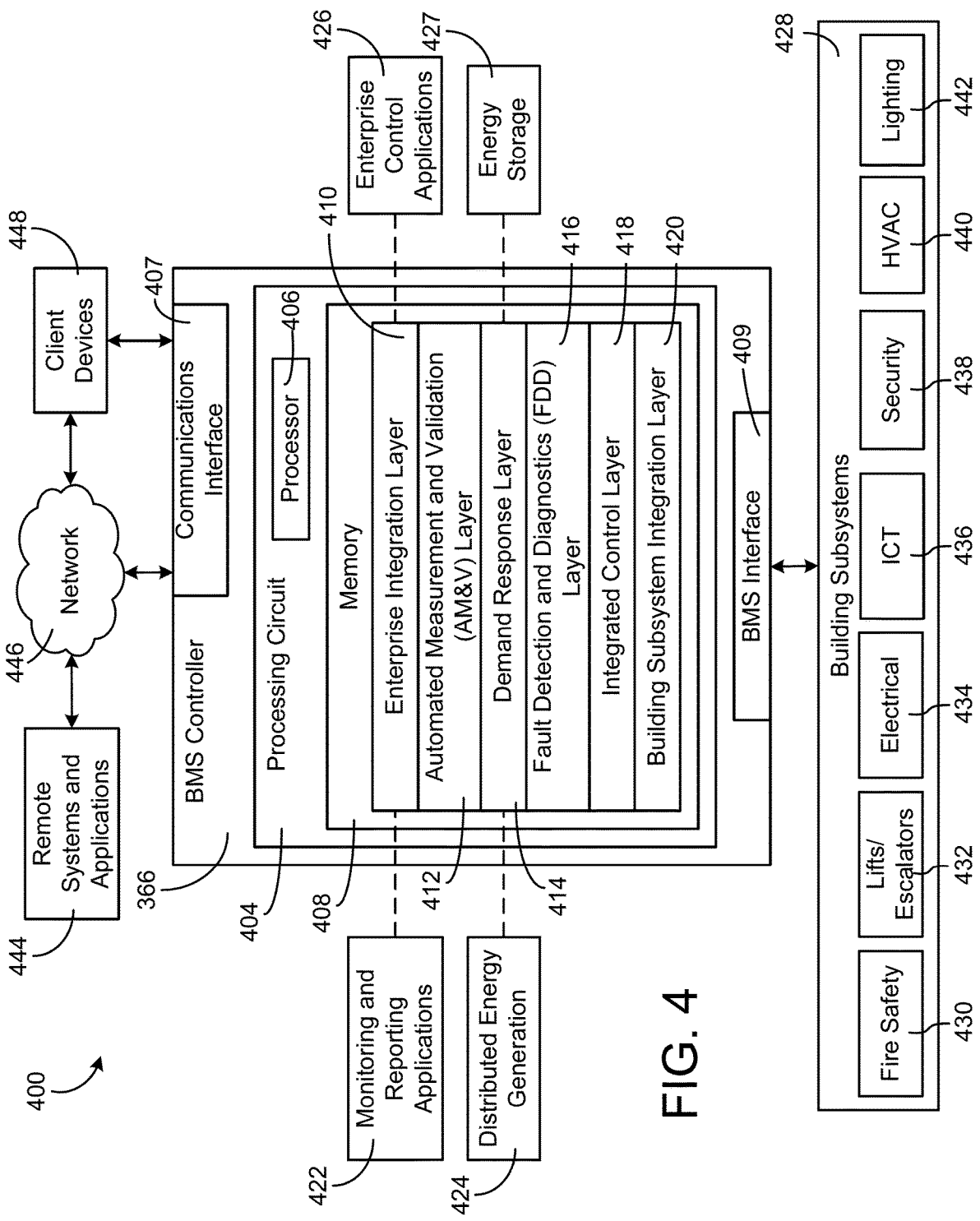
FIG. 4 is a block diagram of a building management system (BMS) which can be used to monitor and control the building of FIG. 1, according to some embodiments.

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify whether control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Data Preparation

Figure 5:
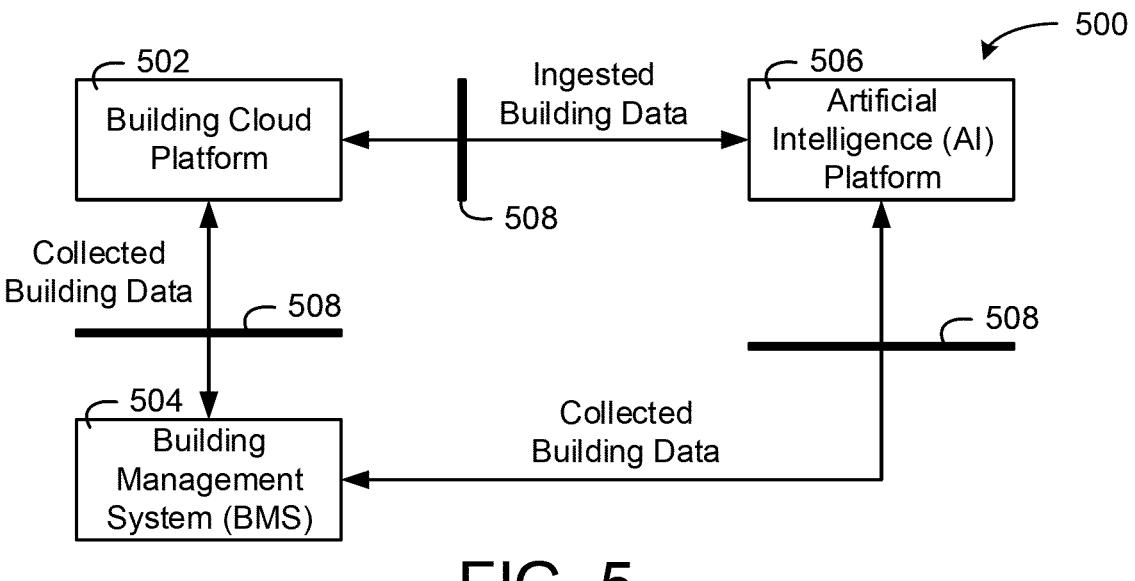
FIG. 5 is a block diagram of a system including a building management system (BMS) and a building cloud platform that provides collected building data and ingested building data to an artificial intelligence (AI) platform, according to an exemplary embodiment.

Referring now to FIG. 5, a system 500 for a building including a building platform 502, a building management system 504, and an artificial intelligence (AI) platform 506 is shown, according to an exemplary embodiment. The system 500 is shown to communicate collected data and ingested data via a network 508. The network 508 can be the same as and/or similar to the network 446 as described with reference to FIG. 4.

The BMS 504 can be the same as and/or similar to the BMS 400 and can include various controllers (e.g., the BMS controller 366), subsystems (e.g., building subsystems 428), and/or equipment (e.g., the equipment as described with reference to FIGS. 1-4). The BMS 504 can collect and/or generate building data. The building data can be measured conditions, e.g., zone temperature, zone humidity, zone air quality, environmental conditions measured for equipment (e.g., equipment circuit board temperature, heating well temperature, valve position sensor data, etc.) and/or can include operational data (e.g., control command logs, setpoints, settings, etc.). The data can, in some embodiments, be timeseries data including both data values (e.g., measurements, recorded values, etc.) and a timestamp (e.g., a date and/or time value, a sequence number, etc.). The BMS is configured to provide the collected building data to the building cloud platform 502 and/or the AI platform 506 via the network 508, in some embodiments.

The building cloud platform 502 can be configured to collect the building data and generate ingested building data based on the collected data received from the BMS 504 via the network 508. In some embodiments, the building cloud platform 502 can ingest and store the collected building data based on an ontology. For example, various building models and/or ontology structures may define how building equipment is associated with other equipment, zones, buildings, cities, etc. Furthermore, actuators and/or sensors of the equipment can include similar limitations. Various contextual information (e.g., equipment age, equipment type, manufacture, location, calibration date, etc.) and/or the ontology can be applied to the collected building data to generate the ingested building data. The building cloud platform 502 is configured to communicate the ingested building data to the AI platform 506 via the network 508, in some embodiments. The building data may be timeseries data and can be processed by the building cloud platform 502 according to various timeseries processing workflows or other techniques.

Examples of timeseries data and processing is found in U.S. patent application Ser. No. 15/644,519 filed Jul. 7, 2017, U.S. patent application Ser. No. 15/644,581 filed Jul. 7, 2017, U.S. patent application Ser. No. 15/644,560 filed Jul. 7, 2017, U.S. patent application Ser. No. 16/143,012 filed Sep. 26, 2018, U.S. patent application Ser. No. 16/143, 243 filed Sep. 26, 2018, U.S. patent application Ser. No. 16/142,943 filed Sep. 26, 2018, and U.S. patent application Ser. No. 16/567,534 filed Sep. 11, 2019. The entirety of each of these patent applications is incorporated by reference herein.

The AI platform 506 is configured to receive the ingested building data and/or the collected building data via the network 508 from the building cloud platform 502 and/or the BMS 504, in some embodiments. The AI platform 506 is configured to generate and/or train various AI models based on the ingested building data and/or the collected building data. The models can be supervised, unsupervised, and/or supervised-unsupervised hybrid models. The AI models can include, Artificial Neural Networks (ANNs) (e.g., Convolutional Neural Networks (CNNs), Recurrent Neural Networks (RNN), CNN-RNN hybrid networks, Feedforward Neural Networks (FNNs), Long Short-Term Memory (LSTM) ANNs etc.).

Furthermore, the AI models can include Multivariate Gaussian Models (MVGs), Decision Trees, Support Vector Machines (SVMs), Logistic Regressions, etc. In some embodiments, a higher number of data points (e.g., dimensions) can lead to more accurate and/or models that can produce higher levels of results. In this regard, the data cleansing and/or enhancing techniques as described with reference to FIGS. 5-13 can be utilized to improve the collected building data and/or the ingested building data used by the AI platform 506.

Figure 6:
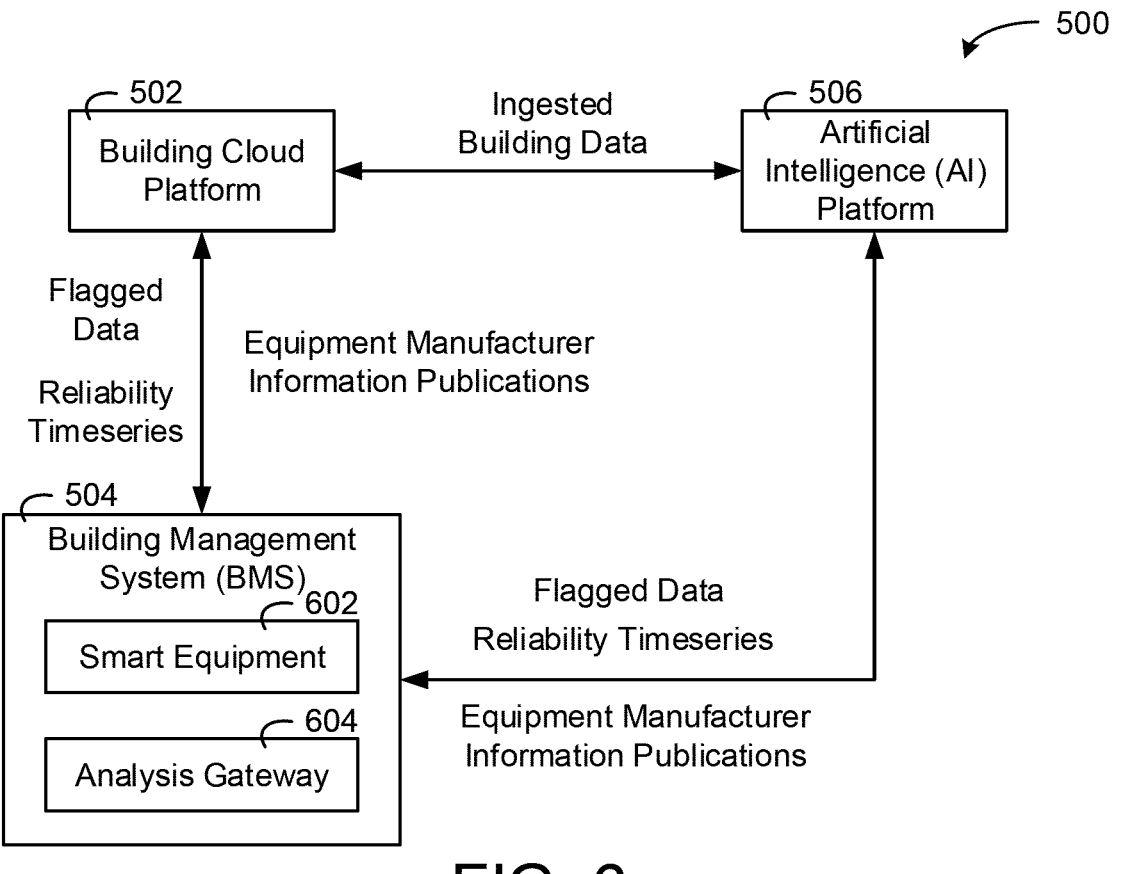
FIG. 6 is a block diagram of the system of FIG. 5 where the BMS includes smart equipment and an analysis gateway configured to flag collected data, generate reliability timeseries, and publish equipment manufacturer information, according to an exemplary embodiment.

Referring now to FIG. 6, the system 500 is shown with the BMS 504 including smart equipment 602 and an analysis gateway 604, according to an exemplary embodiment. The analysis gateway 604 is configured, in some embodiments, to add the published information to collected building equipment data before pushing the data to the AI platform 506. The smart equipment 602 and/or the analysis gateway 604 can be configured to generate and/or published enhanced data and communicate the enhanced data to the AI platform 506 for use in learning and/or generating models.

The enhanced data can be included flagged data, reliability timeseries, and/or equipment manufacturer information publications. In some embodiments, the smart equipment 602, which may be thermostats, controllers, actuators, air handler units (AHUs), boilers, or any of the equipment as described with reference to FIGS. 1-4, can be "smart equipment," equipment that includes processing circuits and/or network connections for processing collected building data collected by the smart equipment 602, generating the flagged data, the reliability timeseries, and/or publishing (e.g., communicating), the flagged data, the reliability timeseries, and/or the equipment manufacturer information, and communicating the information to the AI platform 506.

In some embodiments, the analysis gateway 604 adds the flagged data, reliability timeseries, and/or equipment manufacturer publications to collected data received from the smart equipment 5602 and publishes (e.g., communications) the enhanced data to the AI platform 506. For example, if the analysis gateway 604 provides a virtual timeseries and a first timeseries and a second timeseries to the analysis gateway 604, the analysis gateway 604 is configured to generate a reliability timeseries for the first timeseries and/or the second timeseries.

The analysis gateway 604 can further determine that the virtual timeseries is a calculation based timeseries determined from both the first time series and/or the second timeseries (e.g., current and voltage measurements used together to determine power measurements). In response to determining that the virtual timeseries is based on the first timeseries and the second timeseries, the analysis gateway 604 can determine a reliability timeseries from the reliability timeseries of the first timeseries and the second timeseries for the virtual timeseries. Virtual data points and virtual timeseries are described in greater reference in U.S. patent application Ser. No. 15/644,581 field Jul. 7, 2017, the entirety of which is incorporated by reference herein.

Figures 7, 8:
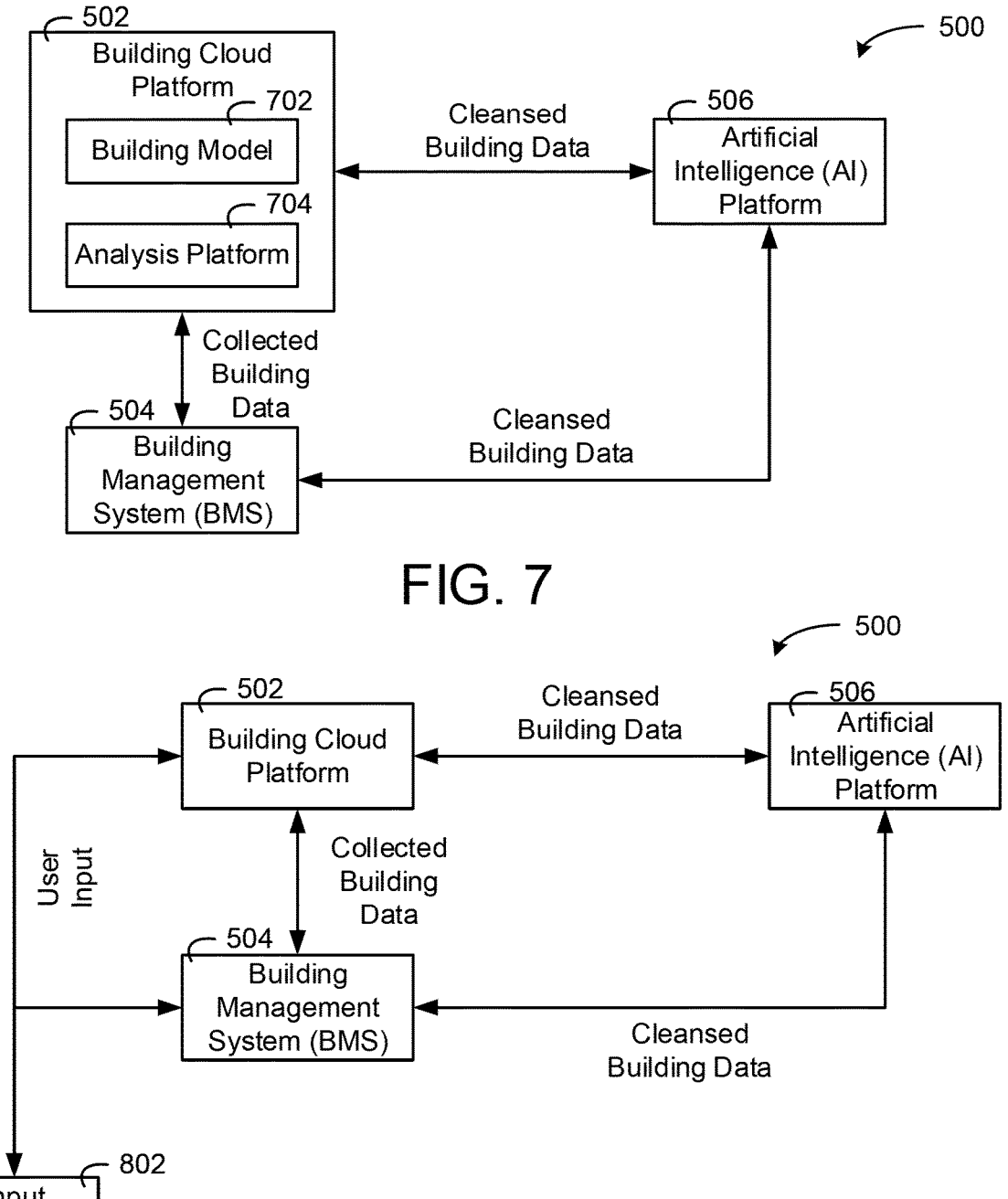
FIG. 7 is a block diagram of the system of FIG. 5 where the building cloud platform includes a building model and an analysis platform for cleansing building data and providing the cleansed building data to the AI platform, according to an exemplary embodiment.
FIG. 8 is a block diagram of the system of FIG. 5 where the system includes an input learning system for receiving user input and cleansing collected building data based on the user input, according to an exemplary embodiment.

Referring now to FIG. 7, the system 500 as described with reference to FIG. 5 is shown with the building cloud platform 502 including a building model 702 and an analysis platform 704, according to an exemplary embodiment. The analysis platform 704 can be configured to ingest and/or cleanse the collected building data received from the BMS 504 and provide cleansed building data to the AI platform 506. In some embodiments, the analysis platform 704 can perform various analysis techniques to identify whether data is reliable or unreliable and filter out unreliable data before providing the data to the AI platform 506. Furthermore, in some embodiments, the analysis platform 704 is configured to perform cleansing operations e.g., monitoring network traffic of the BMS 504 and improving timestamp data based on levels of network traffic in the BMS 504.

The analysis platform 704 can be configured to generate and/or maintain a building model 702. The building model 702 may be a "Smart Entity" graph-based building model representing entities and relationships. Furthermore, the building model 702 can be a BRICK building model. The building model 702 may be the same as and/or like the building models described withy reference to U.S. Provisional Application No. 62/751,926, filed Oct. 29, 2018 and U.S. patent application Ser. No. 16/048,052 filed Jul. 27, 2018, the entirety of both of which are incorporated by reference herein.

The analysis platform 704 can be configured to utilize the building model 702 to ingest the collected building data. However, in some embodiments, the relationships of equipment in the building model 702 (e.g., what thermostat controls what VAV unit), may be incorrect. In this regard, the analysis platform 704 can analyze the building model 702 and/or the collected building data and update the building model 702. Examples of determining proper relationships based on control decisions and measured conditions is described in greater detail in U.S. patent application Ser. No. 15/400,926 filed Jan. 6, 2017, the entirety of which is incorporated by reference herein.

Referring now to FIG. 8, the system 500 is shown including an input learning system 802, according to an exemplary embodiment. The input learning system 802 can be configured to utilize user input to improve the data cleansing operations of the BMS 504 and/or the building cloud platform 502. The input learning system 802 can be a user interface (UI) based learning system can be utilized to acquire user input to learn whether equipment is performing properly. In some embodiments, the learning system can provide the user input to the AI platform 506. Examples of such a learning system can be the "Ask Metasys Anything" (AMA) system.

In some embodiments, the building cloud platform 502 performs a virtual walkthrough of the BMS 504 to identify faulty equipment. The virtual walkthrough is described in greater detail with reference to FIG. 13. The UI based learning system, e.g., the input learning system 802, can be utilized to help perform virtual walkthroughs of buildings by providing input and/or output to a user 804. The input to the input learning system 802 can be used by the building cloud platform 502 is performing the virtual data walkthrough.

In some embodiments, the input learning system 802 can provide a user with indications of subsystems and/or performance data of each of the subsystems. The user can provide the input learning system 802 with indications e.g., "subsystem good," "equipment good," "setpoint in safe range," "data point reliable," etc. The input learning system 802 can utilize the user input to perform self-assessment and/or to learn to perform supervised machine learning. In some embodiments, the user input is provided directly to the BMS 504 and/or the smart equipment 604 which can perform a self-assessment based on the user input.

In some embodiments, the input learning system 802 is configured to attempt various settings, calibration values, etc. until a user indicates the equipment is performing appropriately. User approval of equipment and/or settings can be used in the AI platform 506 so that the AI platform 506 can place higher or low reliability on the equipment based on the user input. In some embodiments, the input learning system 802 may be a goal-based learning system, e.g., may have one or more goals and test settings or other configurations to achieve the goals. The goals may be constrained by physical bounds, goal weights, etc. In some embodiments, the input learning system 802 receives the physical bounds and/or goal weights via a user interface from a user.

Figure 9:
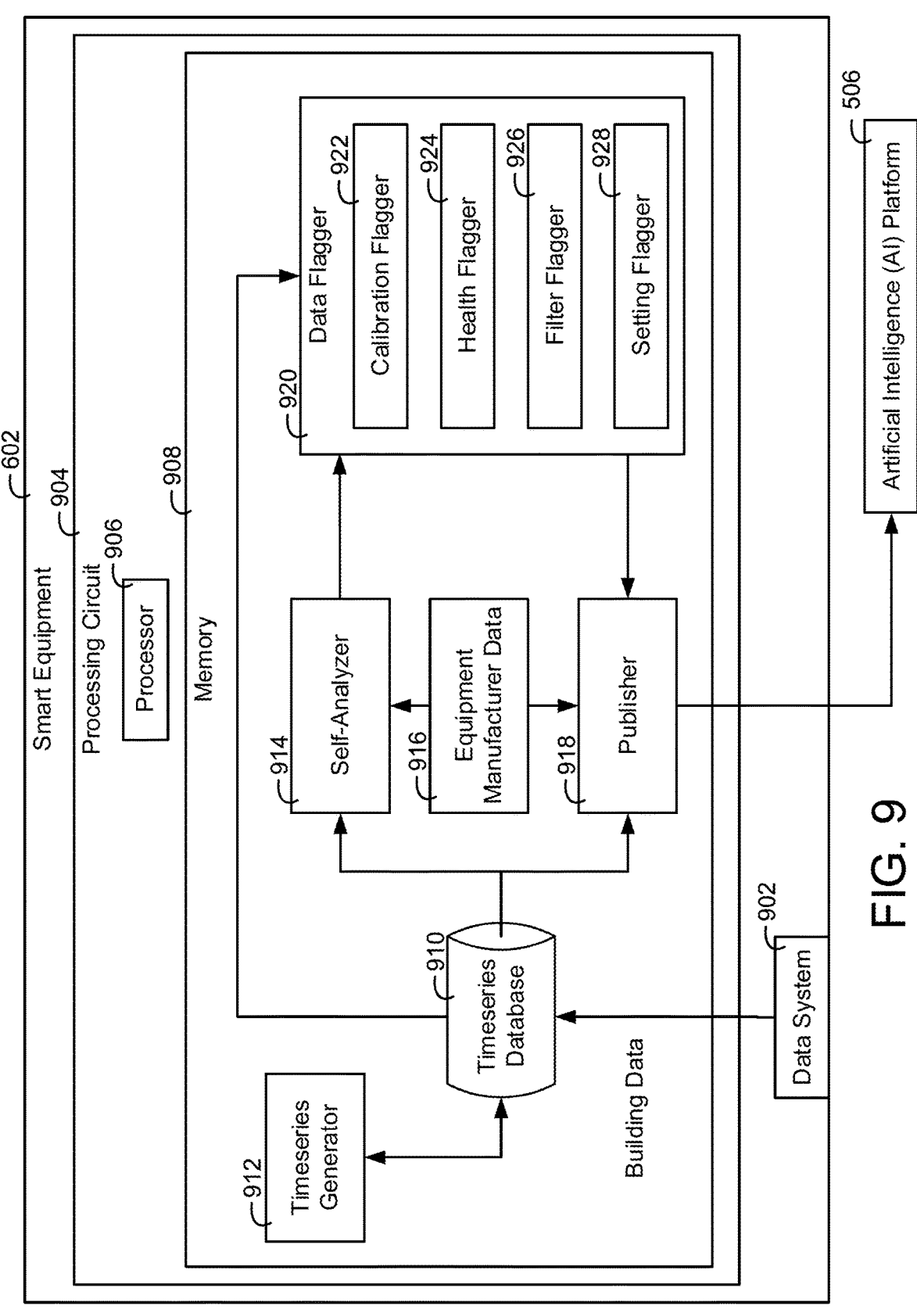
FIG. 9 is a block diagram illustrating the smart equipment of FIG. 6 in greater detail, according to an exemplary embodiment.

Referring now to FIG. 9, the smart equipment 602 is shown in greater detail, according to an exemplary embodiment. The smart equipment 602 is shown to include a processing circuit 904, the processing circuit 904 including a processor 906 and memory 908. The processing circuit 904, the processor 906, and the memory 908 can be the same as and/or like the processing circuit 404, the processor 406, and/or the memory 408 as described with reference to FIG. 4.

Indications such as flags, equipment information, reliability data points, etc. can be generated by the smart equipment 602 (e.g., on an equipment level) and provided to the AI platform 506 by the smart equipment 602. Flags may identify health information of the smart equipment 602 so that the AI platform 506 can train models based on a data point indicative of how reliable the data of the smart equipment 602 is.

The reliability data points may be data points for data timeseries that tracks how reliable certain data is, e.g., temperature of a thermostat may become more unreliable over time due to internal heating of the thermostat, a reliability timeseries may track this trend over time. The smart equipment 602 can further be configured to publish equipment manufacturer information. For example, indications such as equipment size, equipment capacity, equipment power consumptions, etc. can be utilized by the AI platform 506 to generate effective machine learning. In some embodiments, the AI platform 506 (or the smart equipment 602) can identify whether a health flag indicates a health level that is above a predefined amount (e.g., above 85%) and only utilize data of the equipment if the health level is above the predefined amount.

In some embodiments, the reliability data points may be based on data received from, or stored in, the equipment generating the corresponding measured data points that the reliability data points are generated for. For example, the data may include a defined confidence factor that is based on physical characteristics of the circuits and/or sensors used to measure the data points. The data may further include a Global Positioning System (GPS) location of the equipment based on a GPS of the equipment. Various areas of a country at various times of year may have different climates that are dynamic (during a transition from spring to summer) or static (during the winter), in areas of the country where the climates are static, data collected by the equipment may be more reliable than in areas of the country where at a particular time the climate is more dynamic. The reliability data points can be determined for the measured data points based on GPS location.

The data may include a length of time it has taken for a measured data point to change value. If the measured data point does not change value frequently, this may indicate a possibility that the equipment measuring the data point is malfunctioning; the reliability data points corresponding to the measured data point may indicate varying levels of reliability based on the length of time it has taken since the data point has last changed value. Furthermore, the data may include a data value change deviation, i.e., an amount by which data is changing from sample to sample. At times where the data point is changing drastically (i.e., greater than a predefined amount) this may indicate times where the reliability data points should indicate that the measured data point of the equipment is unreliable. However, if the changes are less than the predefined amount, this may indicate that the reliability data points should indicate that the measured data point of the equipment is likely reliable.

In some embodiments, the reliability data points are based on a comparison of measured data point values of multiple pieces of equipment. The equipment may be of similar type, measure data points of the same type, or be located in the same or similar locations (e.g., in the same area of the country, same type of building, etc.) For example, if the data points, when compared between multiple pieces of equipment are similar (e.g., are within predefined amounts from each other) this may indicate that the data points of the equipment are reliable and reliability data points can be generated indicating that the measured data points are reliable. However, if one data point of one piece of equipment deviates in value from an average measured data point value of the multiple pieces of equipment, a reliability data point for the data point of the equipment may be a value indicating that the data point of the one piece of equipment is likely unreliable. The amount by which the value of the data point of the one piece of equipment deviates from the multiple pieces of equipment may determine the value of the reliability data point for the measured data point of the one piece of equipment.

The smart equipment 602 is further shown to include a data system 902. The data system 902 can be a sensor and/or an actuator. The sensor can be a temperature sensor, a humidity sensor, a current sensor, a voltage sensor, etc. The actuator can be a relay, a motor, etc. The data system 902 can generate building data (e.g., settings, operational logs, environmental condition measurements, etc.) which can be converted into timeseries data.

The memory 908 is shown to include a timeseries database 910. The timeseries database 910 can be configured to store the building data collected from the data system 902. The memory 908 includes a timeseries generator 912. The timeseries generator 912 can be configured to convert the building data received from the data system 902 into data timeseries. In some embodiments, the timeseries generator 9012 can be configured to generate reliability timeseries for each of the data timeseries stored in the timeseries database 910. Furthermore, for data timeseries that are virtual, i.e., generated based on other timeseries, the timeseries generator 912 can generate a virtual reliability timeseries for the virtual timeseries, the reliability timeseries taking into account the reliability timeseries of other timeseries. When timeseries are combined to higher and higher levels of virtualization, the uncertainties of the timeseries compound.

In this regard, a reliability timeseries can allow the AI platform 506 to identify how reliable a data timeseries is.

The memory 908 is shown to include a data flagger 920. The data flagger 920 can analyze the building data and/or timeseries data of the timeseries database 910 and apply flags to the data. These equipment level data flags can be published by publisher 918 to the AI platform 506. The data flags can indicate the performance of the smart equipment 602 to help the AI platform 506 train AI models accurately, i.e., build accurate models based on the building data of the smart equipment 602.

The data flagger 920 includes a calibration flagger 922 configured to generate a calibration flag for the smart equipment 602. The calibration flag can be an indication when the equipment was last calibrated (e.g., date when last calibration, number of days since last calibrated, number of months since last calibrated, etc.) and/or whether the smart equipment 602 requires calibration. The AI platform 506 is configured to identify trends in calibration time periods to determine how reliable the data is for the AI platform 506 and/or whether the equipment requires calibration.

The data flagger 920 includes a health flagger 924. The health flagger 924 is configured to add a smart equipment health flag (e.g., a reliability metric, a healthy/unhealthy metric, a 0-100 reliability score) to data published by the publisher 918. The smart equipment 602 can perform a self-assessment via self-analyzer 914 (e.g., identify how well the equipment is being controlled and/or is performing), identify a score for the equipment, and publish the score for the AI platform 506 to consume and utilize in AI learning. In some embodiments, the AI platform 506 is configured to identify what data should be used or discarded from the AI learning based on the published health flag.

The data flagger 920 includes a filter flagger 926 which can generate a filter flag for the smart equipment 602. The setting flagger 928 is configured to identify whether filters have been setup in the equipment to handle transient noise (e.g., transients that occur when systems or equipment are starting or shutting down). The publisher 918 can publish the filter flag indicating whether a filter is present in the smart equipment 602 and/or has been configured. In some embodiments, the filter flag generated by the filter flagger 926 includes an indication of the parameters used in the filter.

The data flagger 920 includes a setting flagger 928 configured to generate a settings flag, in some embodiments. The setting flagger 928 is configured to determine whether the smart equipment 602 has an inappropriate setpoints (e.g., an unusually high or low value), in some embodiments. The data flagger 920 can include a flag indicating whether the setpoint for the equipment is normal or abnormal to help the AI platform 506 to identify how a system is being operated and/or whether the data generated by the system is reliable.

In some embodiments, setting flagger 928 is configured with various ranges and can determine the reliability settings within or outside the ranges for determining the settings flag flags. For example, the setting flagger 928 is configured to identify whether a setpoint is within a predefined range, whether a measured temperature is changing at a reliable rate by comparing a temperature change to a temperature change rate, etc. In some embodiments, setting flagger 928 determines how far from a nominal value (or a nominal range) is to determine a value for the setting flag.

The memory 908 includes the publisher 918. The publisher 918 is configured to publish information (e.g., the flags) received from the data flagger 920. The publisher 918 can, in some embodiments, make an endpoint available for the AI platform 506 to query. In some embodiments, the publisher 918 transmits the information to the AI platform 506 directly (e.g., pushes the information).

The "data cleansing features" of the smart equipment 602 can enable the smart equipment 602 to be AI ready, i.e., the data of the smart equipment 602 can be provided directly to the AI platform 506 without requiring any external system to analyze the data. Since the data cleansing features are built into the smart equipment 602, the features can be turned on or off based on whether an equipment owner pays for the cleansing features, e.g., the publisher 918 can activate the cleansing features and publish the information for cleansing or deactivate the features. In some embodiments, the smart equipment 602 is a chiller ready for optimization and/or AI that publishes information (e.g., flags) that can be utilized for high levels of accuracy in optimization and/or AI decision making.

In some embodiments, the smart equipment 602 (or a subsystem to which the smart equipment 602 belongs) includes multiple redundant sensors and/or communicates with nearby devices measuring the same conditions. The publisher 918 is configured to, in some embodiments, utilize the measurements of the redundant sensors to drive down uncertainty, e.g., perform averages of sensor measurements of redundant sensors.

The memory 908 includes self-analyzer 914, the self-analyzer 918 being configured to perform a self-analysis of the smart equipment 602, in some embodiments. In some embodiments, the self-analyzer 914 performs equipment level fault detection diagnostics (FDD) to determine whether the smart equipment 602 itself is healthy e.g., the same as and/or similar to the FDD layer 416. The self-analyzer 914 can generate a health metric and provide the metric to the health flagger 924 to publishing to the AI platform 506. The self-analyzer 918 is configured to, based on the building data and/or data timeseries of the timeseries database 910, identify what sensors of the smart equipment 602 is impacted by particular operations of the smart equipment 602. This indication of a link (e.g., indication of what sensors measure changes resulting from an operation) can be published by publisher 918 to the AI platform 506. In some embodiments, the self-analyzer 914 can identify whether sensors need to be replaced and/or whether new sensors should be added for the smart equipment 602.

The equipment manufacturer data 916 can be data describing the characteristics of the smart equipment 602. For example, physical dimensions, power ratings, time constants, and/or any other information for the smart equipment 602 that may be defined by a manufacturer of the smart equipment 602 can be stored as the equipment manufacturer data 916. In some embodiments, the self-analyzer 914 is configured to utilize the equipment manufacturer data 916 to perform a self-analysis. In some embodiments, the equipment manufacturer data 916 stored by the smart equipment 602 (or by another subsystem) is published to the AI platform 506 automatically and/or based on requests received from the AI platform 506 by the publisher 918 for use in AI training by the AI platform 506. In some embodiments, based on the equipment manufacturer data 916, the self-analyzer 914 is configured to perform self-analysis to determine what updates and/or service should be performed for the smart equipment 602.

Figure 10:
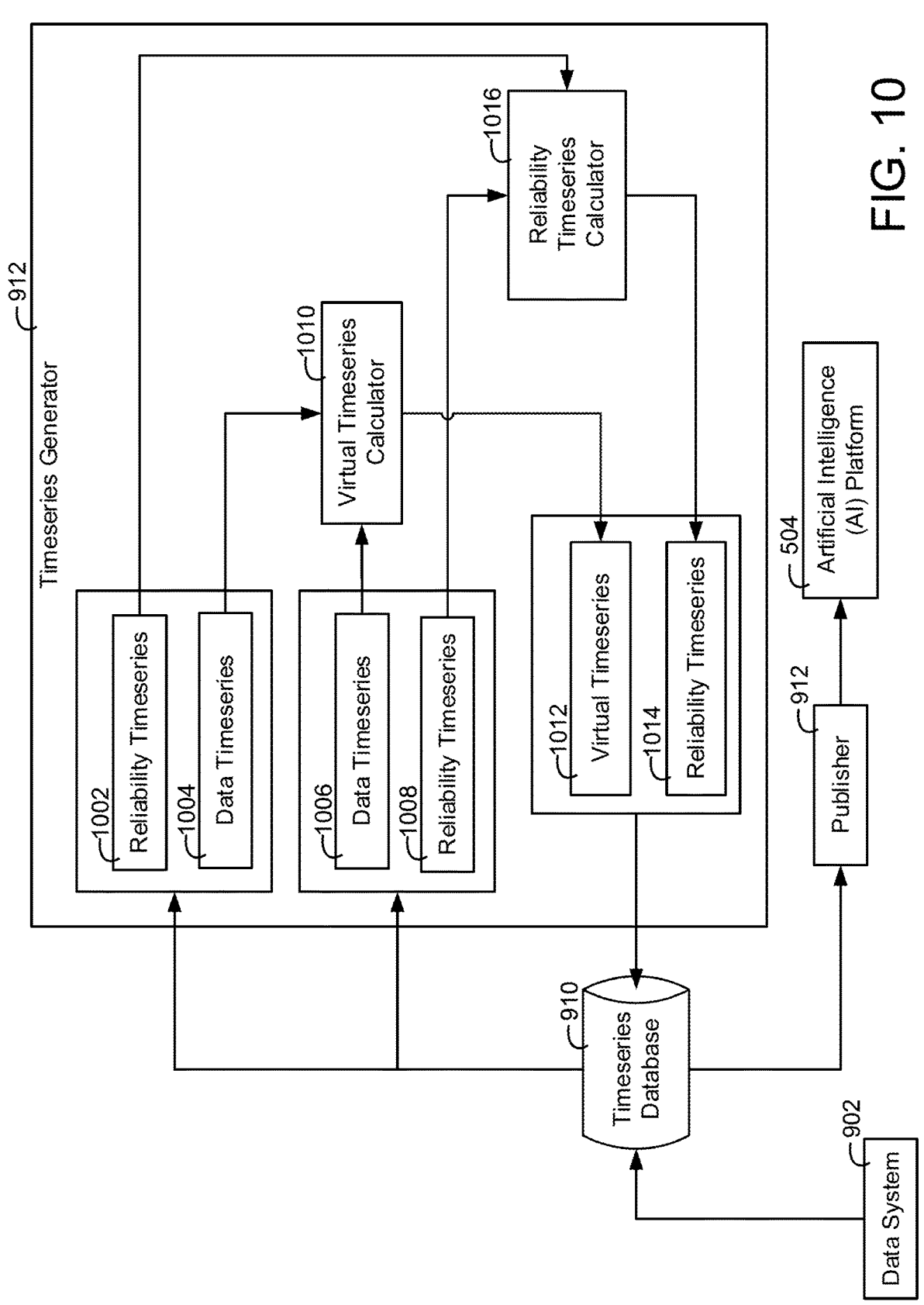
FIG. 10 is a block diagram of a timeseries generator that can be implemented by the smart equipment of FIG. 6 or the building cloud platform of FIG. 5 for generating a reliability timeseries, according to an exemplary embodiment.

Referring now to FIG. 10, the timeseries generator 912 and the timeseries database 910 of the smart equipment 602 as described with reference to FIG. 9 are shown in greater detail, according to an exemplary embodiment. Building systems can collect data of multiple points and utilize the point data to generate virtual points. However, as the points are virtualized to higher and higher levels, the uncertainty of the virtual point data increases i.e., the uncertainty of the timeseries is compounded. To remedy this uncertainty issue, each virtual point can be associated with a virtual "reliability" point. The virtual reliability point can be linked to the virtual point which it describes and provide an indication that AI can utilize to identify how reliable a particular virtual point is. The virtual reliability point can be associated with a virtual timeseries of discrete values of reliability of the virtual point.

While the timeseries generator 912 and the timeseries database 910 are described as being integrated within the smart equipment 602, the timeseries generator 912 and/or the timeseries database 910 can be implemented in the building cloud platform 502, the AI platform 506, and/or any other computing device as described herein.

The timeseries generator 912 is shown generating a virtual timeseries and a reliability timeseries based on two different timeseries. The timeseries generator 912 can, in some embodiments, generate a virtual timeseries based on any number of input timeseries. In some embodiments, the input timeseries are themselves virtual timeseries. In this regard, the virtual timeseries can be virtualized to one or multiple levels of virtualization. For example, current and voltage of multiple devices can be utilized to determine power consumption of multiple devices (a virtual point of a first level of virtualization). The power consumption of the multiple devices can be combined to determine a power consumption for an entire building (a virtual point of a second level of virtualization).

The timeseries generator 912 is configured to receive (e.g., retrieve) data timeseries 1004 and data timeseries 1006 from timeseries database 910. In some embodiments, the data timeseries 1004 and the data timeseries 1006 are associated with (linked to) reliability timeseries. In some embodiments, the timeseries generator 912 generates the reliability timeseries 1002 based on the data timeseries 1004 and the reliability timeseries 1008 based on the data timeseries 1006.

For example, the timeseries generator 912 can identify a level of uncertainty or noise in the data timeseries 1004 and generate the reliability timeseries 1002 based on the levels of uncertainty and/or noise. Furthermore, the timeseries generator 912 can be configured to store reliability data for the sensors used to collect the data timeseries 1004. For example, a particular temperature sensor may be accurate to one quarter degree Fahrenheit based on a published manufacturer datasheet. The timeseries generator 912 can store the manufacturer defined uncertainty and utilize the uncertainty in determining the data timeseries 1004.

The timeseries generator 912 includes a virtual timeseries calculator 1010. The virtual timeseries calculator 1010 can be configured to generate a virtual point and/or a virtual timeseries for the virtual point. The virtual timeseries calculator 1010 can receive the data timeseries 1004 and the data timeseries 1006 and generate the virtual timeseries 1012. The timeseries generator 912 is further shown to include a reliability timeseries calculator 1016. The reliability timeseries calculator 1016 is configured to generate the reliability timeseries 1004 based on the reliability timeseries 1002 and/or the reliability timeseries 1008. The reliability timeseries 1014 can indicate how reliable the virtual timeseries 1012 values are. Since the unreliability of the data timeseries 1004 and 1008 are compounded when used to generate the virtual timeseries 1012, the reliability timeseries calculator 1016 can determine the reliability timeseries 1014 based on the reliabilities of the data timeseries 004 and the data timeseries 1006 (e.g., the reliability timeseries 1002 and the reliability timeseries 1014).

The publisher 912 can receive and/or retrieve timeseries data from the timeseries database 910 and push the timeseries data to the AI platform 506. In some embodiments, the publisher 912 publishes each data timeseries or virtual timeseries with its corresponding reliability timeseries. For example, the publisher can form a data package including both a data timeseries and its reliability timeseries so that the AI platform 506 receiving the package can identify the correspondence between the data timeseries and the reliability timeseries.

Figure 11:
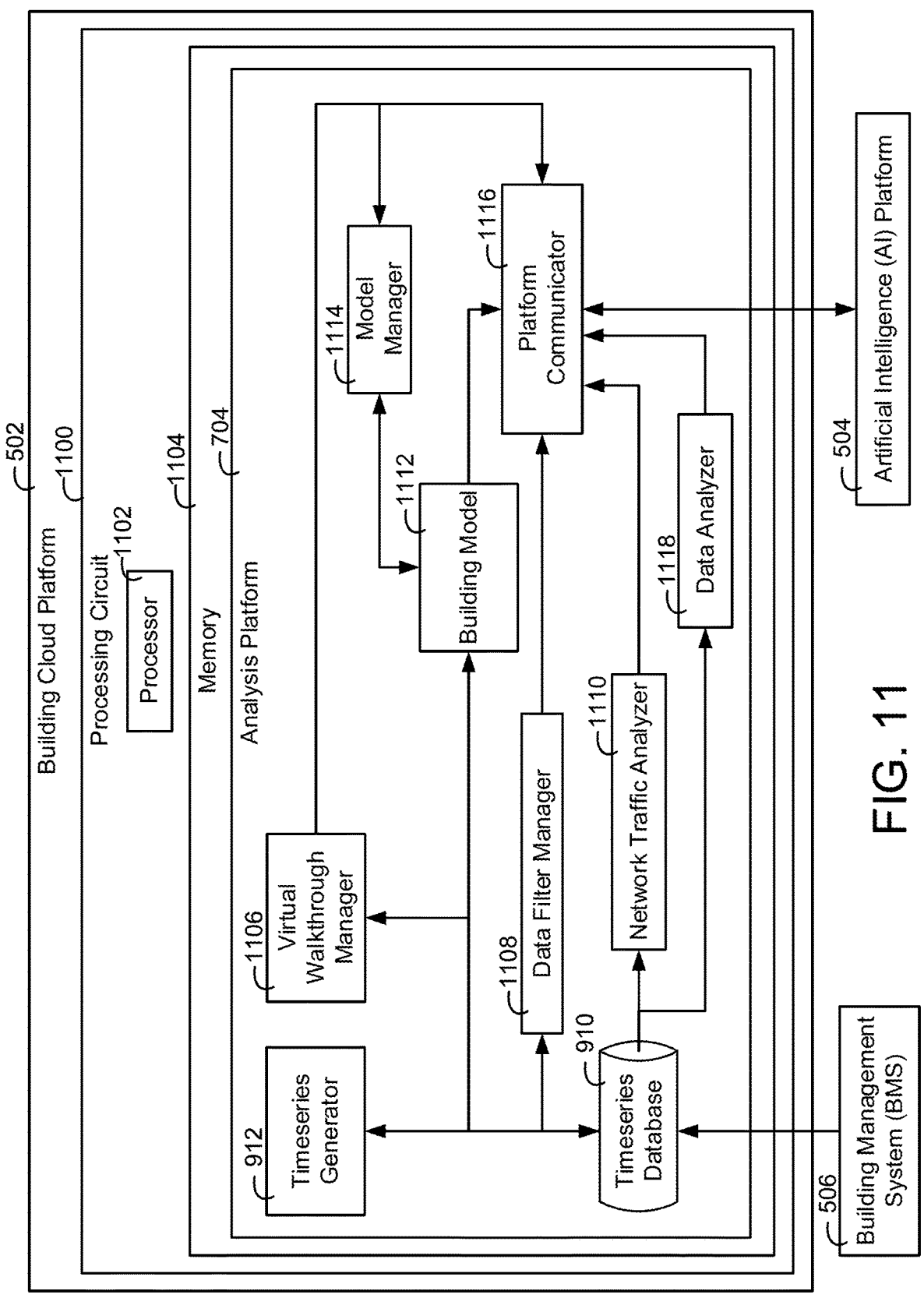
FIG. 11 is a block diagram illustrating the building cloud platform of FIG. 5 in greater detail, according to an exemplary embodiment.

Referring now to FIG. 11, the building cloud platform 502 is shown in greater detail, according to an exemplary embodiment. The building cloud platform 502 can be configured to cleanse and prepare data for the AI platform 506. Furthermore, the building cloud platform 502 can analyze and identify faulty equipment of the building management system 506. In some embodiments, the BMS 504 provides data to the analysis platform 704 which performs analysis and/or data cleansing before providing the equipment to the AI platform 506. Although the operations of the cloud platform 502 are performed by the analysis platform 704, in some embodiments, the operations of the analysis platform 704 are implemented in the smart equipment 602 and/or in the analysis gateway 604. In some embodiments, the analysis platform 704 is configured to digitize job data of buildings to aid in the performance of simulation and/or fault analysis.

The cloud platform 502 is shown to include a processing circuit 1100. The processing circuit 1100 includes a processor 1102 and a memory 1104. The processing circuit 1100, the processor 1102, and the memory 1104 can be the same as and/or similar to, the processing circuit 404, the processor 406, and/or the memory 408. The memory 1104 includes the analysis platform 704. The analysis platform 704 includes the timeseries database 910 and the timeseries generator 912. In this regard, the analysis platform 704 can perform the same reliability timeseries operations as described with reference to FIGS. 9-10. In this regard, rather than performing, or in addition to performing, the timeseries operations as described with reference to FIGS. 9-10 in the BMS 504, the timeseries operations can be performed by the analysis platform 704. The platform communicator 1116 can provide the data timeseries, the virtual timeseries, and/or the reliability timeseries of the timeseries database 910 to the AI platform 506.

The analysis platform 704 includes a network traffic analyzer 1110. The network traffic analyzer 1110 can be configured to analyze network traffic data received from the BMS 504. In some embodiments, the network traffic analyzer 1110 is configured to utilize network data to determine whether the collected data of the BMS system is reliable. High network traffic may indicate that data of the BMS 504 may be unreliable since the data may become corrupted, delayed, or in part lost in high network traffic situations. The network traffic analyzer 1110 is configured to adjust and/or determine reliability metrics for equipment and/or subsystems based on network traffic levels, in some embodiments.

In some embodiments, the network traffic analyzer 1110 can isolate and remove data of poorly performing equipment from being communicated to the AI platform 506. High bursts of data may be indicative of faulty performance. Data collected during a high level of network activity may be discarded. Such trends can be identified and flagged by the network traffic analyzer 1110. Data of faulty equipment identified by the network traffic analyzer 1110, the network traffic analyzer 1110 can prevent the data of the faulty equipment from being communicated to the AI platform 506. In some embodiments, the network traffic analyzer 1110 may allow the data to be transmitted by may mark the data as being potentially unreliable, allowing the AI platform 506 to weight the data used to train the models of the AI platform 506 appropriately.

In some embodiments, the analysis platform 704 is configured to identify whether networking equipment is being properly utilized. High traffic levels, performance data of network engines, etc. can be analyzed by the network traffic analyzer 1110 to determine whether the networking equipment is being operated effectively. The network traffic analyzer 1110 is configured to generate a report based on the network data, in some embodiments. The report may indicate whether networking settings should be updated and/or whether additional networking equipment should be added to a system. The report can be provided to an end user (e.g., via a user device) to help the user improve the performance of the BMS 504, resulting in higher quality BMS data for the AI platform 506 to analyze.

In some embodiments, the network traffic analyzer 1110 is configured to generate a network report indicating the performance of equipment and/or a building network. The report can include recommendations generated by the network traffic analyzer 1110. For example, the recommendations can be to upgrade the network and/or components of the network, add additional network trunks, etc.

The network traffic analyzer 1110 can be configured to determine whether timeseries data of the timeseries database 910 has timestamp errors based on an analysis of network traffic data of the BMS 504. In some case, if network traffic levels of network of the BMS 504 is higher than a predefined amount during a period of time, the data of the timeseries may be received out of order during that period. During normal network traffic levels, the building cloud platform 502 may store the data timeseries in the timeseries database 910 in the order that the data is received.

However, in response to determining that there are timestamp errors (e.g., high network traffic levels), the network traffic analyzer 1110 can be configured to analyze timestamps of the data of the timeseries database 910 received during the high network traffic level time periods and reorder the data based on the timeseries. If no timestamps are available, the network traffic analyzer 1110 may send a request to the BMS 504 to resend the data and overwrite the stored data of the timeseries database 910.

The analysis platform 704 includes a model manager 1114. The model manager 1114 is configured to generate and/or update the building model 1112. The model manager 1114 is configured to simulate building structures and/or equipment setups to identify faults and/or errors in building construction and/or equipment setup. The model manager 1114 is configured to generate results for improving the performance of the equipment based on the simulation and analysis. The results can be presented to a user via a user device.

In some embodiments, based on data collections, the model manager 1114 can generate and/or update equipment relationships of the building model 1112 (e.g., what equipment is located in what zone, what equipment controls conditions of what zone, etc.) In some embodiments, the model manager 1114 is configured to correct errors in algorithm setups and/or equipment/space relationships (e.g., BRICK models) by analyzing collected building data. The relationships can be provided by the model manager 1114 to the AI platform 506 for utilizing the correlations in machine learning.

In some embodiments, the data filter manager 1108 can be configured to filter data received from the BMS 504 and providing the filtered data to the AI platform 506. The data filter manager 1108 can be configured to perform machine learning and/or apply analysis rules to separate good data from bad data of the BMS 504 and remove bad data from training data pools before providing the data to the AI platform 506. The data filter manager 1108 can generate an indication to service equipment associated with the bad data.

In some embodiments, the data analyzer 1118 is configured to collect data of one or multiple building sites to quantify uncertainty levels for equipment, quantify ranges and/or capacities for equipment, identify uncertainty patterns, etc. In some embodiments, different patterns of uncertainties may indicate whether data should be utilized for AI or not. In some embodiments, the data analyzer 1118 is configured to quantify alarm quantities and/or alarm event frequencies to identify predicted equipment faulty performance.

The analysis platform 704 includes a virtual walkthrough manager 1106. The virtual walkthrough manager 1106 can be configured to collect building data for an entire building (or subsystems of a building) and utilize the data to identify whether the building is operating properly. The virtual walkthrough manager 1106 is configured to identify individual subsystems (e.g., heating subsystem, security subsystem, ventilation system, etc.). Based on data of the individual systems, the virtual walkthrough manager 1106 is configured to identify whether each of the subsystems are operating properly.

In response to determining that one of the subsystems is faulty, the faulty subsystem can be isolated and analyzed. Equipment of the isolated subsystem can be analyzed by the virtual walkthrough manager 1106, based on the data of the equipment, to identify equipment that is broken. Data of the faulty equipment can be excluded by the virtual walkthrough manager 1106 from being provided to the AI platform 506. Furthermore, the virtual walkthrough manager 1106 is configured to generate a report for an end user to review and properly service faulty equipment.

Figure 12:
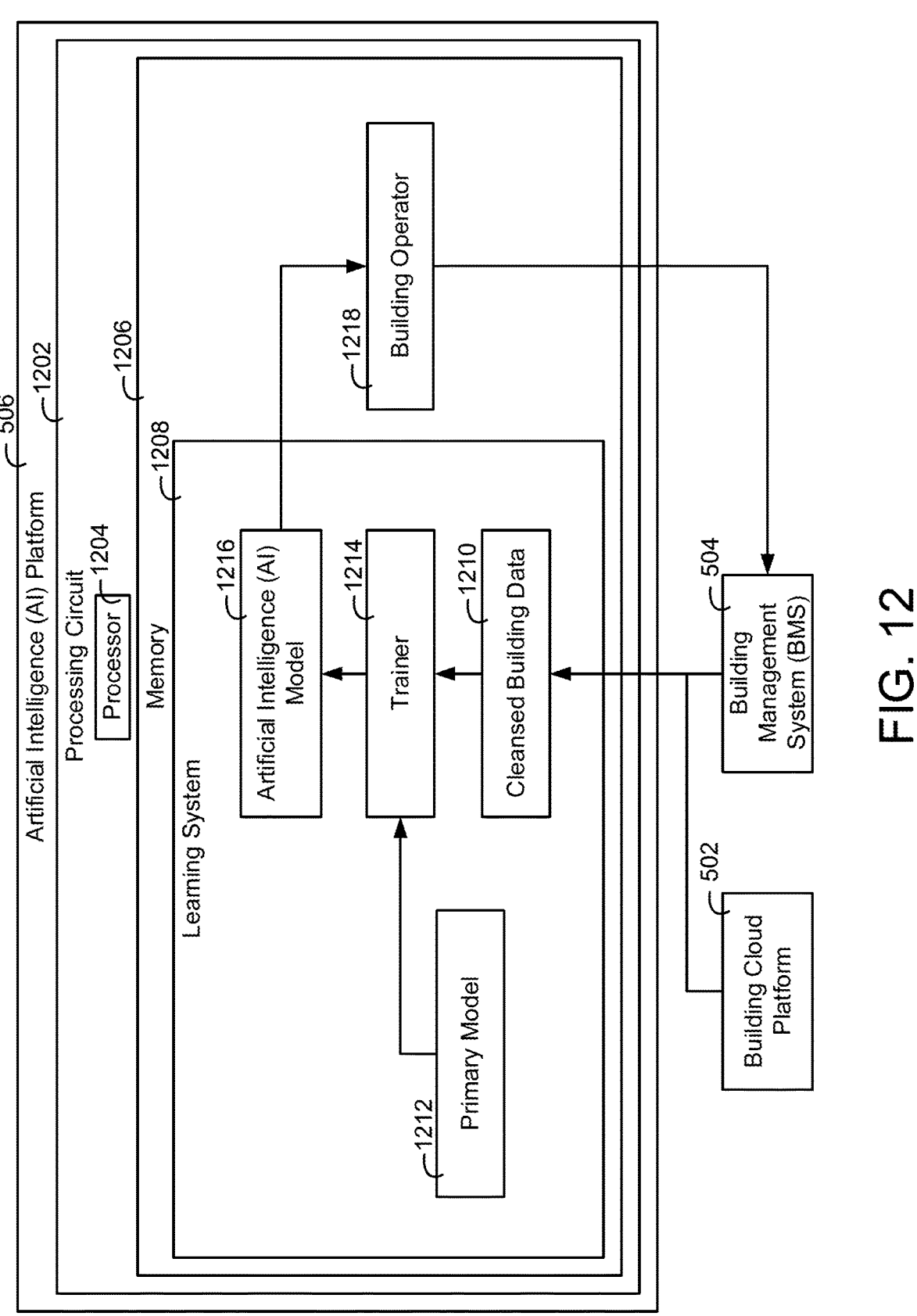
FIG. 12 is a block diagram illustrating the AI platform in greater detail, according to an exemplary embodiment.

Referring now to FIG. 12, the AI platform 506 is shown for utilizing building data cleansed, flagged, and/or otherwise improved to operate the BMS 504, according to an exemplary embodiment. The AI platform 506 is shown to include a processing circuit 1202, a processor 1204, and a memory 1206. The processing circuit 1202, the processor 1204, and the memory 1206 can be the same as, or similar to, the processing circuit 404, the processor 406, and the memory 408 as described with reference to FIG. 4.

The memory 1208 is shown to include a learning system 1208 for training AI models to perform building control operations. Artificial intelligence models that utilize highly reliable data can be used in systems where cascaded models are utilized. The learning system 1208 includes a primary model 1212. The primary model 1212 can be user defined. For example, an engineer can define the primary model 1212 based on historical knowledge. The primary model 1212 can model a piece of building equipment, a subsystem, and/or a building. The primary model 1212 may be based on known characteristics of the building equipment subsystem, and/or building and can be generated empirically, and/or can be based on theory.

The learning system 1208 is shown to include a trainer 1214. The trainer 1214 is configured to utilize cleansed building data 1210 received from the building cloud platform 502 and/or the BMS 504 to train an AI model 1216. In some embodiments, the trainer 1214 utilizes both the cleansed building data 1210 and the primary model 1212 together to generate the AI model 1216. This combination of a control models (e.g., the primary model 1212) combined with artificial intelligence models can be a form of "Graybox" learning where the AI model 1216 is seeded with known information, i.e., a primary model 1212. The learning system. The memory 1206 is shown to include a building operator 1218. The building operator can be configured to utilize the AI model 1216 to perform control, building learning, optimization, generate performance predictions, and/or generate analysis of the BMS 504 based on the AI model 1216.

In some embodiments, the building operator 1218 performs a graduated controls approach. The building operator 1218 may first being operating based on the primary model 1212 and monitor the performance of the AI model 1216 as the AI model 1216 is learned. In response to determining that the determinations of the AI model 1216 are accurate to a predefined level, the building operator 1218 can switch operation of the BMS 504 from being based on the primary model 1212 to the AI model 1216. For example, a new building may have a chiller, the primary model 1212 being a model for the chiller. The building operator 1218 can optimize the performance of the chiller with the primary model 1212 and utilize collected data of the chiller to train the AI model 1216. Once the AI model 1216 is reliable (e.g., is accurate based on the collected training data above a predefined amount), the building operator 1218 can begin optimizing the chiller based on the AI model 1216.

Referring now to FIG. 13, a flow diagram of a process 1300 of performing a virtual data walkthrough to identify faulty equipment is shown, according to an exemplary embodiment. In some embodiments, the process 1300 is performed by the building cloud platform 502 (e.g., by the virtual walkthrough manager 1106). Furthermore, the BMS 504 and/or the AI platform 506 can be configured to perform the process 1300.

The virtual data walkthrough process 1300 can be performed to collect building equipment operation data and analyze the operation data to identify faulty equipment. In some embodiments, the process 1300 is learned, i.e., the steps utilized in the walk through can be tuned over time to result in a high reliability virtual walkthrough. For example, the learning can be goal based, i.e., machine learning driven to create a machine learning based virtual data walkthrough.

In step 1302, a virtual data walkthrough of a building can be performed to collect building data. In some embodiments, the building cloud platform 502 performs the virtual data walkthrough. The building cloud platform 502 can exercise the BMS 504 to operate at a variety of settings. The data collected may be for the building entirely and can be the result of various building subsystems and/or equipment of the building subsystems operating. The virtual data walkthrough can utilize preconfigured data collectors to collect data and generate an audit result for building, subsystem, and/or equipment level fault identification. In some embodiments, the data collected by the building cloud platform 502 can include energy data of a distributed energy monitoring system for the building. The energy data can be utilized to generate the audit results for subsystem and equipment level fault identification.

In some embodiments, the building cloud platform 502 exercises the BMS 504 based on various scenarios, e.g., to achieve high temperatures, low temperatures, etc. In some embodiments, the exercise can cause the BMS 502 to operate at various different settings. The building cloud platform 502 can collect results of the process 1300 overtime and adjust how the exercise is performed to increase the reliability of the walkthrough. The walkthrough can be performed as a goal-based approach, in some embodiments. Physical bounds or goal weightings can be defined and utilized to exercise and/or analyze subsystems and/or equipment.

In step 1304, the building cloud platform 502 can find and identify subsystems of the building based on the collected building data of the step 1302. For example, the building cloud platform 502 can analyze various identifiers, characteristics, and/or other information of the building data collected in the step 1302 to generate a set of subsystems in the building.

In step 1306, the building cloud platform 502 can exercise the identified subsystems and collect subsystem specific data resulting from the exercise. The building cloud platform 502 can include specific settings for exercising the subsystems. In some embodiments, the settings can be learned and tuned over time based on AI.

In step 1308, the building cloud platform 502 can identify faulty subsystems based on the collected subsystem data of the step 1306. In some embodiments, the determination may be that a subsystem is operating properly based on subsystem level metrics. For example, an energy consumption metric for a particular subsystem may be above a predefined amount, indicating that the subsystem is not operating properly. Furthermore, for a heating or cooling subsystem, an ambient temperature may be outside a predefined range during the exercise, indicating that the heating or cooling subsystem is not operating properly.

In step 1310, the building cloud platform 502 identifies faulty equipment associated with the faulty subsystems determined in the step 1308 based on equipment data. In some embodiments, the building cloud platform 502 can analyze the building data to identify whether particular pieces of equipment are not operating properly. The building cloud platform 502 can analyze equipment level metrics, e.g., whether equipment data indicates proper performance of the equipment. In some embodiments, the analysis could be to determine whether a valve position has changed by less than a predefined amount over a time period, indicating that the valve may be stuck. In another embodiment, power consumption of a particular piece of building equipment can be analyzed to determine whether the equipment is operating properly. The building cloud platform 502 can, in some embodiments, determine data uncertainties (e.g., a reliability timeseries) and/or health scores for the equipment.

Referring generally to FIG. 13, the approach to performing cascaded fault analysis (e.g., subsystem fault analysis followed by fault analysis of equipment within the subsystem if the subsystem is identified as faulty) can be realized in cascades of varying sizes, e.g., city analysis, building analysis, subsystem analysis, equipment analysis, sensor analysis, etc. The identification of faulty subsystems or equipment can be performed by comparing field data or equipment states of different subsystems and/or equipment. For examples, large collections of historic data of multiple different buildings can be utilized for the faulty subsystem or equipment identification. In some embodiments, the historic data may be for similar building sites as the site under analysis. Tools and/or field engineering data can be used to identify similar sites.

Referring now to FIG. 14, a process 1400 of generating a time correlated reliability data stream for a data point that can be performed by the timeseries generator 912, according to an exemplary embodiment. In some embodiments, the process 1400 is performed by the timeseries generator 912, e.g., by the smart equipment 602 and/or the building cloud platform 502.

In step 1402, building device data of a building device can be collected for a data point where the building device data includes samples for the data point. In some embodiments, the building cloud platform 502 collects the building device data from the BMS 504 and ingests the building device data into the timeseries database 910 for the timeseries generator 912 to perform processing on. In some embodiments, the smart equipment 602 collects building device data from the data system 902 and ingests the building device data into the timeseries database 910 for the timeseries generator 912 to perform processing on.

In step 1404, the timeseries generator 912 generates a time correlated data stream for the data point, the time correlated data stream including the data samples for the data point. The time correlated data stream can be a timeseries data stream, e.g., the data timeseries 1004 and/or the data timeseries 1006. In some embodiments, the timeseries data stream includes multiple samples each associated with a timestamp indicating a particular time or data order. The time correlated data stream, in some embodiments, may be a vector, a column, a data table, a matrix, etc.

In step 1406, the timeseries generator 912 generates a time correlated reliability data stream for the data point, the time correlated reliability data stream including reliability values indicating reliability of the data samples of the data point. The reliability values can indicate the integrity of the data samples of the data point. For example, the reliability values can be standard deviations or error values indicating a measurement error. In some embodiments, the reliability values are based on a level of noise in the measurements. In some embodiments, the reliability values are based on the performance of the equipment collecting the data, for example if the equipment is operating improperly, i.e., has experienced a fault, the reliability values can be based on the presence of a fault, i.e., can change value according to a time that the fault occurs and/or a time that the fault is resolved.

In some embodiments, the reliability values are based on network performance of a building network. In some cases, the data values of the data point, when communicated across the network, can become corrupt. The reliability values may indicate the possibility of the data being corrupt and can be based on an analysis of a performance of the network, e.g., network load spikes, network usage, etc. The network analysis as described with reference to FIG. 11 and elsewhere herein can be utilized to determine values for the time correlated reliability data stream.

For example, if the reliability values are generated for a data point collected every hour and are may be a binary data stream "0, 0, 1, 1, 1, 0." This data stream may indicate that for the first two hours of operation of the building equipment no faults were present. For the third, fourth, and fifth hours, a fault may be present indicated by the "1." However, after the fifth hour, the fault may be resolved and in the sixth hour, the data stream returns to a value of "0." The data of the data point may be unreliable when the fault is present, i.e., the data may be corrupted or otherwise unreliable. The reliability values can provide an indication or warning of whether the data point is reliable.

In some embodiments, the reliability values are based on data point clustering. One or more data values for one or multiple variables may, when plotted, fall within various clusters or centroids. For example, for two variables the data points can be plotted in two dimensional space and for three variables the data points can be plotted in three dimensional space. The clusters may define various normal or abnormal equipment behaviors. When collected samples of the data point fall within the normal clusters, the reliability values can be set to indicate normal data. However, when the data samples fall outside of the clusters, the reliability values can be set to indicate abnormal data. In some embodiments, as data trends away from an established normal cluster, the data can be indicated as unreliable. However, after a period of time, if the data begins to form a new cluster, the data can be indicated as reliable. Data may move from one cluster to another new cluster based on effects of seasonality in the data. Examples of data clustering can be found in U.S. patent application Ser. No. 14/744,761 filed Jun. 19, 2015, the entirety of which is incorporated by reference herein. In some embodiments, artificial intelligence models, e.g., models of the AI platform 506 may only be trained and/or used to perform predictions on data that is indicated by the reliability values as being reliable.

In step 1408, the timeseries generator 912 generates a virtual time correlated data stream from at least the time correlated data stream of step 1404 for a virtual data point. Furthermore, the timeseries generator 912 generates a virtual reliability time correlated data stream indicating reliability of virtual values of the virtual time correlated data stream for the virtual data point.

For example, the time correlated data stream could be a raw data stream of temperature values collected for a space every five minutes. The virtual data point may be an hourly average temperature for the space. In this regard, the virtual time correlated data stream could be generated by averaging data samples of the time correlated data stream to generate an hourly data sample. Furthermore, the time correlated reliability data stream, which may have an associated reliability value for each data sample of the time correlated data stream, can be averaged over the same hours to generate virtual reliability values indicating the reliability values of each of the virtual hourly data samples. In some embodiments, for every hour window, the timeseries generator 912 could select a highest reliability value (e.g., select a value indicating a greater unreliability) from all of the reliability values of a particular hour.

In some embodiments, rather than the virtual time correlated data stream and the virtual reliability time correlated data stream being generated from a single time correlated data stream and a single time correlated reliability data stream, the virtual time correlated data stream and the virtual reliability time correlated data stream can be generate from multiple time correlated data streams and the reliability data streams of each of the multiple time correlated data streams. For example, a zone average temperature value could be a virtual data point. Two data streams for two zones may exist, each with an associated reliability data stream. The data points for the two zones can be averaged to generate a zone average temperature data stream. Furthermore, the reliability data streams can be combined, e.g., multiplied, added, selection of highest values performed, etc. to generate a reliability data stream for the zone average. The two reliability data streams can be combined to indicate a compounding effect of reliability when calculations are performed with the data samples of the data points.

Referring now to FIG. 15, a process 1500 of exercising a building entity and identifying performance issues of a building based on relationships between building entities of the building is shown, according to an exemplary embodiment. In some embodiments, the process 1500 is performed by the timeseries generator 912, e.g., by the virtual walkthrough manager 1106, e.g., by the building cloud platform 502. In this regard, the exercising and performance analysis can be performed in a centralized manner. In some embodiments, the building entity data generated based on the exercising and analyzed in the process 1500 is the performance flags described with reference to FIG. 9.

While the process 1500 is described as being performed by the building cloud platform 502, in some embodiments, the exercising the performance analysis is performed in a distributed manner across multiple building devices, e.g., in one or multiple pieces of smart equipment that same as or similar to the smart equipment 602. In some embodiments, the process 1500 is performed by a subsystem and various components of the subsystem are analyzed, e.g., an air handler unit or chiller system may test its various components. In some embodiments, the exercising and analysis is performed by multiple cognitive agents that can be implemented within the building cloud platform 502 or distributed across various pieces of building equipment. Agents are described in greater detail in U.S. patent application Ser. No. 16/533,493 filed Aug. 6, 2019 and U.S. patent application Ser. No. 16/533,499 filed Aug. 6, 2019, both of which are incorporated by reference herein in their entireties.

In step 1502, the building cloud platform 502 exercises a building entity cause the building entity data to be generated associated with the building entity, where the building entity data indicates performance of the building. The building entity may be a component of a building. For example, the building entity may be a piece of building equipment, e.g., an air handler unit. Exercising the building may include operating the air handler unit to operate at varying fan speeds, pressures, temperatures, etc. In this regard, performance data of the air handler unit can be collected for analysis in step 1504 by the building cloud platform 502. For example, various actuator positions can be recorded, various air pressures can be recorded, etc.

In some embodiments, the building entity may be a space of the building. For example, a room of the building may be a building entity. Exercising the room may include operating various pieces of building equipment associated with the room. For example, a variable air volume (VAV) unit associated with the room can be operated at varying damper positions. The damper positions and temperature measurements of a thermostat of the room can all be collected by the building cloud platform 502 in the step 1504.

In step 1506, the building cloud platform 502 identifies that the building is experiencing a performance issue by analyzing the building entity data. For example, the building cloud platform 502 may identify that when a furnace is exercised that should result in a temperature change in a variety of zones of a building, one of the zones does not change temperature appropriately. This indicates a performance issue which may be an equipment fault (a piece of equipment that has encountered a hardware or software failure), a user configuration fault (a piece of equipment has not been programmed with appropriate operating settings), a user related error (e.g., a user has put a bookshelf in front of a vent or disconnected a sensor from a wall), etc.

The performance issue may be a performance issue with the building entity itself. However, the performance issue may be related to sub-components of the building entity or equipment related to the building entity. For example, when the a zone cannot properly operate, data associated with a VAV unit of the zone should be analyzed. This may include exercising the particular VAV unit. In some embodiments, the exercising and analysis may be performed in steps moving from a greatest sphere of influence of a building entity (e.g., AHU) to building entities with progressively smaller spheres of influence, e.g., to a VAV unit.

In step 1508, the building cloud platform 502 can identify, based on a relational model, a second building entity related to the building entity. The relational model may indicate that operations of the second building entity impact the building entity. For example, after an AHU is analyzed (the building entity) a VAV related to the AHU (the second building entity) can be exercised to generate second building entity data and/or the second building entity data can be analyzed. In some embodiments, the relationships between the building entities may be indicated by a data structure stored and/or maintained by the building cloud platform 502, i.e., the relational model. The model may be the entity graph 2300 as described with reference to FIG. 23, the entity graph 2500 as described with reference to FIG. 25, the space graph database 3000 as described with reference to FIG. 30. As an example, referring to the entity graph 2500, if the building entity is an AHU, represented by the AHU entity 2502, the building cloud platform 1508 can identify the VAV (the second building entity) by identifying the relationship "feeds" between the AHU 2502 and the VAV entity 2504.

A similar identification could be performed with the space graph database 3000. For example, if the VAV box 3010 is the building entity and is experiencing a performance issue, performance of the thermostat 3006 could be analyzed to identify the performance issue. For example, the VAV box may not actually be experiencing a fault but rather the thermostat may be controlling the VAV improperly. The thermostat 3006 can be identified based on the relationships "hasActuationPoint" between the thermostat 3006 and the temperature setpoint 3008 and the relationships "controls" and "isOperatedBy" between the temperature setpoint 3008 and the VAV box 3010.

In step 1510, the building cloud platform 1510 identifies the performance issue by analyzing at least second building entity data of the second building entity. Based on the building entity data, the building cloud platform 1510 may only be able to identify that the performance issue exists. However, with the second building entity data, the building cloud platform 1510 can identify that performance issue, i.e., the performance issue can be pinpointed. For example, if a first zone is experiencing a performance issue, data of a second zone can be analyzed where temperature of the second zone has an influence on the first zone. The second zone may be associated with a heating device that is malfunctioning causing equipment of the first zone to experience issues meeting a temperature setpoint. Exercising a zone may include identifying equipment related to the zone and exercising the equipment.

Referring generally to the process 1500, in some embodiments, the process 1500 can be performed on a cloud server (e.g., the building cloud platform 502) based on data aggregated on the cloud server and control connections to local on-premises equipment. In some embodiments, the process 1500 can be performed by a local on-premises server that is located within the building and receives data from and operates equipment of the building. Furthermore, in some embodiments, the process 1500 can be performed within a gateway that aggregates data from building equipment and sends control commands to the building equipment. Furthermore, the analysis can be performed within equipment itself in some embodiments, for example, an AHU that tests its various sub-components.

While the process 1500 is described with one exercise, in some embodiments, the process 1500 is performed with multiple iterative exercises. Based on the result of each previous exercise, the performance issue can be identified. For example, if a building space is experiencing an issue that is fed by an AHU, first, the AHU may be exercised and data of the AHU analyzed. If the AHU is operating appropriately but the building space is not reaching the proper temperature, a VAV of the building space that is fed by the AHU can be exercised and the result of the exercise analyzed. Based on the performance results of exercising the VAV, the performance issue can be traced to the VAV. However, if the VAV is not experiencing the performance issue, a thermostat that operate the VAV can be exercised and analyzed. If the thermostat is operating improperly, the performance issue can be traced to the thermostat. However, if the thermostat is operating properly, the result of the analysis may be generation of an indicator that manual user review is required for identifying the performance issue of the zone.

In some embodiments, the iterative exercises can be performed based on a control algorithm hierarchy. For example, one or multiple control algorithms may exist for a building subsystem. The control algorithm may form a hierarchy of algorithms and the building cloud platform 502 can, in some embodiments, exercise each level of the hierarchy from the top level of the control algorithm hierarchy to the lowest level.

In some embodiments, the building cloud platform 502 performs exercises on multiple building entities iteratively based on a sphere of influence of each building entity. The sphere of influence. For example, the building cloud platform 502 can identify, based on the relational model, a building entity that influences other building entities, i.e., is related to the other building entities. For example, an AHU may influence operation multiple VAV boxes of a building. Similarly, a boiler may influence multiple water valves of a building. The building cloud platform 502 can start exercising the greatest influence building entity, analyze the results of the test, and then exercise and analyze the results of the building entities affected by the greatest influence building entity.

For example, the building cloud platform 502 can operate the AHU to change the duct pressure of a duct that multiple VAVs are connected to. The building cloud platform 502 can analyze the resulting operation of each VAV which operates a damper according to a flow setpoint and the sensed duct pressure that has been disturbed as part of the test. The flow disturbance may last under a minute (e.g., 30 to 60 seconds) but the VAVs may respond instantly to the disturbance. If one of the VAVs does not respond to the flow disturbance appropriately, the building cloud platform 502 can identify that VAV should be responding according to the relational model the failed performance indicates that additional exercises should be performed on that VAV (e.g., trying to operate a damper of the VAV and monitor a resulting temperature change of the zone). In some embodiments, based on which VAVs respond, the building cloud platform 502 can add new relationships to the relationship model. For example, if a VAV is not linked to an AHU yet when the AHU is exercised to disturb a duct pressure the VAV responds to the exercise, the building cloud platform 502 can add a relationship in the relationship model between the VAV and the AHU. A similar disturbance test can be performed for a boiler that disturbs a discharge temperature where each of multiple water valves respond to the disturbance.

Referring generally to FIG. 11 and FIGS. 21-30, the building cloud platform 502 can, in some embodiments, be integrated with and/or connected to the systems described with reference to FIGS. 21-30, e.g., the building management system 2100, the cloud building management platform 2120, etc. In some embodiments, the building cloud platform 502 can perform various data cleansing operations on data streams received from the BMS 504 via the DAGs of the DAG database 2330. In this regard, one or multiple data points, the BMS 504 can apply a DAG to cleanse timeseries data for the data point and generate a cleansed data timeseries, e.g., a virtual timeseries. The operations of the DAGs performed by the building cloud platform 502 can be filtering the timeseries data to remove anomalous data, removing correlations from data, interpolating or extrapolating data points where anomalous or no data exists, etc. In some embodiments, the building cloud platform 502 selects a DAG based on an indented use of the timeseries data. In some embodiments, the cleansing performed by the building cloud platform 502 is enabled or disabled by a user, i.e., a user indicates whether or not a cleansing DAG should be applied to a particular data stream.

Figure 16:
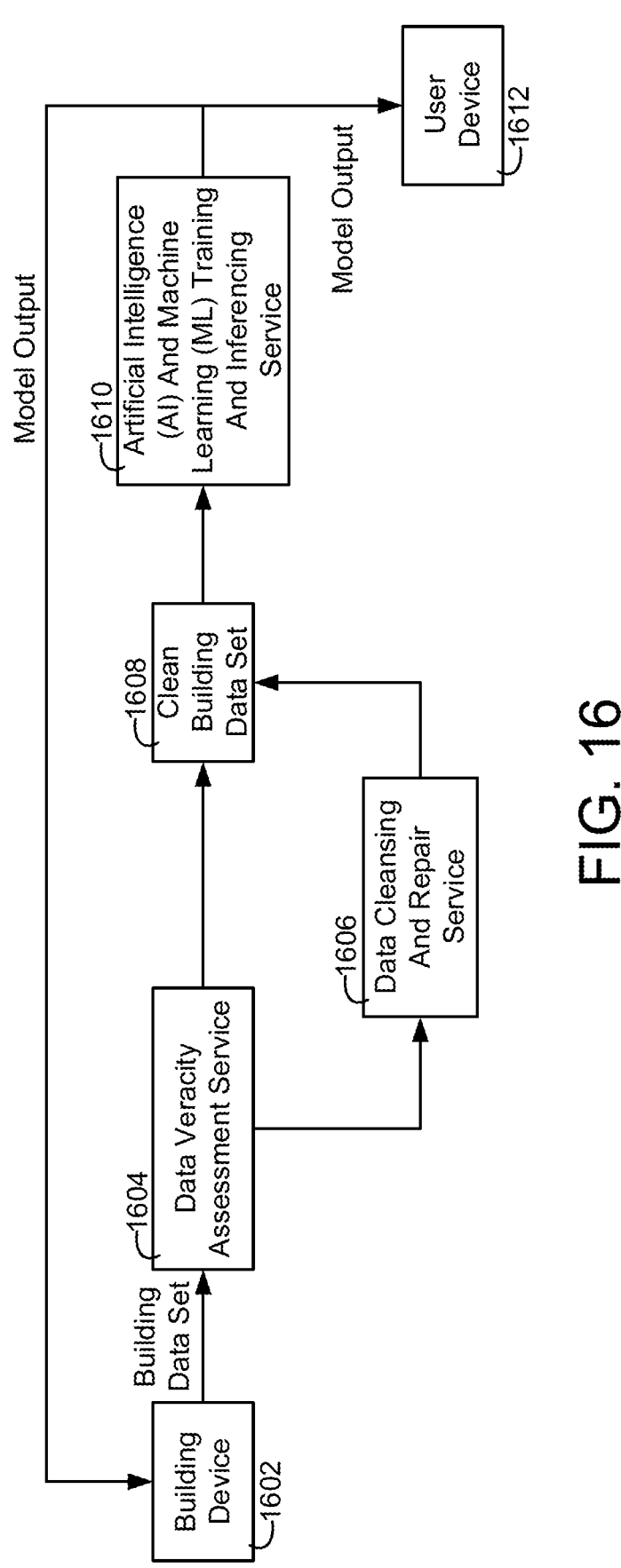
FIG. 16 is a block diagram of components for assessing data veracity that can be implemented by the building cloud platform of FIG. 5, according to an exemplary embodiment.

Referring now to FIG. 16, a system 1600 for assessing data veracity that can be implemented by the building cloud platform 502 of FIG. 5 is shown, according to an exemplary embodiment. Data veracity may be the degree to which data is accurate, precise, and trusted. If data veracity problems for a data set are corrected before the data set is ingested into a data pipeline for machine learning and/or artificial intelligence (ML/AI) (e.g., a pipeline where model training and inference is performed), accurate models can be developed (trained) and accurate solutions can be generated (predicted or inferred).

There may be two forms of data veracity problems, data quality and data trustworthiness. Data quality may be important for built environments (e.g., buildings, cities, etc.). Data sets that have data quality issues may be data sets with biases, anomalies, inconsistencies, duplications, volatility, etc. These features of a data set can be removed or corrected by a data cleansing and repair service 1606 of the system 1600 before the data set is ingested for use by ML/AI models. Furthermore, in some embodiments, a data veracity assessment service 1604 assesses data quality of a data set based on a problem to be solved with the data, i.e., a domain specific problem. For example, energy optimization, fault detection, etc. can each have an analysis that the service 1604 can apply to determine whether the data is of normal quality.

Data trustworthiness may be another data veracity problem. Data trustworthiness may be less important for a built environment since in a built environment such as a building, the trustworthiness of a data set may be high since the data sets may be collected by physical equipment of the building. Data trustworthiness may be related to a source of data (such as data originating from the Amazon Simple Notification Service SNS, social media (e.g., Facebook, Twitter, etc.) Data trustworthiness can be verified for a data set by the service 1604 by performing a truth discovery process, i.e., actively researching a data topic or data source to verify that the data has originated from the data source and is reliable.

The system 1600 includes a building device 1602. The building device 1602 can be any of the pieces of building equipment described with reference to FIGS. 1-4. In some embodiments, the building device 1602 is the BMS 504 or the smart equipment 602. The data that the building device 1602 generates can be building specific data sets of one or multiple variables. The data sets can include temperature data, humidity data, occupancy data, damper positions, duct pressures, valve positions, boiler temperatures, temperature setpoints, etc. The data sets can include both sensed environmental data, control parameters, and control decisions.

The building data sets of the building device 1602 can be provided to the service 1604. The service 1604 can be an independent platform with a processing circuit (e.g., processor and memory as described with reference to FIG. 4). In some embodiments, the service 1604 is a part of the building cloud platform 502. The service 1604 can be configured to apply an analysis to the building data set. The analysis may include applying an anomaly detection model that determines whether the data is of normal quality or is of abnormal quality. The service 1604 can be configured to train and/or apply one or more anomaly detection models to determine whether the building data set is of normal quality or abnormal quality. In some embodiments, the service 1604 is configured to apply a detection model based on the problem that the building data set will be applied for, i.e., apply one detection model if the building data set will be used for building load prediction and apply a different detection model if the building data set will be used for occupancy prediction.

If the building data set includes abnormal data, the data can be provide by the service 1604 to the service 1606. The service 1606 can be configured to apply one or more data cleansing and/or repair algorithms, e.g., applying noise reduction, data point replacement, data interpolation, data extrapolation, etc. The result of the cleansing and repair may be a clean building data set 1608. If the service 1604 determines that the building data set received from the building device 1602 is normal quality data, the service 1604 can mark the data as the building data set as the clean building data set 1608 and provide the clean building data set 1608 to an artificial intelligence (AI) and Machine Learning (ML) training and inference service 1610. The service 1610 can train one or more AWL models (e.g., artificial neural networks, Gaussian multivariate models, Bayesian networks, etc.) to generate a model output. The service 1610 can include all of the functionality of the AI platform 506 (e.g., train and implement the various models of the AI platform 506).

The model output can be a prediction, a new control setpoint for a piece of equipment, etc. The model output can be provided to a user device 1612 for review and/or provided to the building device 1602 for use in operation. For example, the model output may be an energy prediction for a week that a user may review via the user device 1612. In some embodiments, the model output may be a new damper position, fan speed, temperature setpoint, etc. that is provided to the building device 1602 and that the building device 1602 can be configured to operate with.

Figure 17A:
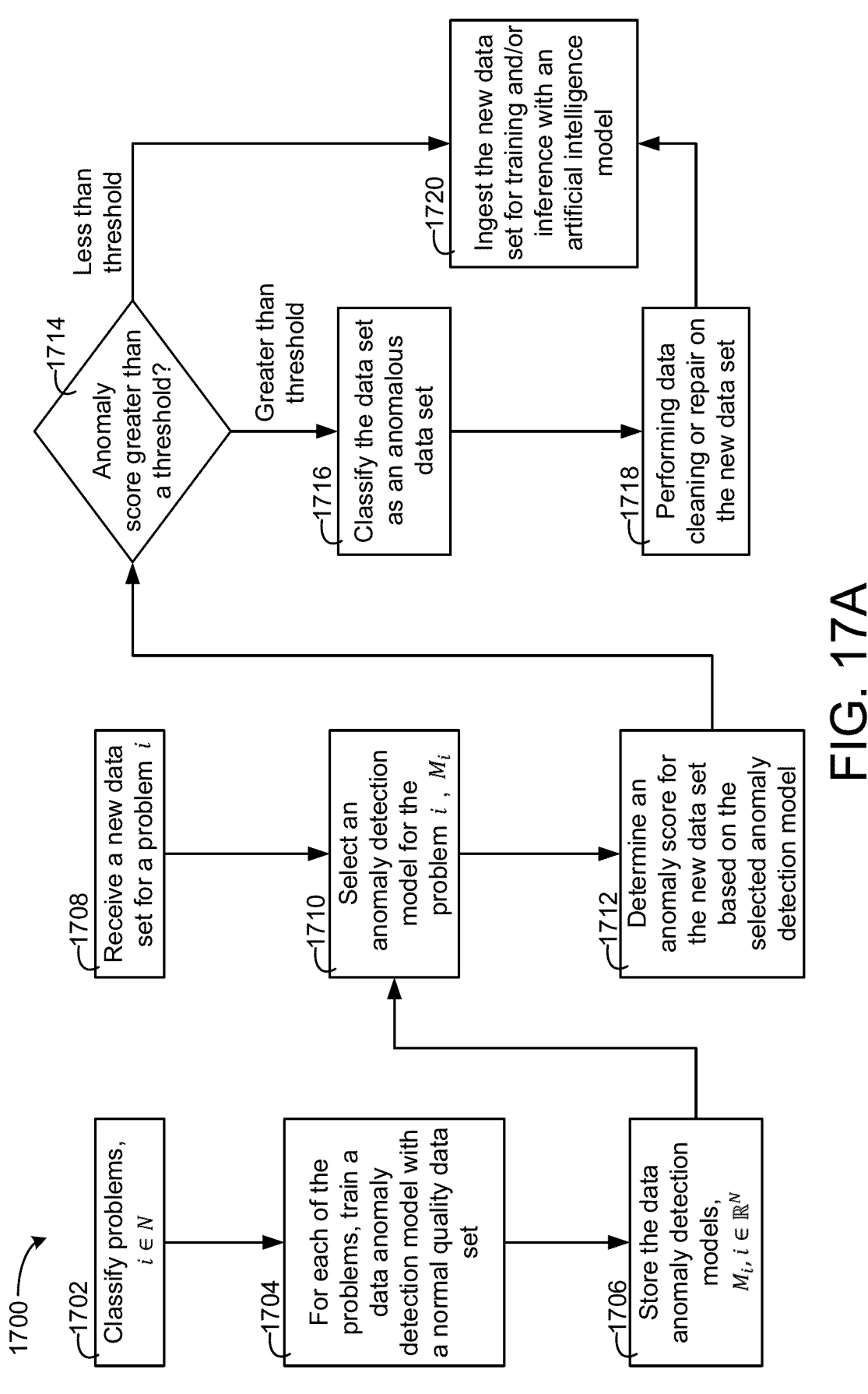
FIG. 17A is a flow diagram of a process of assessing data veracity that can be performed by the components of FIG. 16, according to an exemplary embodiment.

Referring now to FIG. 17A, a process 1700 of assessing data veracity that can be performed by the service 1604 and the service 1610 is shown, according to an exemplary embodiment. In some embodiments, the building cloud platform 502 and/or the AI platform 506 are configured to perform some or all of the process 1700. In some embodiments, the building cloud platform 502 analyzes and cleanses data according to the process 1700 before providing the cleansed data to the AI platform 506 for ingestion and operation.

In step 1702, the service 1604 can classify one or more problems, i∈N. The problems can be problems that the service 1610 applies an AWL model for. For example, energy optimization, equipment setpoint optimization, building load prediction, etc. can be problems that the service 1610 addresses. The service 1604 can generate a list of all of the problems that the service 1610 performs.

Figure 18:
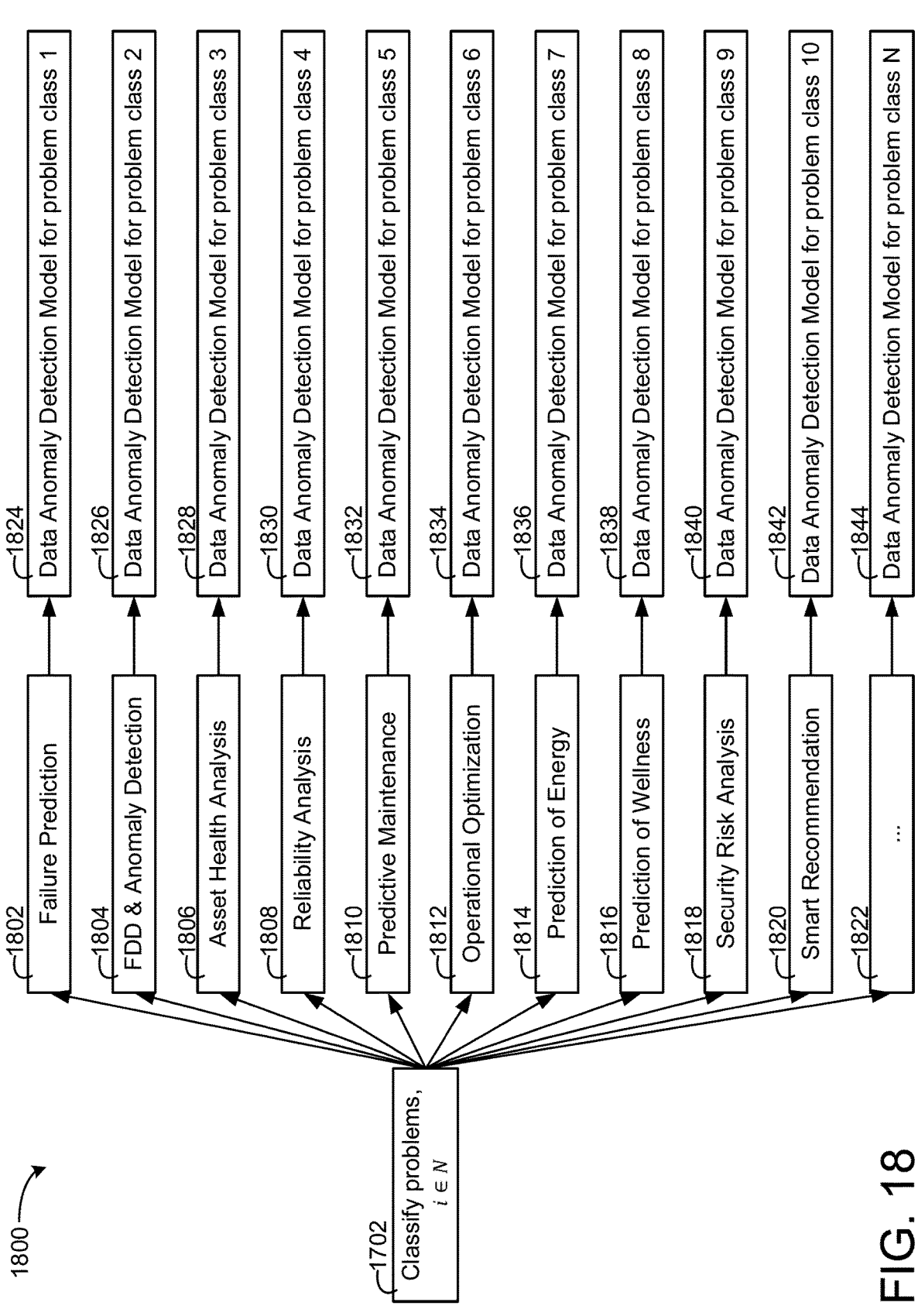
FIG. 18 is a diagram illustrating multiple artificial intelligence problems and data anomaly detection models for each of the problems, according to an exemplary embodiment.

Examples of the problems that can be performed by the service 1610 and added to the list are shown in FIG. 18.

In step 1704, for each of the problems classified in the step 1702, the service 1604 can, using normal quality data, i.e., good quality data, train an AI/ML model to capture relationships and evolution between variables for the problem. For example, if building load prediction is a problem and the load predictions are determined based on ambient weather measurements and building temperature setpoints, the data anomaly detection model can be trained with a good quality dataset of ambient weather measurements and building temperature setpoints. In some embodiments, relationships can be captured between variables by analyzing relationships between entities of an entity graph or space graph as described with reference to FIGS. 21-30. For example, if two pieces of building equipment are related via the graph, data points of those pieces of equipment may also be related as one piece of equipment may operate according to one data point and, when operating, may influence a data point of the other piece of equipment.

In this regard, for each problem class i, a trained anomaly detection model can be generated. The anomaly detection models can be Multivariate Gaussian MVG models, Autoenncoders (AEs), Variational Autoencoders (VAEs), etc. In step 1706, the service 1604 can store the anomaly detection models, $M_i$, $i \in \mathbb{R}^N$.

In step 1708, the service 1604 receives a new data set for a problem i. In step 1710, based on the problem for the new data set of the step 1708, the service 1604 can select one of the anomaly detection models stored in the step 1706 based on the problem, model M. For example, the new data set may be received along with an indicator of the problem that the service 1604 can utilize in selecting and retrieving the corresponding anomaly detection model.

In step 1712 the service 1604 can determine an anomaly score based on the selected anomaly detection model. The service 1604 can determine the anomaly score by inputting the new data set into the anomaly detection model. The score may be an anomalous likelihood probability. In step 1714, the service 1604 can compare the anomaly score determined in the step 1712 to a threshold. In some embodiments, the threshold is predefined. In some embodiments, the threshold is selected based on the particular problem. If the anomaly score is less than the threshold, the new data set may be a normal quality data set an, in step 1720, can be ingested into the service 1610 where the service 1610 can perform various machine learning or artificial intelligence analysis on the data.

If the anomaly score is greater than the threshold, the new data set can be classified as an anomalous data set (step 1716). The anomalous data set can be provided by the service 1604 to the service 1606 for data cleansing and/or repair. In step 1718, the service 1606 can cleanse and/or repair the data before providing the data to the service 1610 for ingestion e.g., the step 1720.

Figure 17B:
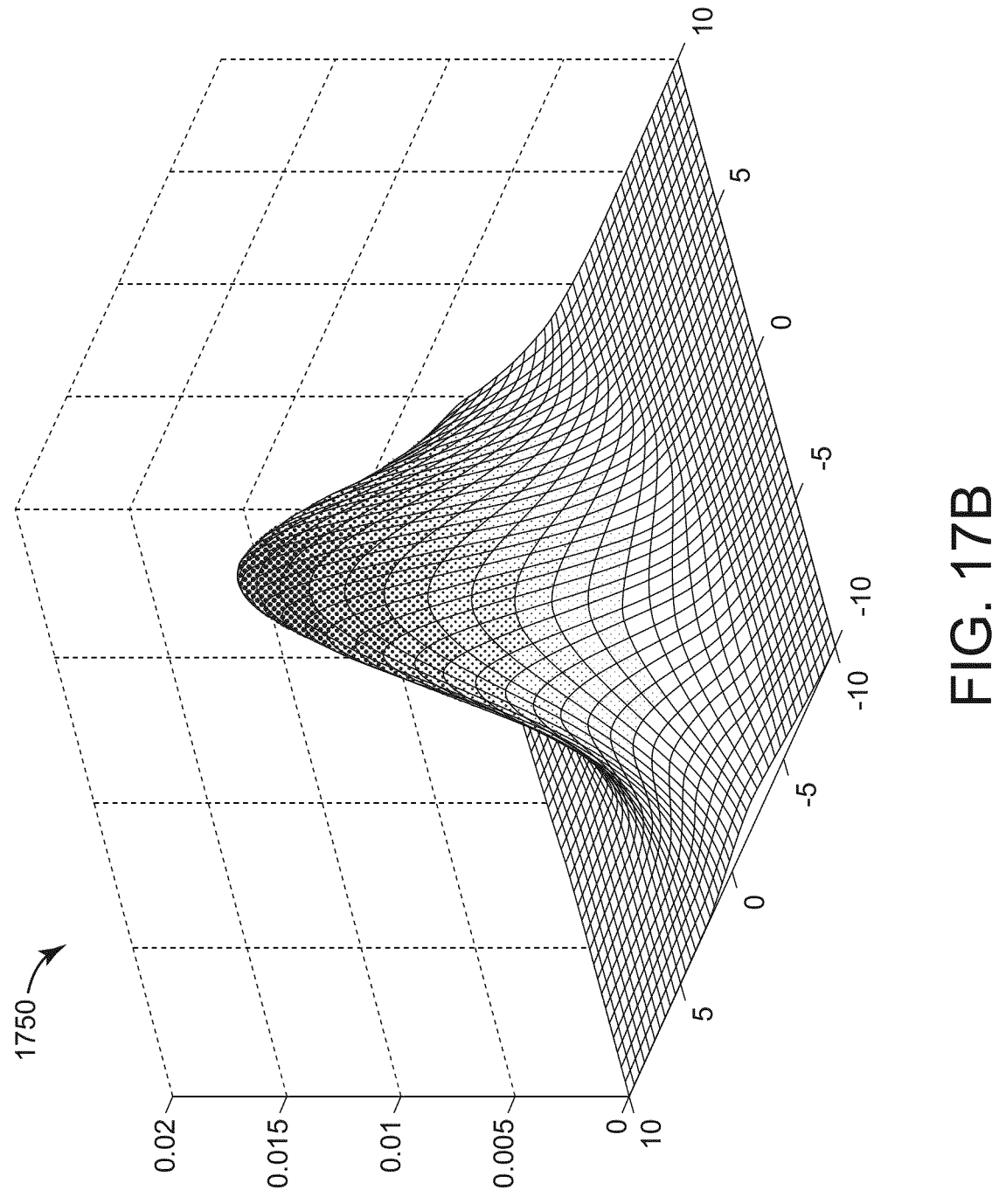
FIG. 17B is a chart of a multivariate Gaussian model for detecting anomalous data, according to an exemplary embodiment.

Referring now to FIG. 17B, is a chart 1750 of a multivariate Gaussian model for detecting anomalous data is shown, according to an exemplary embodiment. The chart 1750 indicates the analysis performed by a trained MVG model on a data set, e.g., the step 1712 of the process 1700. The distribution of the chart 1750 is focused in the middle. This may indicate that the data applied to the MVG model is normal quality data. If the distribution was less focused in the middle of the chart 1750 and more focused around the edges of the chart 1750, this may indicate that the data applied to the MVG model is anomalous and may suffer from a reliability issue requiring data cleansing and/or repair.

Referring now to FIG. 18, is a diagram 1800 illustrating multiple artificial intelligence problems and data anomaly detection models 1824-1844 for each of the problems, according to an exemplary embodiment. The step 1702 of the process 1700 as described with reference to FIG. 17A is shown. The step 1702, performed by the service 1604, classifies each of the problems 1802-1822. The problems 1802-1822 can be problems that the service 1610 applies models for. The problem 1802 can be a failure prediction model, e.g., predicting whether equipment will fail. The FDD & Anomaly detection problem 1804 can apply fault detection and diagnostics on building equipment. The service 1604 can generate and utilize one of the data anomaly detection models 1824-1844 for each of the problems 1802-1822.

The asset health analysis problem 1806 can include generating a health score for a piece of building equipment. The reliability analysis 1808 can include identifying reliability for a piece of building equipment. The predictive maintenance problem 1810 can include determining prescribed maintenance operations for a technician to perform. The operational optimization problem 1812 can include identifying energy savings setpoints or other operating parameters for building equipment. The prediction of energy problem 1814 may include predicting energy usage of various building devices, buildings, campuses, etc. The prediction of wellness building 1816 can include determine healthy of building occupants. The security risk analysis problem 1818 can include determining risk scores for building assets and analyzing activities of a building relating to building security. The smart recommendation problem 1820 can include generating recommendations for a building, e.g., productivity recommendations, travel recommendations, etc.

Figure 19:
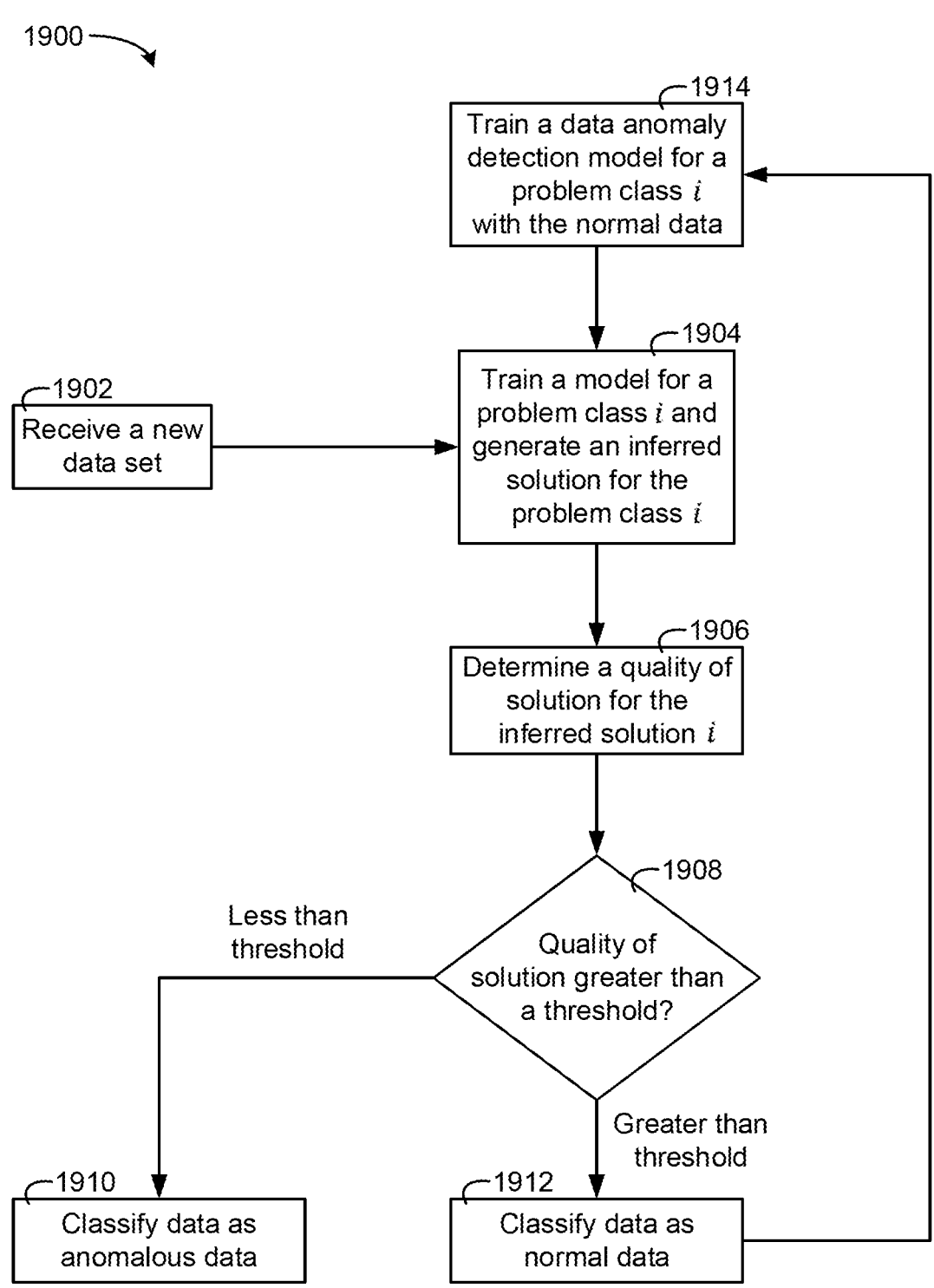
FIG. 19 is a flow diagram of a process of classifying data as anomalous or normal and training a data anomaly detection model that can be performed by the components of FIG. 16, according to an exemplary embodiment.

Referring now to FIG. 19, a process 1900 of classifying data as anomalous or normal and training a data anomaly detection model that can be performed by the components of system 1600 is shown, according to an exemplary embodiment. In some embodiments, the building cloud platform 502 and/or the AI platform 506 are configured to perform some or all of the process 1900.

In step 1902, service 1610 can receive a new data set. The new data set can be received directly from the building device 1602 or can be cleaned, i.e., the clean building data set 1608. In step 1904, service 1610 can train a model for a particular problem class and generate an inferred solution for the problem class.

In step 1906, the service 1610 can determine a quality of solution for the inferred solution of the step 1904. The quality of solution may indicate how well the model of the step 1904 performs. The performance of the model is indicative of whether the new data set of the step 1902 is normal quality data or suffers from a data quality issue. Examples of a quality of solution may be a prediction accuracy level, an indication of user feedback, calculated cost reduction (e.g., savings), etc. The quality of solution can be a metric.

In step 1908, the quality of solution determined in the step 1906 can be compared to a threshold by the service 1610. If the quality of solution is less than the threshold, the new data set can be labelled as an anomalous data set by the service 1610 in the step 1910. If the quality of solution is greater than the threshold, the new data set can be labelled as a normal data set by the service 1610 in the step 1912.

The new data set classified as normal data can be provided by the service 1610 to the service 1604. The service 1604 can, in step 1914, train an anomaly detection model for the problem of steps 1904-1916 based on the clean data. The trained detection model can be trained as described with reference to the process 1700 as described with reference to FIG. 17A. The trained detection model can be applied to additional new data sets and applied to the additional new data sets by the service 1604 before being input into the model of the step 1904.

Figure 20:
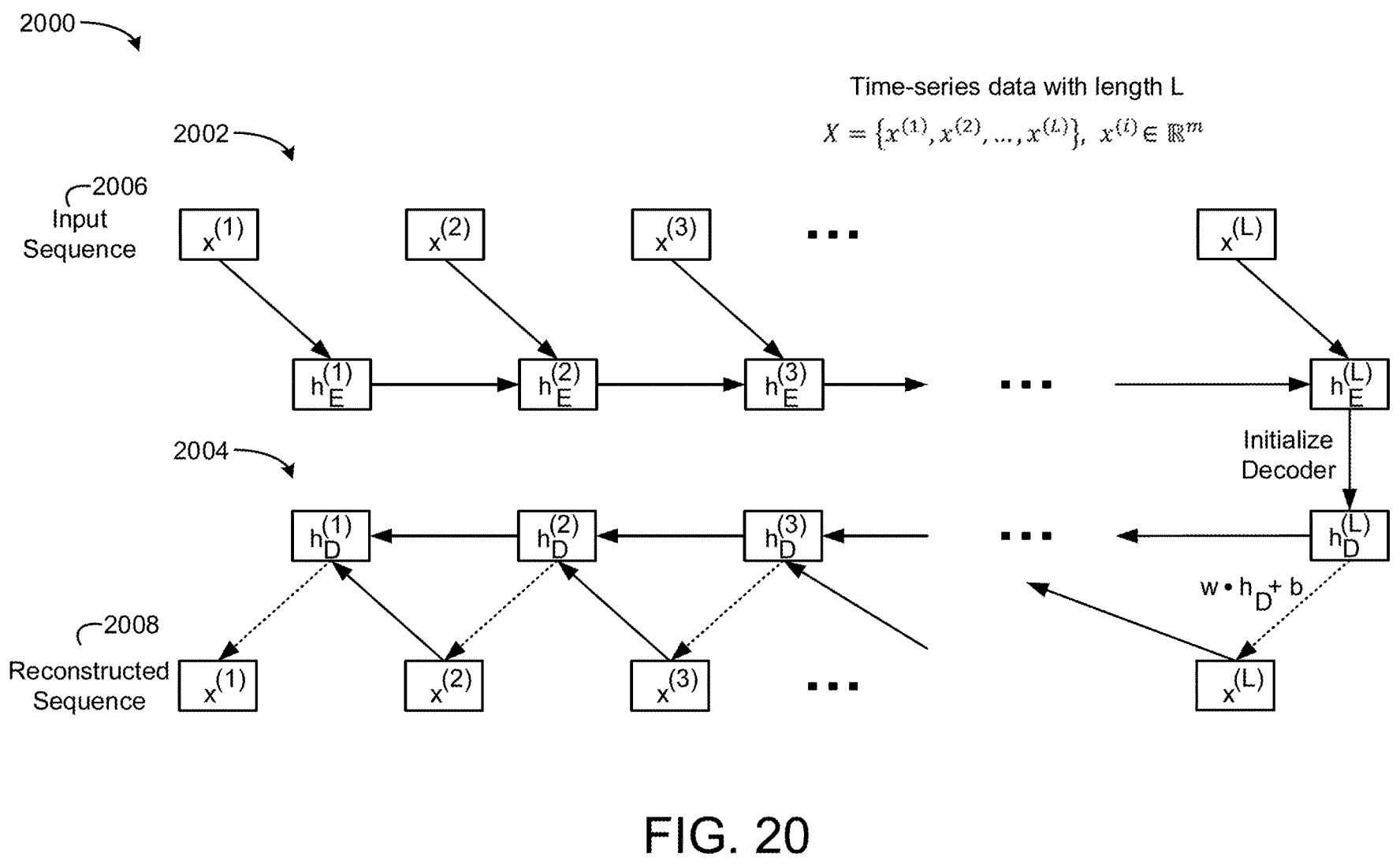

Referring now to FIG. 20, one of the data anomaly detection models of FIG. 18 is shown, where the data anomaly detection model is a long-short term memory (LSTM) model 2000, according to an exemplary embodiment. The LSTM model 2000 can include an encoder 2002 and a decoder 2004. The encoder 2002 is configured to transform incoming time-series data (e.g., data received in the step 1708), an input sequence 2006, into (reduced dimension) vector of internal state. The decoder 2004 is configured to convert the internal state into target time-series, the reconstructed sequence 2008.

The encoder-decoder combination can be optimized to minimize reconstruction error. The model 2000 capture the underlying probability distribution of non-anomalous (normal) data and be utilized to declare a new data set as anomalous if the new data set has a low likelihood probability of being normal data under the model 2000. The publication, "LSTM-based Encoder-Decoder for Multi-sensor Anomaly Detection", ICML 2016 to Malhotra et. al. describes LSTM models for anomaly detection in greater detail and is incorporated by reference herein in its entirety. Further details regarding LSTM models are described in U.S. patent application Ser. No. 16/549,037 field Aug. 23, 2019, the entirety of which is incorporated by reference herein.

Building Management System With Cloud Building Management Platform

Figure 21:
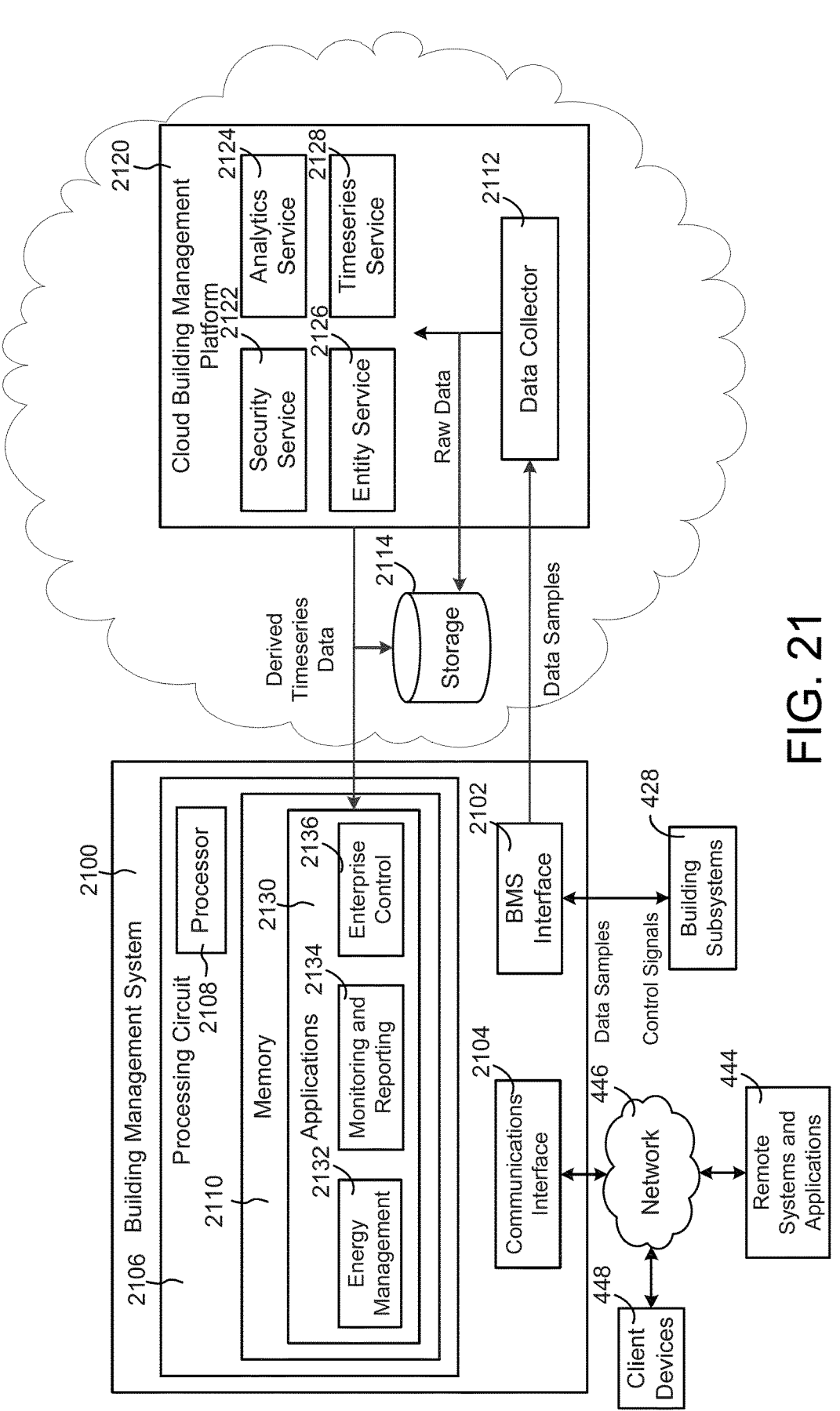
FIG. 21 is a block diagram of another building management system, according to an exemplary embodiment

Referring now to FIG. 21, a block diagram of another building management system (BMS) 2100 is shown, according to some embodiments. BMS 2100 can be configured to collect data samples from building subsystems 428 and provide the data samples to cloud building management platform 2120 to generate raw timeseries data, derived timeseries data, and/or entity data from the data samples. Cloud building management platform 2120 can process and transform the raw timeseries data to generate derived timeseries data. Throughout this disclosure, the term "derived timeseries data" is used to describe the result or output of a transformation or other timeseries processing operation performed by various services of the building management platform 2120 (e.g., data aggregation, data cleansing, virtual point calculation, etc.). The term "entity data" is used to describe the attributes of various smart entities (e.g., IoT systems, devices, components, sensors, and the like) and the relationships between the smart entities. The derived timeseries data can be provided to various applications 2130 and/or stored in storage 2114 (e.g., as materialized views of the raw timeseries data). In some embodiments, cloud building management platform 2120 separates data collection; data storage, retrieval, and analysis; and data visualization into three different layers. This allows cloud building management platform 2120 to support a variety of applications 2130 that use the derived timeseries data and allows new applications 2130 to reuse the existing infrastructure provided by cloud building management platform 2120.

It should be noted that the components of BMS 2100 and/or cloud building management platform 2120 can be integrated within a single device (e.g., a supervisory controller, a BMS controller, etc.) or distributed across multiple separate systems or devices. In other embodiments, some or all of the components of BMS 2100 and/or cloud building management platform 2120 can be implemented as part of a cloud-based computing system configured to receive and process data from one or more building management systems. In other embodiments, some or all of the components of BMS 2100 and/or cloud building management platform 2120 can be components of a subsystem level controller (e.g., a HVAC controller), a subplant controller, a device controller (e.g., AHU controller 330, a chiller controller, etc.), a field controller, a computer workstation, a client device, or any other system or device that receives and processes data from building systems and equipment.

BMS 2100 can include many of the same components as BMS 400, as described with reference to FIG. 4. For example, BMS 2100 is shown to include a BMS interface 2102 and a communications interface 2104. Interfaces 602-604 can include wired or wireless communications interfaces (e.g., jacks, antennas, transmitters, receivers, transceivers, wire terminals, etc.) for conducting data communications with building subsystems 428 or other external systems or devices. Communications conducted via interfaces 2104 and 2102 can be direct (e.g., local wired or wireless communications) or via a communications network 446 (e.g., a WAN, the Internet, a cellular network, etc.).

Communications interface 2104 can facilitate communications between BMS 2100 and external applications (e.g., remote systems and applications 444) for allowing user control, monitoring, and adjustment to BMS 2100. Communications interface 2104 can also facilitate communications between BMS 2100 and client devices 448. BMS interface 2102 can facilitate communications between BMS 2100 and building subsystems 428. BMS 2100 can be configured to communicate with building subsystems 428 using any of a variety of building automation systems protocols (e.g., BACnet, Modbus, ADX, etc.). In some embodiments, BMS 2100 receives data samples from building subsystems 428 and provides control signals to building subsystems 428 via BMS interface 2102.

Building subsystems 428 can include building electrical subsystem 434, information communication technology (ICT) subsystem 436, security subsystem 438, HVAC subsystem 440, lighting subsystem 442, lift/escalators subsystem 432, and/or fire safety subsystem 430, as described with reference to FIG. 4. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 300 and/or airside system 400, as described with reference to FIGS. 3-4. Each of building subsystems 428 can include any number of devices, controllers, and connections for completing its individual functions and control activities. Building subsystems 428 can include building equipment (e.g., sensors, air handling units, chillers, pumps, valves, etc.) configured to monitor and control a building condition such as temperature, humidity, airflow, etc.

Still referring to FIG. 21, BMS 2100 is shown to include a processing circuit 2106 including a processor 2108 and memory 2110. Cloud building management platform 2120 may include one or more processing circuits including one or more processors and memory. Each of the processor can be a general purpose or specific purpose processor, an application specific integrated circuit (ASIC), one or more field programmable gate arrays (FPGAs), a group of processing components, or other suitable processing components. Each of the processors is configured to execute computer code or instructions stored in memory or received from other computer readable media (e.g., CDROM, network storage, a remote server, etc.).

Memory can include one or more devices (e.g., memory units, memory devices, storage devices, etc.) for storing data and/or computer code for completing and/or facilitating the various processes described in the present disclosure. Memory can include random access memory (RAM), read-only memory (ROM), hard drive storage, temporary storage, non-volatile memory, flash memory, optical memory, or any other suitable memory for storing software objects and/or computer instructions. Memory can include database components, object code components, script components, or any other type of information structure for supporting the various activities and information structures described in the present disclosure. Memory can be communicably connected to the processors via the processing circuits and can include computer code for executing (e.g., by processor 508) one or more processes described herein.

Still referring to FIG. 21, cloud building management platform 2120 is shown to include a data collector 2112. Data collector 2112 is shown receiving data samples from building subsystems 428 via BMS interface 2102. However, the present disclosure is not limited thereto, and the data collector 2112 may receive the data samples directly from the building subsystems 428 (e.g., via network 446 or via any suitable method). In some embodiments, the data samples include data values for various data points. The data values can be measured or calculated values, depending on the type of data point. For example, a data point received from a temperature sensor can include a measured data value indicating a temperature measured by the temperature sensor. A data point received from a chiller controller can include a calculated data value indicating a calculated efficiency of the chiller. Data collector 2112 can receive data samples from multiple different devices (e.g., IoT devices, sensors, etc.) within building subsystems 428.

The data samples can include one or more attributes that describe or characterize the corresponding data points. For example, the data samples can include a name attribute defining a point name or ID (e.g., "B1F4R2. T-Z"), a device attribute indicating a type of device from which the data samples is received (e.g., temperature sensor, humidity sensor, chiller, etc.), a unit attribute defining a unit of measure associated with the data value (e.g., ° F., ° C., kPA, etc.), and/or any other attribute that describes the corresponding data point or provides contextual information regarding the data point. The types of attributes included in each data point can depend on the communications protocol used to send the data samples to BMS 2100 and/or cloud building management platform 2120. For example, data samples received via the ADX protocol or BACnet protocol can include a variety of descriptive attributes along with the data value, whereas data samples received via the Modbus protocol may include a lesser number of attributes (e.g., only the data value without any corresponding attributes).

In some embodiments, each data sample is received with a timestamp indicating a time at which the corresponding data value was measured or calculated. In other embodiments, data collector 2112 adds timestamps to the data samples based on the times at which the data samples are received. Data collector 2112 can generate raw timeseries data for each of the data points for which data samples are received. Each timeseries can include a series of data values for the same data point and a timestamp for each of the data values. For example, a timeseries for a data point provided by a temperature sensor can include a series of temperature values measured by the temperature sensor and the corresponding times at which the temperature values were measured. An example of a timeseries which can be generated by data collector 2112 is as follows:

$$[<\text{key},\text{timestamp}_1,\text{value}_1>,<\text{key},\text{timestamp}_2,\text{value}_2>,$$
$$<\text{key},\text{timestamp}_3,\text{value}_3>]$$

where key is an identifier of the source of the raw data samples (e.g., timeseries ID, sensor ID, device ID, etc.), $\text{timestamp}_i$ identifies the time at which the ith sample was collected, and $\text{value}_i$ indicates the value of the ith sample. The time correlated data series as described with reference to FIG. 14 may be in the above timeseries format.

Data collector 2112 can add timestamps to the data samples or modify existing timestamps such that each data sample includes a local timestamp. Each local timestamp indicates the local time at which the corresponding data sample was measured or collected and can include an offset relative to universal time. The local timestamp indicates the local time at the location the data point was measured at the time of measurement. The offset indicates the difference between the local time and a universal time (e.g., the time at the international date line). For example, a data sample collected in a time zone that is six hours behind universal time can include a local timestamp (e.g., Timestamp=2016-03-18T14: 10: 02) and an offset indicating that the local timestamp is six hours behind universal time (e.g., Offset=−6: 00). The offset can be adjusted (e.g., +1: 00 or −1: 00) depending on whether the time zone is in daylight savings time when the data sample is measured or collected.

The combination of the local timestamp and the offset provides a unique timestamp across daylight saving time boundaries. This allows an application using the timeseries data to display the timeseries data in local time without first converting from universal time. The combination of the local timestamp and the offset also provides enough information to convert the local timestamp to universal time without needing to look up a schedule of when daylight savings time occurs. For example, the offset can be subtracted from the local timestamp to generate a universal time value that corresponds to the local timestamp without referencing an external database and without requiring any other information.

In some embodiments, data collector 2112 organizes the raw timeseries data. Data collector 2112 can identify a system or device associated with each of the data points. For example, data collector 2112 can associate a data point with a temperature sensor, an air handler, a chiller, or any other type of system or device. In some embodiments, a data entity may be created for the data point, in which case, the data collector 2112 (e.g., via entity service) can associate the data point with the data entity. In various embodiments, data collector uses the name of the data point, a range of values of the data point, statistical characteristics of the data point, or other attributes of the data point to identify a particular system or device associated with the data point. Data collector 2112 can then determine how that system or device relates to the other systems or devices in the building site from entity data. For example, data collector 2112 can determine that the identified system or device is part of a larger system (e.g., a HVAC system) or serves a particular space (e.g., a particular building, a room or zone of the building, etc.) from the entity data. In some embodiments, data collector 512 uses or retrieves an entity graph (e.g., via entity service 2126) when organizing the timeseries data.

Data collector 2112 can provide the raw timeseries data to the services of cloud building management platform 2120 and/or store the raw timeseries data in storage 2114. Storage 2114 may be internal storage or external storage. For example, storage 2114 can be internal storage with relation to cloud building management platform 2120 and/or BMS 2100, and/or may include a remote database, cloud-based data hosting, or other remote data storage. Storage 2114 can be configured to store the raw timeseries data obtained by data collector 2112, the derived timeseries data generated by cloud building management platform 2120, and/or directed acyclic graphs (DAGs) used by cloud building management platform 2120 to process the timeseries data.

Still referring to FIG. 21, cloud building management platform 2120 can receive the raw timeseries data from data collector 2112 and/or retrieve the raw timeseries data from storage 2114. Cloud building management platform 2120 can include a variety of services configured to analyze, process, and transform the raw timeseries data. For example, cloud building management platform 2120 is shown to include a security service 2122, an analytics service 2124, an entity service 2126, and a timeseries service 2128. Security service 2122 can assign security attributes to the raw timeseries data to ensure that the timeseries data are only accessible to authorized individuals, systems, or applications. Security service 2122 may include a messaging layer to exchange secure messages with the entity service 2126. In some embodiment, security service 2122 may provide permission data to entity service 2126 so that entity service 2126 can determine the types of entity data that can be accessed by a particular entity or device. Entity service 2126 can assign entity information (or entity data) to the timeseries data to associate data points with a particular system, device, or space. Timeseries service 2128 and analytics service 2124 can apply various transformations, operations, or other functions to the raw timeseries data to generate derived timeseries data.

In some embodiments, timeseries service 2128 aggregates predefined intervals of the raw timeseries data (e.g., quarter-hourly intervals, hourly intervals, daily intervals, monthly intervals, etc.) to generate new derived timeseries of the aggregated values. These derived timeseries can be referred to as "data rollups" since they are condensed versions of the raw timeseries data. The data rollups generated by timeseries service 2128 provide an efficient mechanism for applications 2130 to query the timeseries data. For example, applications 2130 can construct visualizations of the timeseries data (e.g., charts, graphs, etc.) using the pre-aggregated data rollups instead of the raw timeseries data. This allows applications 2130 to simply retrieve and present the pre-aggregated data rollups without requiring applications 2130 to perform an aggregation in response to the query. Since the data rollups are pre-aggregated, applications 2130 can present the data rollups quickly and efficiently without requiring additional processing at query time to generate aggregated timeseries values.

In some embodiments, timeseries service 2128 calculates virtual points based on the raw timeseries data and/or the derived timeseries data. Virtual points can be calculated by applying any of a variety of mathematical operations (e.g., addition, subtraction, multiplication, division, etc.) or functions (e.g., average value, maximum value, minimum value, thermodynamic functions, linear functions, nonlinear functions, etc.) to the actual data points represented by the timeseries data. For example, timeseries service 2128 can calculate a virtual data point (pointID$_3$) by adding two or more actual data points (pointID$_1$ and pointID$_2$) (e.g., pointID$_3$=pointID$_1$+pointID$_2$). As another example, timeseries service 2128 can calculate an enthalpy data point (pointID$_4$) based on a measured temperature data point (pointID$_5$) and a measured pressure data point (pointID$_6$) (e.g., pointID$_4$=enthalpy(pointID$_5$, pointID$_6$)). The virtual data points can be stored as derived timeseries data.

Applications 2130 can access and use the virtual data points in the same manner as the actual data points. Applications 2130 may not need to know whether a data point is an actual data point or a virtual data point since both types of data points can be stored as derived timeseries data and can be handled in the same manner by applications 2130. In some embodiments, the derived timeseries are stored with attributes designating each data point as either a virtual data point or an actual data point. Such attributes allow applications 2130 to identify whether a given timeseries represents a virtual data point or an actual data point, even though both types of data points can be handled in the same manner by applications 2130. These and other features of timeseries service 2128 are described in greater detail with reference to FIG. 24.

In some embodiments, analytics service 2124 analyzes the raw timeseries data and/or the derived timeseries data to detect faults. Analytics service 2124 can apply a set of fault detection rules to the timeseries data to determine whether a fault is detected at each interval of the timeseries. Fault detections can be stored as derived timeseries data. For example, analytics service 2124 can generate a new fault detection timeseries with data values that indicate whether a fault was detected at each interval of the timeseries. The fault detection timeseries can be stored as derived timeseries data along with the raw timeseries data in storage 2114.

Still referring to FIG. 21, BMS 2100 is shown to include several applications 2130 including an energy management application 2132, monitoring and reporting applications 2134, and enterprise control applications 2136. Although only a few applications 2130 are shown, it is contemplated that applications 2130 can include any of a variety of suitable applications configured to use the raw or derived timeseries generated by cloud building management platform 2120. In some embodiments, applications 2130 exist as a separate layer of BMS 2100 (e.g., a part of cloud building management platform 2120 and/or data collector 2112). In other embodiments, applications 2130 can exist as remote applications that run on remote systems or devices (e.g., remote systems and applications 444, client devices 448, and/or the like).

Applications 2130 can use the derived timeseries data to perform a variety data visualization, monitoring, and/or control activities. For example, energy management application 2132 and monitoring and reporting application 2134 can use the derived timeseries data to generate user interfaces (e.g., charts, graphs, etc.) that present the derived timeseries data to a user. In some embodiments, the user interfaces present the raw timeseries data and the derived data rollups in a single chart or graph. For example, a dropdown selector can be provided to allow a user to select the raw timeseries data or any of the data rollups for a given data point.

Enterprise control application 2136 can use the derived timeseries data to perform various control activities. For example, enterprise control application 2136 can use the derived timeseries data as input to a control algorithm (e.g., a state-based algorithm, an extremum seeking control (ESC) algorithm, a proportional-integral (PI) control algorithm, a proportional-integral-derivative (PID) control algorithm, a model predictive control (MPC) algorithm, a feedback control algorithm, etc.) to generate control signals for building subsystems 428. In some embodiments, building subsystems 428 use the control signals to operate building equipment. Operating the building equipment can affect the measured or calculated values of the data samples provided to BMS 2100 and/or cloud building management platform 2120. Accordingly, enterprise control application 2136 can use the derived timeseries data as feedback to control the systems and devices of building subsystems 428.

Cloud Building Management Platform Entity Service

Figure 22:
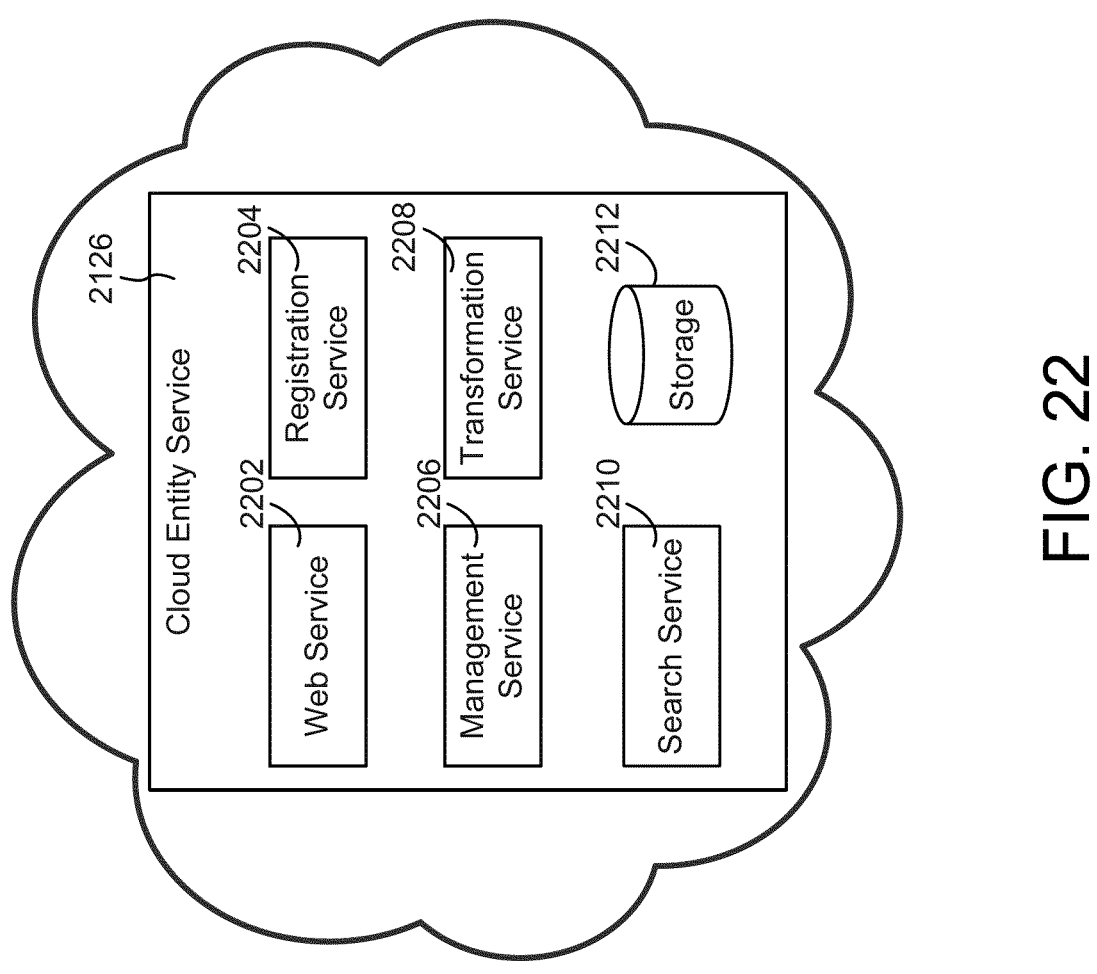
FIG. 22 is a block diagram illustrating an entity service of FIG. 21 in greater detail, according to an exemplary embodiment.

Referring now to FIG. 22, a block diagram illustrating entity service 2126 in greater detail is shown, according to some embodiments. Entity service 2126 registers and manages various buildings (e.g., the building 10), spaces, persons, subsystems (e.g., 428), devices, and other entities in the cloud building management platform 2120. According to various embodiments, an entity may be any person, place, or physical object, hereafter referred to as an object entity. Further, an entity may be any event, data point, or record structure, hereinafter referred to as data entity. In addition, relationships between entities may be defined by relational objects.

In some embodiments, an object entity may be defined as having at least three types of attributes. For example, an object entity may have a static attribute, a dynamic attribute, and a behavioral attribute. The static attribute may include any unique identifier of the object entity or characteristic of the object entity that either does not change over time or changes infrequently (e.g., a device ID, a person's name or social security number, a place's address or room number, and the like). The dynamic attribute may include a property of the object entity that changes over time (e.g., location, age, measurement, data point, and the like). In some embodiments, the dynamic attribute of an object entity may be linked to a data entity. In this case, the dynamic attribute of the object entity may simply refer to a location (e.g., data/network address) or static attribute (e.g., identifier) of the linked data entity, which may store the data (e.g., the value or information) of the dynamic attribute. Accordingly, in some such embodiments, when a new data point (e.g., timeseries data) is received for the object entity, only the linked data entity may be updated, while the object entity remains unchanged. Therefore, resources that would have been expended to update the object entity may be reduced.

However, the present disclosure is not limited thereto. For example, in some embodiments, there may also be some data that is updated (e.g., during predetermined intervals) in the dynamic attribute of the object entity itself. For example, the linked data entity may be configured to be updated each time a new data point is received, whereas the corresponding dynamic attribute of the object entity may be configured to be updated less often (e.g., at predetermined intervals less than the intervals during which the new data points are received). In some implementations, the dynamic attribute of the object entity may include both a link to the data entity and either a portion of the data from the data entity or data derived from the data of the data entity. For example, in an embodiment in which periodic temperature readings are received from a thermostat, an object entity corresponding to the thermostat could include the last temperature reading and a link to a data entity that stores a series of the last ten temperature readings received from the thermostat.

The behavioral attribute may define a function of the object entity, for example, based on inputs, capabilities, and/or permissions. For example, behavioral attributes may define the types of inputs that the object entity is configured to accept, how the object entity is expected to respond under certain conditions, the types of functions that the object entity is capable of performing, and the like. As a non-limiting example, if the object entity represents a person, the behavioral attribute of the person may be his/her job title or job duties, user permissions to access certain systems or locations, expected location or behavior given a time of day, tendencies or preferences based on connected activity data received by entity service 2126 (e.g., social media activity), and the like. As another non-limiting example, if the object entity represents a device, the behavioral attributes may include the types of inputs that the device can receive, the types of outputs that the device can generate, the types of controls that the device is capable of, the types of software or versions that the device currently has, known responses of the device to certain types of input (e.g., behavior of the device defined by its programming), and the like.

In some embodiments, the data entity may be defined as having at least a static attribute and a dynamic attribute. The static attribute of the data entity may include a unique identifier or description of the data entity. For example, if the data entity is linked to a dynamic attribute of an object entity, the static attribute of the data entity may include an identifier that is used to link to the dynamic attribute of the object entity. In some embodiments, the dynamic attribute of the data entity represents the data for the dynamic attribute of the linked object entity. In some embodiments, the dynamic attribute of the data entity may represent some other data that is derived, analyzed, inferred, calculated, or determined based on data from a plurality of data sources.

In some embodiments, the relational object may be defined as having at least a static attribute. The static attribute of the relational object may semantically define the type of relationship between two or more entities. For example, in a non-limiting embodiment, a relational object for a relationship that semantically defines that Entity A has a part of Entity B, or that Entity B is a part of Entity A may include:

$$hasPart\{Entity\ A, Entity\ B\}$$

where the static attribute hasPart defines what the relationship is of the listed entities, and the order of the listed entities or data field of the relational object specifies which entity is the part of the other (e.g., Entity A→hasPart→Entity B).

In various embodiments, the relational object is an object-oriented construct with predefined fields that define the relationship between two or more entities, regardless of the type of entities. For example, cloud building management platform 2120 can provide a rich set of pre-built entity models with standardized relational objects that can be used to describe how any two or more entities are semantically related, as well as how data is exchanged and/or processed between the entities. Accordingly, a global change to a definition or relationship of a relational object at the system level can be effected at the object level, without having to manually change the entity relationships for each object or entity individually. Further, in some embodiments, a global change at the system level can be propagated through to third-party applications integrated with cloud building management platform 2120 such that the global change can be implemented across all of the third-party applications without requiring manual implementation of the change in each disparate application.

Figure 23:
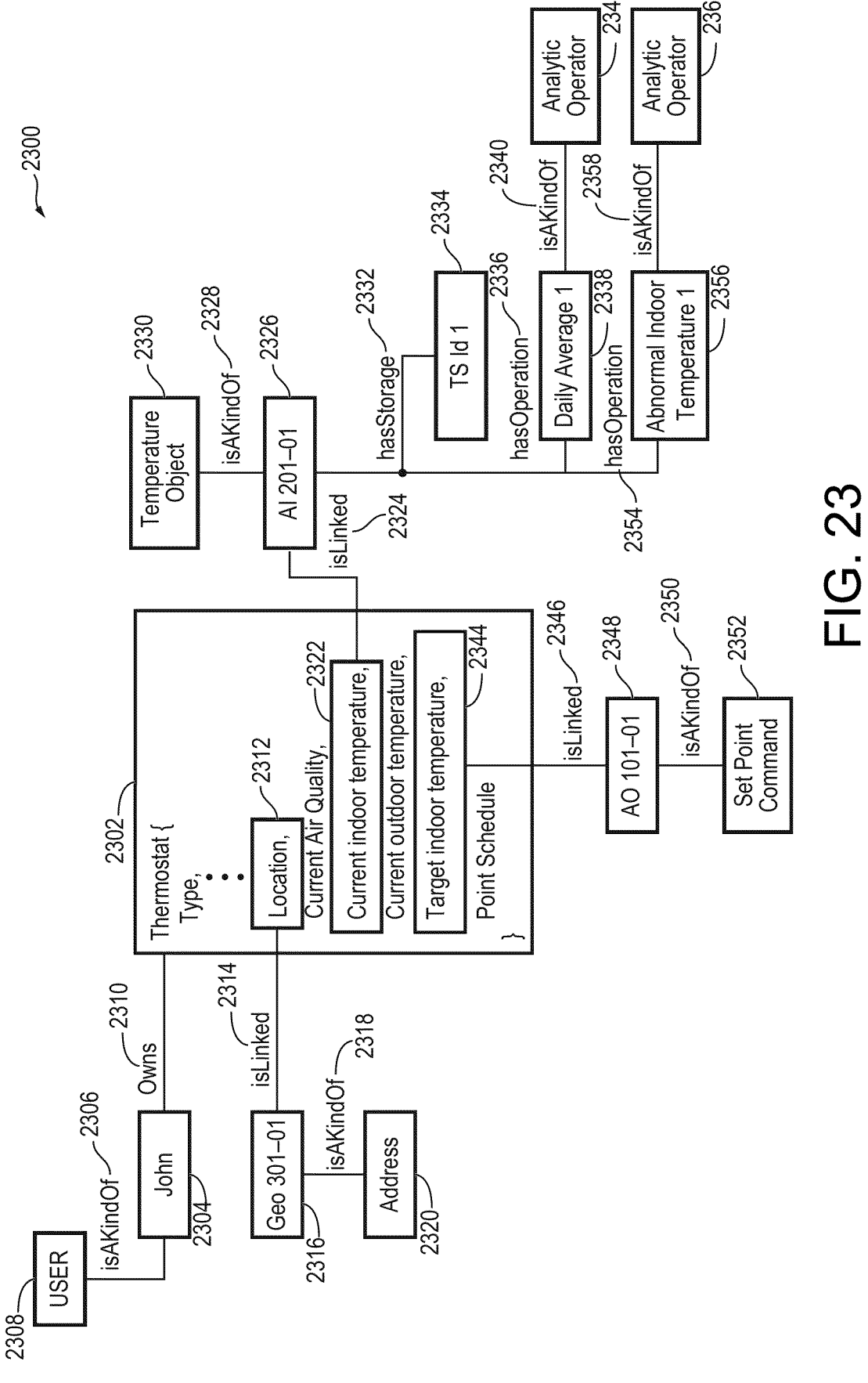
FIG. 23 in an example entity graph of entity data, according to an exemplary embodiment.

For example, referring to FIG. 23, an example entity graph of entity data is shown, according to some embodiments. The term "entity data" is used to describe the attributes of various entities and the relationships between the entities. For example, entity data may be represented in the form of an entity graph. In some embodiments, entity data includes any suitable predefined data models (e.g., as a table, JSON data, and/or the like), such as entity type or object, and further includes one or more relational objects that semantically define the relationships between the entities. The relational objects may help to semantically define, for example, hierarchical or directed relationships between the entities (e.g., entity X controls entity Y, entity A feeds entity B, entity 1 is located in entity 2, and the like). For example, an object entity (e.g., IoT device) may be represented by entity type or object, which generally describes how data corresponding to the entity will be structured and stored.

For example, an entity type (or object) "Thermostat" may be represented via the below schema:

```
Thermostat{
    Type,
    Model No,
    Device Name,
    Manufactured date,
    Serial number,
    MAC address,
    Location,
    Current air quality,
    Current indoor temperature,
    Current outdoor temperature,
    Target indoor temperature,
    Point schedule (e.g., BACnet schedule object)
}
``` where various attributes are static attributes (e.g., "Type," "Model Number," "Device Name," etc.,), dynamic attributes (e.g., "Current air quality," "Current outdoor temperature," etc.), or behavioral attributes (e.g., "Target indoor temperature," etc.) for the object entity "thermostat." In a relational database, the object "Thermostat" is a table name, and the attributes represents column names.

An example of an object entity data model for a person named John Smith in a relational database may be represented by the below table:

| First Name | Last Name | Tel. No. | Age | Location | Job Title |
|---|---|---|---|---|---|
| John | Smith | (213)220-XXXX | 36 | Home | Engineer | where various attributes are static attributes (e.g., "First Name," "Last Name," etc.,), dynamic attributes (e.g., "Age," "Location," etc.), or behavioral attributes (e.g., "Engineer") for the object entity "John Smith."

An example data entity for the data point "Current indoor temperature" for the "Thermostat" owned by John Smith in a relational database may be represented by the below table:

| Present-Value | Description | Device_Type | Unit of measure |
|---|---|---|---|
| 68 | "Current indoor temperature of John's house" | Thermostat | Degrees-F. | where various attributes are static attributes (e.g., "Description" and "Device_Type") and dynamic attributes (e.g., "Present-Value").

While structuring the entities via entity type or object may help to define the data representation of the entities, these data models do not provide information on how the entities relate to each other. For example, a BMS, building subsystem, or device may need data from a plurality of sources as well as information on how the sources relate to each other in order to provide a proper decision, action, or recommendation. Accordingly, in various embodiments, the entity data further includes the relational objects to semantically define the relationships between the entities, which may help to increase speeds in analyzing data, as well as provide ease of navigation and browsing.

For example, still referring to FIG. 23, an entity graph 2300 for the Thermostat object entity 2302 includes various class entities (e.g., User, Address, SetPoint Command, and Temperature Object), object entities (e.g., John and Thermostat), relational objects (e.g., isAKindOf, Owns, isLinked, hasStorage, and hasOperation), and data entities (AI 201-01, TS ID 1, Daily Average 1, Abnormal indoor temp 1, AO 101-1, and Geo 301-01). The relational objects describe the relationships between the various class, object, and data entities in a semantic and syntactic manner, so that an application or user viewing the entity graph 2300 can quickly determine the relationships and data process flow of the Thermostat object entity 2302, without having to resort to a data base analyst or engineer to create, index, and/or manage the entities (e.g., using SQL or NoSQL). In some embodiments, each of the entities (e.g., class entity, object entity, and data entity) represents a node on the entity graph 2300, and the relational objects define the relationships or connections between the entities (or nodes).

For example, the entity graph 2300 shows that a person named John (object entity) 2304 isAKindOf (relational object) 2306 User (class entity) 2308. John 2304 Owns (relational object) 2310 the Thermostat (object entity) 2302. The Thermostat 2302 has a location attribute (dynamic attribute) 2312 that isLinked (relational object) 2314 to Geo 301-01 (data entity) 2316, which isAKindOf (relational object) 2318 an Address (class entity) 2320. Accordingly, Geo 301-01 316 should have a data point corresponding to an address.

The Thermostat 2302 further includes a "Current indoor temperature" attribute (dynamic attribute) 2322 that isLinked (relational object) 2324 to AI 201-01 (data entity) 2326. AI 201-01 2326 isAKindOf (relational object) 2328 Temperature Object (class entity) 2330. Thus, AI 201-01 2326 should contain some sort of temperature related data. AI 201-01 2326 hasStorage (relational object) 2332 at TS ID 1 (data entity) 2334, which may be raw or derived timeseries data for the temperature readings. AI 201-01 2326 hasOperation (relational object) 2336 of Daily Average 1 (data entity) 2338, which isAKindOf (relational object) 2340 Analytic Operator (class entity) 2342. Thus, Daily Average 1 results from an analytic operation that calculates the daily average of the indoor temperature. AI 201-01 2326 further hasOperation (relational object) 2354 of Abnormal Indoor Temperature (data entity) 2356, which isAKindOf (relational object) 2358 Analytic Operator (class entity) 2360. Accordingly, Abnormal Indoor Temperature results from an analytic operation to determine an abnormal temperature (e.g., exceeds or falls below a threshold value).

In this example, the data entity AI 201-01 526 may be represented by the following data model:

```
point {
    name: "AI 201-01";
    type: "analog input";
    value: 72;
    unit: "Degree-F";
    source: "Temperature Sensor 1"
}
``` where "point" is an example of a data entity that may be created by cloud building management platform 2120 to hold the value for the linked "Current indoor temperature" 2322 dynamic attribute of the Thermostat entity 2302, and source is the sensor or device in the Thermostat device that provides the data to the linked "Current indoor temperature" 2322 dynamic attribute.

The data entity TS Id 1 2334 may be represented, for example, by the following data model:

```
timeseries {
    name: "TS Id 1";
    type: "Daily Average";
    values: "[68, 66, 70, 69, 71];
    unit: "Degree-F";
    point: "AI 201-01";
    source: "Daily Average 1"
}
``` where the data entity Daily Average 1 2338 represents a specific analytic operator used to create the data entity for the average daily timeseries TS Id 1 2334 based on the values of the corresponding data entity for point AI 201-01 2326. The relational object hasOperation shows that the AI 201-01 data entity 2326 is used as an input to the specific logic/math operation represented by Daily Average 1 2338. TS Id 1 2334 might also include an attribute that identifies the analytic operator Daily Average 1 2338 as the source of the data samples in the timeseries.

Still referring to FIG. 23, the entity graph 2300 for Thermostat 2302 shows that the "Target indoor temperature" attribute (dynamic attribute) 2344 isLinked (relational attribute) 2346 to the data entity AO 101-01 (data entity) 2348. AO 101-01 data entity 2348 isAKindOf (relational attribute) 2350 SetPoint Command (class entity) 2352. Thus, the data in data entity AO 101-01 2348 may be set via a command by the user or other entity, and may be used to control the Thermostat object entity 2302. Accordingly, in various embodiments, entity graph 2300 provides a user friendly view of the various relationships between the entities and data processing flow, which provides for ease of navigation, browsing, and analysis of data.

In some embodiments, any two entities (or nodes) can be connected to each other via one or more relational objects that define different relationships between the two entities (or nodes). For example, still referring to FIG. 23, the object entity John 2304 is shown to be connected to the object entity Thermostat 2302 via one relational object Owns 2310. However, in another embodiment, the object entity John 2304 can be connected to the object entity Thermostat 2302 via more than one relational object, such that, in addition to the relational object Owns 2310, another relational object can define another relationship between the object entity John 2304 and an object entity Activity Tracker. For example, another relational object such as isInZone or isNotInZone can define whether or not John (or the entity object for John 2304) is currently within the zone serviced by Thermostat 2302 (e.g., via the relational object isInZone) or currently not within the zone serviced by Thermostat 2302 (e.g., via the relational object isNotInZone).

In this case, when the data entities associated with the thermostat object entity 2302 indicates that John is within the zone serviced by thermostat (e.g., which may be determined from the location attribute 2312 and location data for John 2310), the relational object isInZone may be created between the object entity for John 2304 and the object entity for thermostat 2302. On the other hand, when the data entities associated with the thermostat object entity 2302 indicates that John is not within the zone serviced by the thermostat (e.g., which may be determined when the location attribute 2312 shows a different location from a known location of John), the relational object isNotInZone can be created between the object entity for John 2310 and the object entity for thermostat 2302. For example, the relational object isNotInZone can be created by modifying the relational object isInZone or deleting the relational object isInZone and creating the relational object isNotInZone. Thus, in some embodiments, the relational objects can be dynamically created, modified, or deleted as needed or desired.

Referring again to FIG. 22, entity service 2126 may transforms raw data samples and/or raw timeseries data into data corresponding to entity data. For example, as discussed above with reference to FIG. 23, entity service 2126 can create data entities that use and/or represent data points in the timeseries data. Entity service 2126 includes a web service 2202, a registration service 704, a management service 2206, a transformation service 2208, a search service 2210, and storage 2212. In some embodiments, storage 2212 may be internal storage or external storage. For example, storage 2212 may be storage 2114 (see FIG. 21), internal storage with relation to entity service 2126, and/or may include a remote database, cloud-based data hosting, or other remote data storage.

Web service 2202 can be configured to interact with web-based applications to send entity data and/or receive raw data (e.g., data samples, timeseries data, and the like). For example, web service 2202 can provide an interface (e.g., API, UI/UX, and the like) to manage (e.g., register, create, edit, delete, and/or update) an entity (e.g., class entity, object entity, data entity, and/or the like) and the relational objects that define the relationships between the entities. In some embodiments, web service 2202 provides entity data to web-based applications. For example, if one or more of applications 2130 are web-based applications, web service 2202 can provide entity data to the web-based applications. In some embodiments, web service 2202 receives raw data samples and/or raw timeseries data including device information from a web-based data collector, or a web-based security service to identify authorized entities and to exchange secured messages. For example, if data collector 2112 is a web-based application, web service 2202 can receive the raw data samples and/or timeseries data including a device attribute indicating a type of device (e.g., IoT device) from which the data samples and/or timeseries data are received from data collector 2112. In some embodiments, web service 2202 may message security service 2122 to request authorization information and/or permission information of a particular user, building, BMS, building subsystem, device, application, or other entity. In some embodiments, web service 2202 receives derived timeseries data from timeseries service 2128, and/or may provide entity data to timeseries service 2128. In some embodiments, the entity service 2126 processes and transforms the collected data to generate the entity data.

The registration service 2204 can perform registration of devices and entities. For example, registration service 2204 can communicate with building subsystems 428 and 448 (e.g., via web service 2202) to register each entity (e.g., building, BMS, building subsystems, devices, and the like) with cloud building management platform 2120. In some embodiments, registration service 2204 registers a particular building subsystem 528 (or the devices therein) with a specific user and/or a specific set of permissions and/or entitlements. For example, a user may register a device key and/or a device ID associated with the device via a web portal (e.g., web service 2202). In some embodiments, the device ID and the device key may be unique to the device. The device ID may be a unique number associated with the device such as a unique alphanumeric string, a serial number of the device, and/or any other static identifier. In various embodiments, the device is provisioned by a manufacturer and/or any other entity. In various embodiments, the device key and/or device ID are saved to the device or building subsystem 528 based on whether the device includes a trusted platform module (TPM). If the device includes a TPM, the device or building subsystem 428 may store the device key and/or device ID according to the protocols of the TPM. If the device does not include a TPM, the device or building subsystem 428 may store the device key and/or device ID in a file and/or file field which may be stored in a secure storage location. Further, in some embodiments, the device ID may be stored with BIOS software of the device. For example, a serial number of BIOS software may become and/or may be updated with the device ID.

In various embodiments, the device key and/or the device ID are uploaded to registration service 2204 (e.g., an IoT hub such as AZURE® IoT Hub). In some embodiments, registration service 2204 is configured to store the device key and the device ID in secure permanent storage and/or may be stored by security service 2122 (e.g., by a security API). In some embodiments, a manufacturer and/or any other individual may register the device key and the device ID with registration service 2204 (e.g., via web service 2202). In various embodiments, the device key and the device ID are linked to a particular profile associated with the building subsystem 428 or device and/or a particular user profile (e.g., a particular user). In this regard, a device (or building subsystem 428) can be associated with a particular user. In various embodiments, the device key and the device ID make up the profile for device. The profile may be registered as a device that has been manufactured and/or provisioned but has not yet been purchased by an end user.

In various embodiments, registration service 2204 adds and/or updates a device in an building hub device registry. In various embodiments, registration service 2204 may determine if the device is already registered, can set various authentication values (e.g., device ID, device key), and can update the building hub device registry. In a similar manner, registration service 2204 can update a document database with the various device registration information.

In some embodiments, registration service 2204 can be configured to create a virtual representation (e.g., "digital twins" or "shadow records") of each object entity (e.g., person, room, building subsystem, device, and the like) in the building within cloud building management platform 2120. In some embodiments, the virtual representations are smart entities that include attributes defining or characterizing the corresponding object and are associated to the corresponding object entity via relational objects defining the relationship of the object and the smart entity representation thereof. In some embodiments, the virtual representations maintain shadow copies of the object entities with versioning information so that entity service 2126 can store not only the most recent update of an attribute (e.g., a dynamic attribute) associated with the object, but records of previous states of the attributes (e.g., dynamic attributes) and/or entities. For example, the shadow record may be created as a type of data entity that is related to a linked data entity corresponding to the dynamic attribute of the object entity (e.g., the person, room, building subsystem, device, and the like). For example, the shadow entity may be associated with the linked data entity via a relational object (e.g., isLinked, hasStorage, hasOperation, and the like). In this case, the shadow entity may be used to determine additional analytics for the data point of the dynamic attribute. For example, the shadow entity may be used to determine an average value, an expected value, or an abnormal value of the data point from the dynamic attribute.

Management service 2206 may create, modify, or update various attributes, data entities, and/or relational objects of the objects managed by entity service 2126 for each entity rather than per class or type of entity. This allows for separate processing/analytics for each individual entity rather than only to a class or type of entity. Some attributes (or data entities) may correspond to, for example, the most recent value of a data point provided to BMS 2100 or cloud building management platform 2120 via the raw data samples and/or timeseries data. For example, the "Current indoor temperature" dynamic attribute of the "Thermostat" object entity 2302 in the example discussed above may be the most recent value of indoor temperature provided by the Thermostat device. Management service 2206 can use the relational objects of the entity data for Thermostat to determine where to update the data of the attribute.

For example, Management service 2206 may determine that a data entity (e.g., AI 201-01) is linked to the "Current indoor temperature" dynamic attribute of Thermostat via an isLinked relational object. In this case, Management service 2206 may automatically update the attribute data in the linked data entity. Further, if a linked data entity does not exist, Management service 2206 can create a data entity (e.g., AI 201-01) and an instance of the isLinked relational object 2324 to store and link the "Current indoor temperature" dynamic attribute of Thermostat therein. Accordingly, processing/analytics for Thermostat 2302 may be automated. As another example, a "most recent view" attribute (or linked data entity) of a webpage object entity may indicate the most recent time at which the webpage was viewed. Management service 2206 can use the entity data from a related click tracking system object entity or web server object entity to determine when the most recent view occurred and can automatically update the "most recent view" attribute (or linked data entity) of the webpage entity accordingly.

Other data entities and/or attributes may be created and/or updated as a result of an analytic, transformation, calculation, or other processing operation based on the raw data and/or entity data. For example, Management service 2206 can use the relational objects in entity data to identify a related access control device (e.g., a card reader, a keypad, etc.) at the entrance/exit of a building object entity. Management service 2206 can use raw data received from the identified access control device to track the number of occupants entering and exiting the building object entity (e.g., via related card entities used by the occupants to enter and exit the building). Management service 2206 can update a "number of occupants" attribute (or corresponding data entity) of the building object entity each time a person enters or exits the building using a related card object entity, such that the "number of occupants" attribute (or data entity) reflects the current number of occupants within the building (or related building object entity). As another example, a "total revenue" attribute associated with a product line object entity may be the summation of all the revenue generated from related point of sales entities. Management service 2206 can use the raw data received from the related point of sales entities to determine when a sale of the product occurs, and can identify the amount of revenue generated by the sales. Management service 2206 can then update the "total revenue" attribute (or related data entity) of the product line object entity by adding the most recent sales revenue from each of the related point of sales entities to the previous value of the attribute.

In some embodiments, management service 2206 may use derived timeseries data generated from timeseries service 2128 to update or create a data entity (e.g., Daily Average 1) that uses or stores the data points in the derived timeseries data. For example, the derived timeseries data may include a virtual data point corresponding to the daily average steps calculated by timeseries service 2128, and management service 2206 may update the data entity or entities that store or use the data corresponding to the virtual data point as determined via the relational objects. In some embodiments, if a data entity corresponding to the virtual data point does not exist, management service 2206 may automatically create a corresponding data entity and one or more relational objects that describe the relationship between the corresponding data entity and other entities.

In some embodiments, management service 2206 uses entity data and/or raw data from multiple different data sources to update the attributes (or corresponding data entities) of various object entities. For example, an object entity representing a person (e.g., a person's cellular device or other related object entity) may include a "risk" attribute that quantifies the person's level of risk attributable to various physical, environmental, or other conditions. Management service 2206 can use relational objects of the person object entity to identify a related card device and/or a related card reader from a related building object entity (e.g., the building in which the person works) to determine the physical location of the person at any given time. Management service 2206 can determine from raw data (e.g., time that the card device was scanned by the card reader) or derived timeseries data (e.g., average time of arrival) whether the person object is located in the building or may be in transit to the building. Management service 2206 can use weather data from a weather service in the region in which the building object entity is located to determine whether any severe weather is approaching the person's location. Similarly, management service 2206 can use building data from related building entities of the building object entity to determine whether the building in which the person is located is experiencing any emergency conditions (e.g., fire, building lockdown, etc.) or environmental hazards (e.g., detected air contaminants, pollutants, extreme temperatures, etc.) that could increase the person's level of risk. Management service 2206 can use these and other types of data as inputs to a risk function that calculates the value of the person object's "risk" attribute and can update the person object (or related device entity of the person object) accordingly.

In some embodiments, management service 2206 can be configured to synchronize configuration settings, parameters, and other device-specific or object-specific information between the entities and cloud building management platform 2120. In some embodiments, the synchronization occurs asynchronously. Management service 2206 can be configured to manage device properties dynamically. The device properties, configuration settings, parameters, and other device-specific information can be synchronized between the smart entities created by and stored within cloud building management platform 2120.

In some embodiments, management service 2206 is configured to manage a manifest for each of the building subsystems 428 (or devices therein). The manifest may include a set of relationships between the building subsystems 428 and various entities. Further, the manifest may indicate a set of entitlements for the building subsystems 428 and/or entitlements of the various entities and/or other entities. The set of entitlements may allow a BMS 2100, building subsystem 428 and/or a user to perform certain actions within the building or (e.g., control, configure, monitor, and/or the like).

Still referring to FIG. 22, transformation service 2208 can provide data virtualization, and can transform various predefined standard data models for entities in a same class or type to have the same entity data structure, regardless of the object, device, or Thing that the entity represents. For example, each object entity under an object class may include a location attribute, regardless of whether or not the location attribute is used or even generated. Thus, if an application is later developed requiring that each object entity includes a location attribute, manual mapping of heterogenous data of different entities in the same class may be avoided. Accordingly, interoperability and scalability of applications may be improved.

In some embodiments, transformation service 2208 can provide entity matching, cleansing, and correlation so that a unified cleansed view of the entity data including the entity related information (e.g., relational objects) can be provided. Transformation service 2208 can support semantic and syntactic relationship description in the form of standardized relational objects between the various entities. This may simplify machine learning because the relational objects themselves provide all the relationship description between the entities. Accordingly, the rich set of pre-built entity models and standardized relational objects may provide for rapid application development and data analytics.

Still referring to FIG. 22, the search service 2210 provides a unified view of product related information in the form of the entity graph, which correlates entity relationships (via relational objects) among multiple data sources (e.g., CRM, ERP, MRP and the like). In some embodiments, the search service 2210 is based on a schema-less and graph based indexing architecture. For example, in some embodiments, the search service 2210 provides the entity graph in which the entities are represented as nodes with relational objects defining the relationship between the entities (or nodes). The search service 2210 facilitates simple queries without having to search multiple levels of the hierarchical tree of the entity graph. For example, search service 2210 can return results based on searching of entity type, individual entities, attributes, or even relational objects without requiring other levels or entities of the hierarchy to be searched.

Timeseries Data Platform Service

Figure 24:
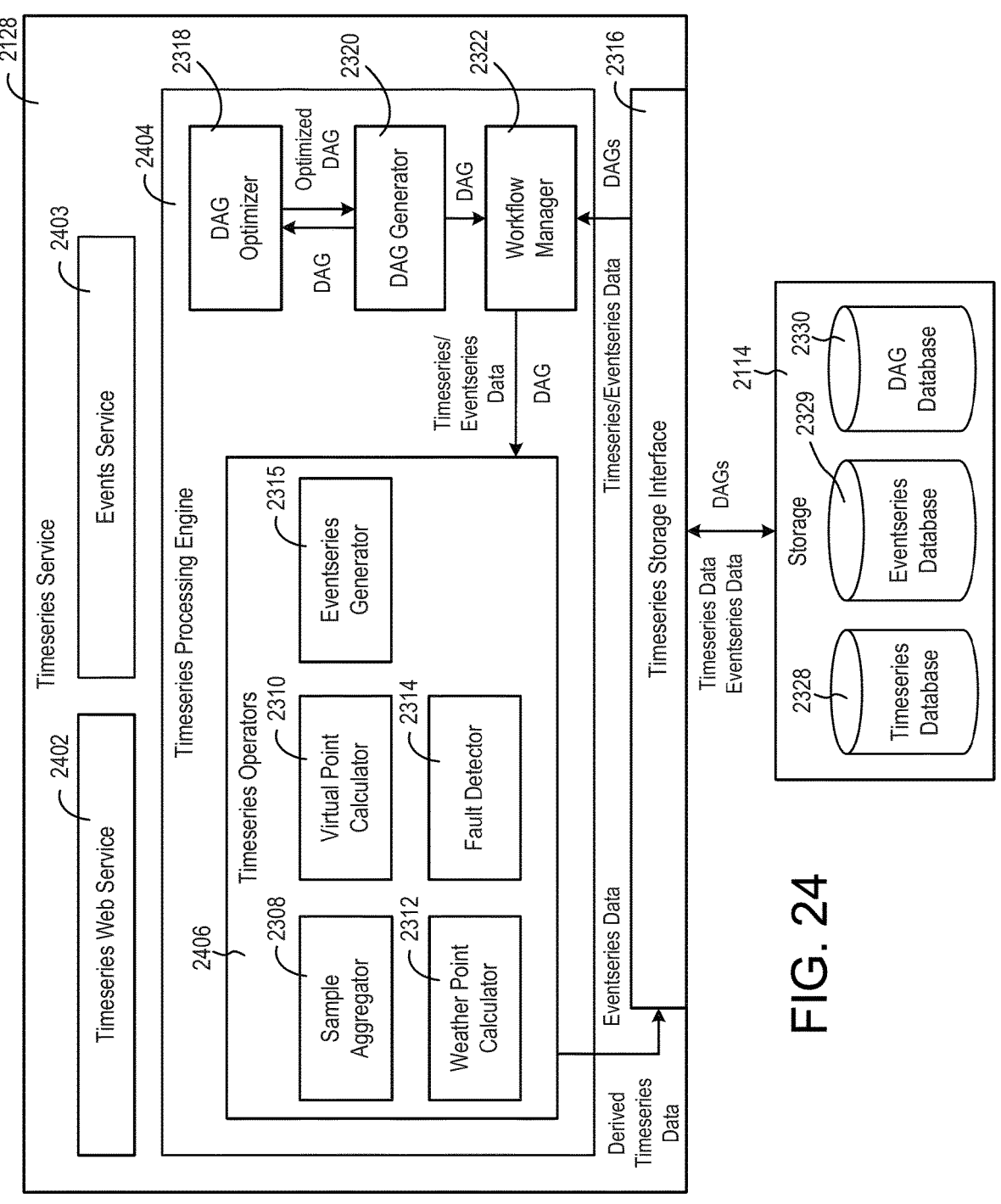
FIG. 24 is a block diagram illustrating timeseries service of FIG. 21 in greater detail, according to an exemplary embodiment.

Referring now to FIG. 24, a block diagram illustrating timeseries service 2128 in greater detail is shown, according to some embodiments. Timeseries service 2128 is shown to include a timeseries web service 2402, an events service 2403, a timeseries processing engine 2404, and a timeseries storage interface 2316. Timeseries web service 2402 can be configured to interact with web-based applications to send and/or receive timeseries data. In some embodiments, timeseries web service 2402 provides timeseries data to web-based applications. For example, if one or more of applications 2130 are web-based applications, timeseries web service 2402 can provide derived timeseries data and/or raw timeseries data to the web-based applications. In some embodiments, timeseries web service 2402 receives raw timeseries data from a web-based data collector. For example, if data collector 2112 is a web-based application, timeseries web service 2402 can receive raw data samples or raw timeseries data from data collector 2112. In some embodiments, timeseries web service 2402 and entity service web service 2202 may be integrated as parts of the same web service.

Timeseries storage interface 2316 can be configured to store and read samples of various timeseries (e.g., raw timeseries data and derived timeseries data) and eventseries (described in greater detail below). Timeseries storage interface 2316 can interact with storage 2114. For example, timeseries storage interface 2316 can retrieve timeseries data from a timeseries database 2328 within storage 2114. In some embodiments, timeseries storage interface 2316 reads samples from a specified start time or start position in the timeseries to a specified stop time or a stop position in the timeseries. Similarly, timeseries storage interface 2316 can retrieve eventseries data from an eventseries database 2329 within storage 2114. Timeseries storage interface 2316 can also store timeseries data in timeseries database 2328 and can store eventseries data in eventseries database 2329. Advantageously, timeseries storage interface 2316 provides a consistent interface which enables logical data independence.

In some embodiments, timeseries storage interface 2316 stores timeseries as lists of data samples, organized by time. For example, timeseries storage interface 2316 can store timeseries in the following format:

$$[<key, timestamp_1, value_1>, <key, timestamp_2, value_2>, <key, timestamp_3, value_3>]$$

where key is an identifier of the source of the data samples (e.g., timeseries ID, sensor ID, device ID, etc.), timestamp$_i$ identifies a time associated with the ith sample, and value$_i$ indicates the value of the ith sample.

In some embodiments, timeseries storage interface 2316 stores eventseries as lists of events having a start time, an end time, and a state. For example, timeseries storage interface 2316 can store eventseries in the following format:

$$[<eventID_1, start\_timestamp_1, end\_timestamp_1, state_1>, \ldots, <eventID_N, start\_timestamp_N, end\_timestamp_N, state_N>]$$

where eventID$_i$ is an identifier of the ith event, start_timestamp$_i$ is the time at which the ith event started, end_timestamp$_i$ is the time at which the ith event ended, state$_i$ describes a state or condition associated with the ith event (e.g., cold, hot, warm, etc.), and N is the total number of events in the eventseries.

In some embodiments, timeseries storage interface 2316 stores timeseries and eventseries in a tabular format. Timeseries storage interface 2316 can store timeseries and eventseries in various tables having a column for each attribute of the timeseries/eventseries samples (e.g., key, timestamp, value). The timeseries tables can be stored in timeseries database 2328, whereas the eventseries tables can be stored in eventseries database 2329. In some embodiments, timeseries storage interface 2316 caches older data to storage

2114 but stores newer data in RAM. This may improve read performance when the newer data are requested for processing.

In some embodiments, timeseries storage interface 2316 omits one or more of the attributes when storing the timeseries samples. For example, timeseries storage interface 2316 may not need to repeatedly store the key or timeseries ID for each sample in the timeseries. In some embodiments, timeseries storage interface 2316 omits timestamps from one or more of the samples. If samples of a particular timeseries have timestamps at regular intervals (e.g., one sample each minute), timeseries storage interface 2316 can organize the samples by timestamps and store the values of the samples in a row. The timestamp of the first sample can be stored along with the interval between the timestamps. Timeseries storage interface 2316 can determine the timestamp of any sample in the row based on the timestamp of the first sample and the position of the sample in the row.

In some embodiments, timeseries storage interface 2316 stores one or more samples with an attribute indicating a change in value relative to the previous sample value. The change in value can replace the actual value of the sample when the sample is stored in timeseries database 2328. This allows timeseries storage interface 2316 to use fewer bits when storing samples and their corresponding values. Timeseries storage interface 2316 can determine the value of any sample based on the value of the first sample and the change in value of each successive sample.

In some embodiments, timeseries storage interface 2316 invokes entity service 2126 to create data entities in which samples of timeseries data and/or eventseries data can be stored. The data entities can include JSON objects or other types of data objects to store one or more timeseries samples and/or eventseries samples. Timeseries storage interface 2316 can be configured to add samples to the data entities and read samples from the data entities. For example, timeseries storage interface 2316 can receive a set of samples from data collector 2112, entity service 2126, timeseries web service 2402, events service 2403, and/or timeseries processing engine 2404. Timeseries storage interface 2316 can add the set of samples to a data entity by sending the samples to entity service 2126 to be stored in the data entity, for example, or may directly interface with the data entity to add/modify the sample to the data entity.

Timeseries storage interface 2316 can use data entities when reading samples from storage 2114. For example, timeseries storage interface 2316 can retrieve a set of samples from storage 2114 or from entity service 2126, and add the samples to a data entity (e.g., directly or via entity service 2126). In some embodiments, the set of samples include all samples within a specified time period (e.g., samples with timestamps in the specified time period) or eventseries samples having a specified state. Timeseries storage interface 2316 can provide the samples in the data entity to timeseries web service 2402, events service 2403, timeseries processing engine 2404, applications 2130, and/or other components configured to use the timeseries/eventseries samples.

Still referring to FIG. 24, timeseries processing engine 2404 is shown to include several timeseries operators 2406. Timeseries operators 2406 can be configured to apply various operations, transformations, or functions to one or more input timeseries to generate output timeseries and/or eventseries. The input timeseries can include raw timeseries data and/or derived timeseries data. Timeseries operators 2406 can be configured to calculate aggregate values, averages, or apply other mathematical operations to the input timeseries.

In some embodiments, timeseries operators 2406 generate virtual point timeseries by combining two or more input timeseries (e.g., adding the timeseries together), creating multiple output timeseries from a single input timeseries, or applying mathematical operations to the input timeseries. In some embodiments, timeseries operators 2406 perform data cleansing operations or deduplication operations on an input timeseries. In some embodiments, timeseries operators 2406 use the input timeseries to generate eventseries based on the values of the timeseries samples. The output timeseries can be stored as derived timeseries data in storage 2114 as one or more timeseries data entities. Similarly, the eventseries can be stored as eventseries data entities in storage 2114.

In some embodiments, timeseries operators 2406 do not change or replace the raw timeseries data, but rather generate various "views" of the raw timeseries data (e.g., as separate data entities) with corresponding relational objects defining the relationships between the raw timeseries data entity and the various views data entities. The views can be queried in the same manner as the raw timeseries data. For example, samples can be read from the raw timeseries data entity, transformed to create the view entity, and then provided as an output. Because the transformations used to create the views can be computationally expensive, the views can be stored as "materialized view" data entities in timeseries database 2328. Instances of relational objects can be created to define the relationship between the raw timeseries data entity and the materialize view data entities. These materialized views are referred to as derived data timeseries throughout the present disclosure.

Timeseries operators 2406 can be configured to run at query time (e.g., when a request for derived data timeseries is received) or prior to query time (e.g., when new raw data samples are received, in response to a defined event or trigger, etc.). This flexibility allows timeseries operators 2406 to perform some or all of their operations ahead of time and/or in response to a request for specific derived data timeseries. For example, timeseries operators 2406 can be configured to pre-process one or more timeseries that are read frequently to ensure that the timeseries are updated whenever new data samples are received, and the pre-processed timeseries may be stored in a corresponding data entity for retrieval. However, timeseries operators 2406 can be configured to wait until query time to process one or more timeseries that are read infrequently to avoid performing unnecessary processing operations.

In some embodiments, timeseries operators 2406 are triggered in a particular sequence defined by a directed acyclic graph (DAG). The DAG may define a workflow or sequence of operations or transformations to apply to one or more input timeseries. For example, the DAG for a raw data timeseries may include a data cleansing operation, an aggregation operation, and a summation operation (e.g., adding two raw data timeseries to create a virtual point timeseries). The DAGs can be stored in a DAG database 2330 within storage 2114, or internally within timeseries processing engine 2404. DAGs can be retrieved by workflow manager 2322 and used to determine how and when to process incoming data samples. Exemplary systems and methods for creating and using DAGs are described in greater detail below.

Timeseries operators 2406 can perform aggregations for dashboards, cleansing operations, logical operations for rules and fault detection, machine learning predictions or classifications, call out to external services, or any of a variety of other operations which can be applied to timeseries data. The operations performed by timeseries operators 2406 are not limited to timeseries data. Timeseries operators 2406 can also operate on event data or function as a billing engine for a consumption or tariff-based billing system. Timeseries operators 2406 are shown to include a sample aggregator 2308, a virtual point calculator 2310, a weather point calculator 2312, a fault detector 2314, and an eventseries generator 2315.

Still referring to FIG. 24, timeseries processing engine 2404 is shown to include a DAG optimizer 2318. DAG optimizer 2318 can be configured to combine multiple DAGs or multiple steps of a DAG to improve the efficiency of the operations performed by timeseries operators 2406. For example, suppose that a DAG has one functional block which adds "Timeseries A" and "Timeseries B" to create "Timeseries C" (i.e., A+B=C) and another functional block which adds "Timeseries C" and "Timeseries D" to create "Timeseries E" (i.e., C+D=E). DAG optimizer 2318 can combine these two functional blocks into a single functional block which computes "Timeseries E" directly from "Timeseries A," "Timeseries B," and "Timeseries D" (i.e., E=A+B+D). Alternatively, both "Timeseries C" and "Timeseries E" can be computed in the same functional block to reduce the number of independent operations required to process the DAG.

In some embodiments, DAG optimizer 2318 combines DAGs or steps of a DAG in response to a determination that multiple DAGs or steps of a DAG will use similar or shared inputs (e.g., one or more of the same input timeseries). This allows the inputs to be retrieved and loaded once rather than performing two separate operations that both load the same inputs. In some embodiments, DAG optimizer 2318 schedules timeseries operators 2406 to nodes where data is resident in memory in order to further reduce the amount of data required to be loaded from the timeseries database 2328.

Timeseries processing engine 2404 is shown to include a directed acyclic graph (DAG) generator 2320. DAG generator 2320 can be configured to generate one or more DAGs for each raw data timeseries. Each DAG may define a workflow or sequence of operations which can be performed by timeseries operators 2406 on the raw data timeseries. When new samples of the raw data timeseries are received, workflow manager 2322 can retrieve the corresponding DAG and use the DAG to determine how the raw data timeseries should be processed. In some embodiments, the DAGs are declarative views which represent the sequence of operations applied to each raw data timeseries. The DAGs may be designed for timeseries rather than structured query language (SQL).

In some embodiments, DAGs apply over windows of time. For example, the timeseries processing operations defined by a DAG may include a data aggregation operation that aggregates a plurality of raw data samples having timestamps within a given time window. The start time and end time of the time window may be defined by the DAG and the timeseries to which the DAG is applied. The DAG may define the duration of the time window over which the data aggregation operation will be performed. For example, the DAG may define the aggregation operation as an hourly aggregation (i.e., to produce an hourly data rollup timeseries), a daily aggregation (i.e., to produce a daily data rollup timeseries), a weekly aggregation (i.e., to produce a weekly data rollup timeseries), or any other aggregation duration. The position of the time window (e.g., a specific day, a specific week, etc.) over which the aggregation is performed may be defined by the timestamps of the data samples of timeseries provided as an input to the DAG.

In operation, sample aggregator 2308 can use the DAG to identify the duration of the time window (e.g., an hour, a day, a week, etc.) over which the data aggregation operation will be performed. Sample aggregator 2308 can use the time-stamps of the data samples in the timeseries provided as an input to the DAG to identify the location of the time window (i.e., the start time and the end time). Sample aggregator 2308 can set the start time and end time of the time window such that the time window has the identified duration and includes the timestamps of the data samples. In some embodiments, the time windows are fixed, having pre-defined start times and end times (e.g., the beginning and end of each hour, day, week, etc.). In other embodiments, the time windows may be sliding time windows, having start times and end times that depend on the timestamps of the data samples in the input timeseries.

Figure 25:
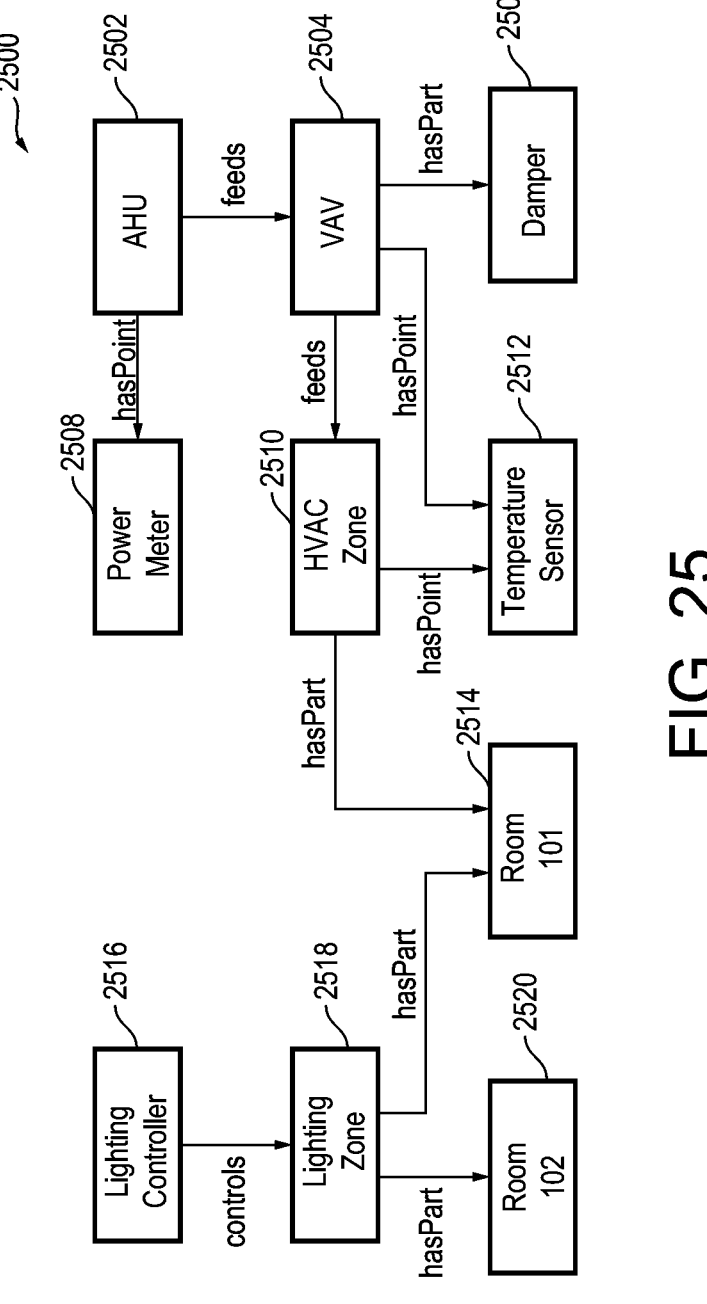
FIG. 25 is an example entity graph of entity data, according to an exemplary embodiment.

FIG. 25 is an example entity graph of entity data according to an embodiment of the present disclosure. The example of FIG. 25 assumes that an HVAC fault detection application has detected an abnormal temperature measurement with respect to Temperature Sensor 2512. However, Temperature Sensor 2512 itself may be operating properly, but may rely on various factors, conditions, and other systems and devices to measure the temperature properly. Accordingly, for example, the HVAC fault detection application may need to know the room 2514 in which the Temperature Sensor 2512 is located, the corresponding temperature setpoint, the status of the VAV 2504 that supplies conditioned air to the room 2514, the status of the AHU 2502 that feeds the VAV 2504, the status of the vents in the HVAC zone 2510, etc., in order to pin point the cause of the abnormal measurement. Thus, the HVAC fault detection application may require additional information from various related subsystems and devices (e.g., entity objects), as well as the zones and rooms (e.g., entity objects) that the subsystems and devices are configured to serve, to properly determine or infer the cause of the abnormal measurement.

Referring to FIG. 25, entity graph 2500 represents each of the entities (e.g., Temperature Sensor 2512 and related entities) as nodes on the entity graph 2500, and shows the relationship between the nodes (e.g., Temperature Sensor 2512 and related entities) via relational objects (e.g., feeds, hasPoint, hasPart, Controls, etc.). For example, entity graph 2500 shows that Temperature Sensor 2512 provides temperature readings (e.g., hasPoint) to the VAV 2504 and the HVAC Zone 2510. An AHU 2502 provides (e.g., feeds) the VAV 2504 with chilled and/or heated air. The AHU 2502 receives/provides power readings (e.g., hasPoint) from/to a Power Meter 2508. The VAV 2504 provides (e.g., feeds) air to HVAC Zone 2510 using (e.g., hasPart) a Damper 2506. The HVAC Zone 2510 provides the air to Room 2514. Further, Rooms 2514 and 2520 are located in (e.g., hasPart) Lighting Zone 2518, which is controlled (e.g., controls) by Lighting Controller 2516.

Accordingly, in the example of FIG. 25, in response to receiving the faulty measurement from Temperature Sensor 2512, the HVAC fault detection application and/or analytics service 2124 can determine from the entity graph that the fault could be caused by some malfunction in one or more of the other related entities, and not necessarily a malfunction of the Temperature Sensor 2512. Thus, the HVAC fault detection application and/or the analytics service 2124 can further investigate into the other related entities to determine or infer the most likely cause of the fault.

Directed Acyclic Graphs

Figures 26, 27:
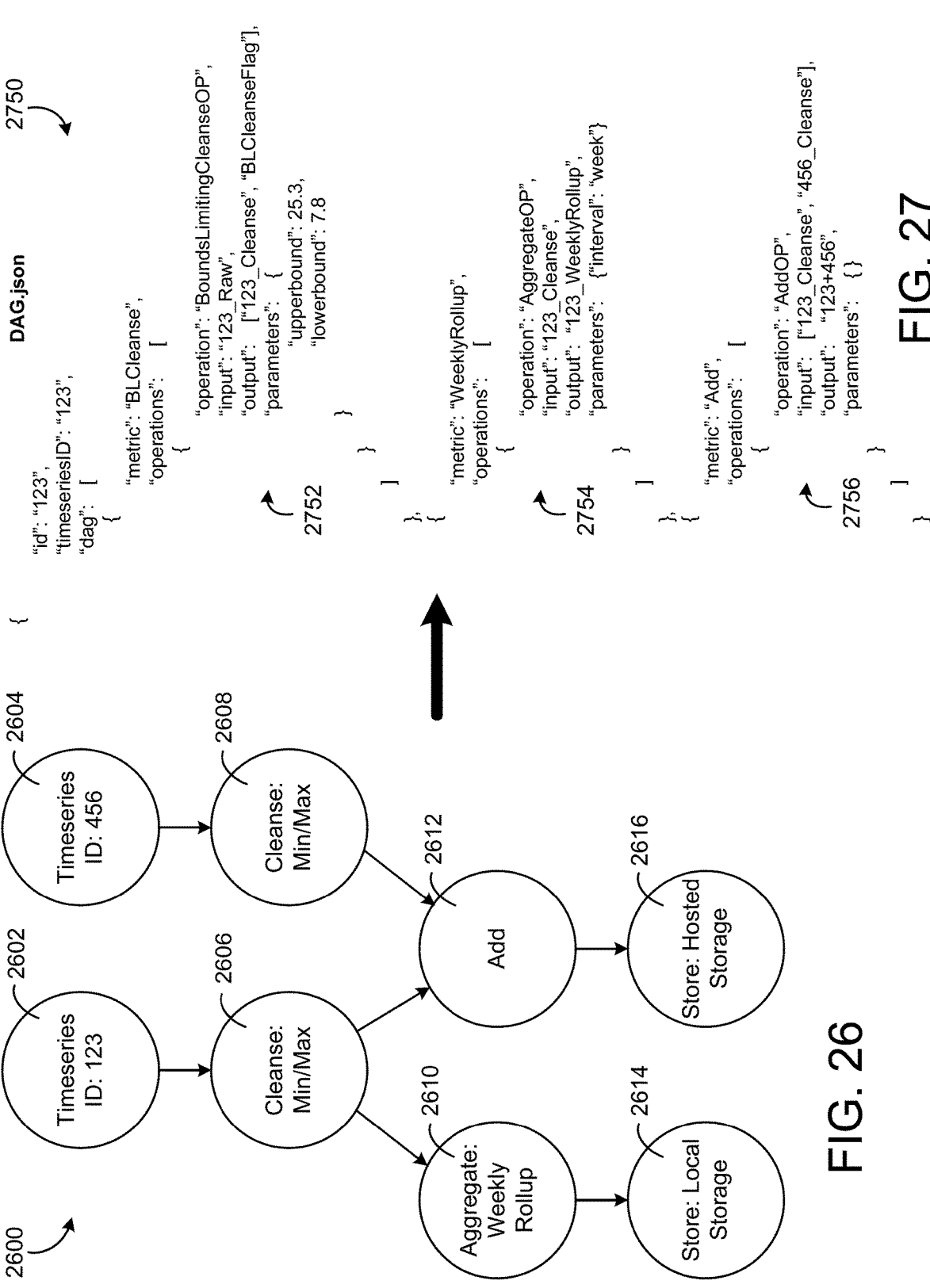
FIG. 26 is a directed acyclic graph (DAG) which can be generated by the DAG generator of FIG. 24, according to an exemplary embodiment.
FIG. 27 is a code snippet which can be automatically generated by the DAG generator of FIG. 24 based on the DAG, according to an exemplary embodiment.

Referring now to FIG. 26, an example of a DAG 2600 which can be created by DAG generator 2320 is shown, according to an exemplary embodiment. DAG 2600 is shown as a structured tree representing a graph of the dataflow rather than a formal scripting language. Blocks 2602 and 2604 represent the input timeseries which can be specified by timeseries ID (e.g., ID 123, ID 456, etc.). Blocks 2606 and 2608 are functional blocks representing data cleansing operations. Similarly, block 2610 is a functional block representing a weekly rollup aggregation and block 2612 is a functional block representing an addition operation. Blocks 2614 and 2616 represent storage operations indicating where the output of DAG 2600 should be stored (e.g., local storage, hosted storage, etc.).

In DAG 2600, the arrows connecting blocks 2602-2616 represent the flow of data and indicate the sequence in which the operations defined by the functional blocks should be performed. For example, the cleansing operation represented by block 2606 will be the first operation performed on the timeseries represented by block 2602. The output of the cleansing operation in block 2606 will then be provided as an input to both the aggregation operation represented by block 2610 and the addition operation represented by block 2612. Similarly, the cleansing operation represented by block 2608 will be the first operation performed on the timeseries represented by block 2604. The output of the cleansing operation in block 2608 will then be provided as an input to the addition operation represented by block 2612.

In some embodiments, DAG 2600 can reference other DAGs as inputs. Timeseries processing engine 2404 can stitch the DAGs together into larger groups. DAG 2600 can support both scalar operators (e.g., run this function on this sample at this timestamp) and aggregate window operators (e.g., apply this function over all the values in the timeseries from this time window). The time windows can be arbitrary and are not limited to fixed aggregation windows. Logical operators can be used to express rules and implement fault detection algorithms. In some embodiments, DAG 2600 supports user-defined functions and user-defined aggregates.

In some embodiments, DAG 2600 is created based on user input. A user can drag-and-drop various input blocks 2602-2604, functional blocks 2606-2612, and output blocks 2614-2616 into DAG 2600 and connect them with arrows to define a sequence of operations. The user can edit the operations to define various parameters of the operations. For example, the user can define parameters such as upper and lower bounds for the data cleansing operations in blocks 2606-2608 and an aggregation interval for the aggregation operation in block 2610. DAG 2600 can be created and edited in a graphical drag-and-drop flow editor without requiring the user to write or edit any formal code. In some embodiments, DAG generator 2320 is configured to automatically generate the formal code used by timeseries operators 2406 based on DAG 2600.

Referring now to FIG. 27, an example of code 2750 which can be generated by DAG generator 2320 is shown, according to an exemplary embodiment. Code 2750 is shown as a collection of JSON objects 2752-2756 that represent the various operations defined by DAG 2600. Each JSON object corresponds to one of the functional blocks in DAG 2600 and specifies the inputs/sources, the computation, and the outputs of each block. For example, object 2752 corresponds to the cleansing operation represented by block 2606 and defines the input timeseries (i.e., "123_Raw"), the particular cleansing operation to be performed (i.e., "BoundsLimitingCleanseOP"), the parameters of the cleansing operation (i.e., "upperbound" and "lowerbound") and the outputs of the cleansing operation (i.e., "123_Cleanse" and "BLCleanseFlag").

Similarly, object 2754 corresponds to the aggregation operation represented by block 2610 and defines the input timeseries (i.e., "123_Cleanse"), the aggregation operation to be performed (i.e., "AggregateOP"), the parameter of the aggregation operation (i.e., "interval": "week") and the output of the aggregation operation (i.e., "123_WeeklyRollup"). Object 2756 corresponds to the addition operation represented by block 2612 and defines the input timeseries (i.e., "123_Cleanse" and "456_Cleanse"), the addition operation to be performed (i.e., "AddOP"), and the output of the addition operation (i.e., "123+456"). Although not specifically shown in FIG. 27, code 2750 may include an object for each functional block in DAG 2600.

Advantageously, the declarative views defined by the DAGs provide a comprehensive view of the operations applied to various input timeseries. This provides flexibility to run the workflow defined by a DAG at query time (e.g., when a request for derived timeseries data is received) or prior to query time (e.g., when new raw data samples are received, in response to a defined event or trigger, etc.). This flexibility allows timeseries processing engine 2404 to perform some or all of their operations ahead of time and/or in response to a request for specific derived data timeseries.

Entity Graph

Figure 28:
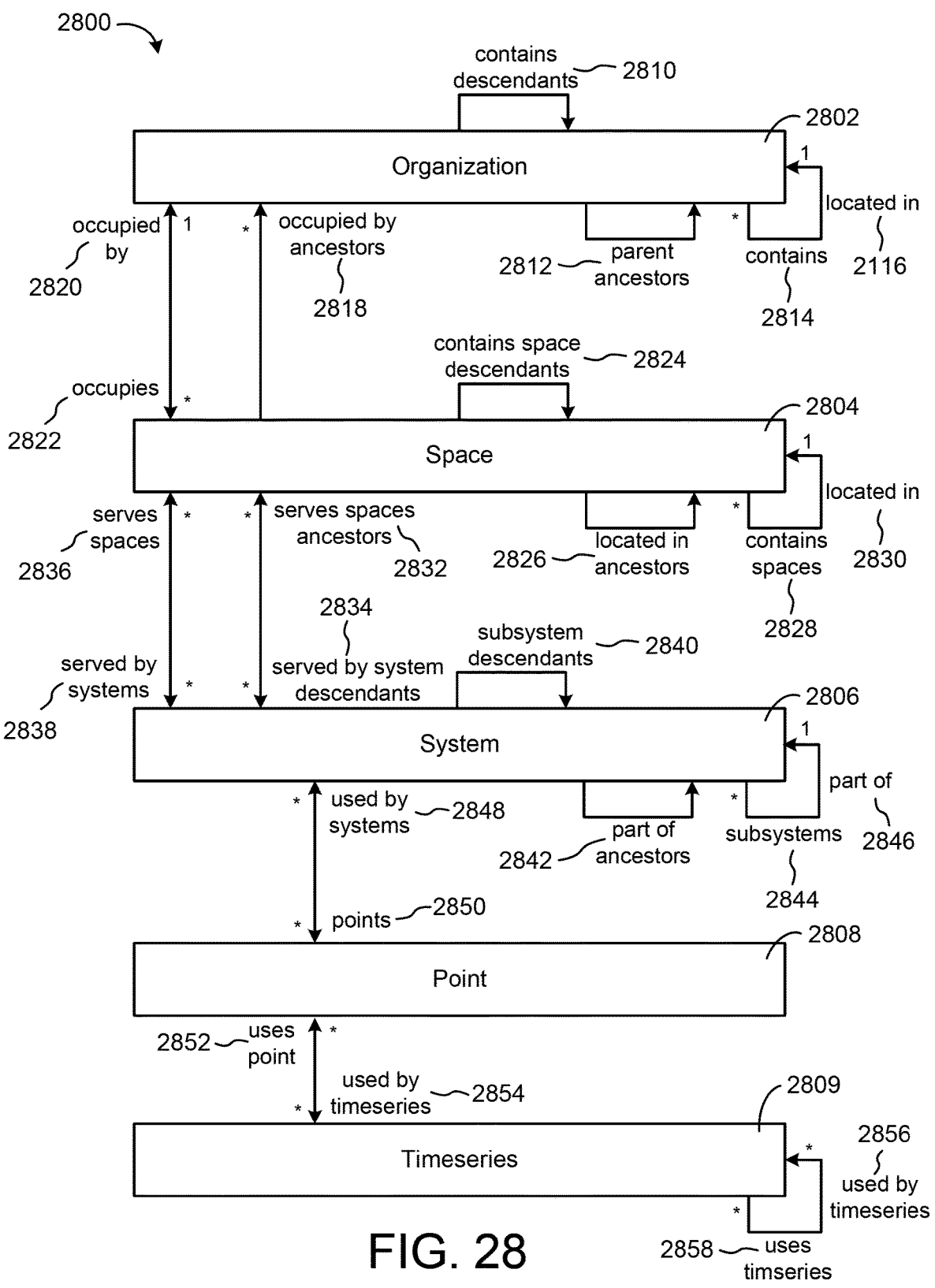
FIG. 28 is an entity graph illustrating relationships between an organization, a space, a system, a point, and a timeseries, which can be used by the data collector of FIG. 21, according to an exemplary embodiment.

Referring now to FIG. 28, an entity graph 2800 is shown, according to some embodiments. In some embodiments, entity graph 2800 is generated or used by data collector 2112, as described with reference to FIG. 21. Entity graph 2800 describes how collection of devices and spaces are organized and how the different devices and spaces relate to each other. For example, entity graph 2800 is shown to include an organization 2802, a space 2804, a system 2806, a point 2808, and a timeseries 2809. The arrows interconnecting organization 2802, space 2804, system 2806, point 2808, and timeseries 2809 identify the relationships between such entities. In some embodiments, the relationships are stored as attributes of the entity described by the attribute.

Organization 2802 is shown to include a contains descendants attribute 2810, a parent ancestors attribute 2812, a contains attribute 2814, a located in attribute 2962, an occupied by ancestors attribute 2818, and an occupies by attribute 2822. The contains descendants attribute 2810 identifies any descendant entities contained within organization 2802. The parent ancestors attribute 2812 identifies any parent entities to organization 2802. The contains attribute 2814 identifies any other organizations contained within organization 2802. The asterisk alongside the contains attribute 2814 indicates that organization 2802 can contain any number of other organizations. The located in attribute 2962 identifies another organization within which organization 2802 is located. The number 1 alongside the located in attribute 2962 indicates that organization 2802 can be located in exactly one other organization. The occupies attribute 2822 identifies any spaces occupied by organization 2802. The asterisk alongside the occupies attribute 2822 indicates that organization 2802 can occupy any number of spaces.

Space 2804 is shown to include an occupied by attribute 2820, an occupied by ancestors attribute 2818, a contains space descendants attribute 2824, a located in ancestors attribute 2826, a contains spaces attribute 2828, a located in attribute 2830, a served by systems attribute 2838, and a served by system descendants attribute 2834. The occupied by attribute 2820 identifies an organization occupied by space 2804. The number 1 alongside the occupied by attribute 2820 indicates that space 2804 can be occupied by exactly one organization. The occupied by ancestors attribute 2818 identifies one or more ancestors to organization 2802 that are occupied by space 2804. The asterisk alongside the occupied by ancestors attribute 2818 indicates that space 2804 can be occupied by any number of ancestors.

The contains space descendants attribute 2824 identifies any descendants to space 2804 that are contained within space 2804. The located in ancestors attribute 2826 identifies any ancestors to space 2804 within which space 2804 is located. The contains spaces attribute 2828 identifies any other spaces contained within space 2804. The asterisk alongside the contains spaces attribute 2828 indicates that space 2804 can contain any number of other spaces. The located in attribute 2830 identifies another space within which space 2804 is located. The number 1 alongside the located in attribute 2830 indicates that space 2804 can be located in exactly one other space. The served by systems attribute 2838 identifies any systems that serve space 2804. The asterisk alongside the served by systems attribute 2838 indicates that space 2804 can be served by any number of systems. The served by system descendants attribute 2834 identifies any descendent systems that serve space 2804. The asterisk alongside the served by descendant systems attribute 2834 indicates that space 2804 can be served by any number of descendant systems.

System 2806 is shown to include a serves spaces attribute 2836, a serves space ancestors attribute 2832, a subsystem descendants attribute 2840, a part of ancestors attribute 2842, a subsystems attribute 2844, a part of attribute 2846, and a points attribute 2850. The serves spaces attribute 2836 identifies any spaces that are served by system 2806. The asterisk alongside the serves spaces attribute 2836 indicates that system 2806 can serve any number of spaces. The serves space ancestors attribute 2832 identifies any ancestors to space 2804 that are served by system 2806. The asterisk alongside the serves ancestor spaces attribute 2832 indicates that system 2806 can serve any number of ancestor spaces.

The subsystem descendants attribute 2840 identifies any subsystem descendants of other systems contained within system 2806. The part of ancestors attribute 2842 identifies any ancestors to system 2806 that system 2806 is part of. The subsystems attribute 2844 identifies any subsystems contained within system 2806. The asterisk alongside the subsystems attribute 2844 indicates that system 2806 can contain any number of subsystems. The part of attribute 2846 identifies any other systems that system 2806 is part of. The number 1 alongside the part of attribute 2846 indicates that system 2806 can be part of exactly one other system. The points attribute 2850 identifies any data points that are associated with system 2806. The asterisk alongside the points attribute 2850 indicates that any number of data points can be associated with system 2806.

Point 2808 is shown to include a used by system attribute 2848. The asterisk alongside the used by system attribute 2848 indicates that point 2808 can be used by any number of systems. Point 2808 is also shown to include a used by timeseries attribute 2854. The asterisk alongside the used by timeseries attribute 2854 indicates that point 2808 can be used by any number of timeseries (e.g., raw data timeseries virtual point timeseries, data rollup timeseries, etc.). For example, multiple virtual point timeseries can be based on the same actual data point 2808. In some embodiments, the used by timeseries attribute 2854 is treated as a list of timeseries that subscribe to changes in value of data point 2808. When the value of point 2808 changes, the timeseries listed in the used by timeseries attribute 2854 can be identified and automatically updated to reflect the changed value of point 2808.

Timeseries 2809 is shown to include a uses point attribute 2852. The asterisk alongside the uses point attribute 2852 indicates that timeseries 2809 can use any number of actual data points. For example, a virtual point timeseries can be based on multiple actual data points. In some embodiments, the uses point attribute 2852 is treated as a list of points to monitor for changes in value. When any of the points identified by the uses point attribute 2852 are updated, timeseries 2809 can be automatically updated to reflect the changed value of the points used by timeseries 2809.

Timeseries 2809 is also shown to include a used by timeseries attribute 2856 and a uses timeseries attribute 2858. The asterisks alongside the used by timeseries attribute 2856 and the uses timeseries attribute 2858 indicate that timeseries 2809 can be used by any number of other timeseries and can use any number of other timeseries. For example, both a data rollup timeseries and a virtual point timeseries can be based on the same raw data timeseries. As another example, a single virtual point timeseries can be based on multiple other timeseries (e.g., multiple raw data timeseries). In some embodiments, the used by timeseries attribute 2856 is treated as a list of timeseries that subscribe to updates in timeseries 2809. When timeseries 2809 is updated, the timeseries listed in the used by timeseries attribute 2856 can be identified and automatically updated to reflect the change to timeseries 2809. Similarly, the uses timeseries attribute 2858 can be treated as a list of timeseries to monitor for updates. When any of the timeseries identified by the uses timeseries attribute 2858 are updated, timeseries 2809 can be automatically updated to reflect the updates to the other timeseries upon which timeseries 2809 is based.

Figure 29:
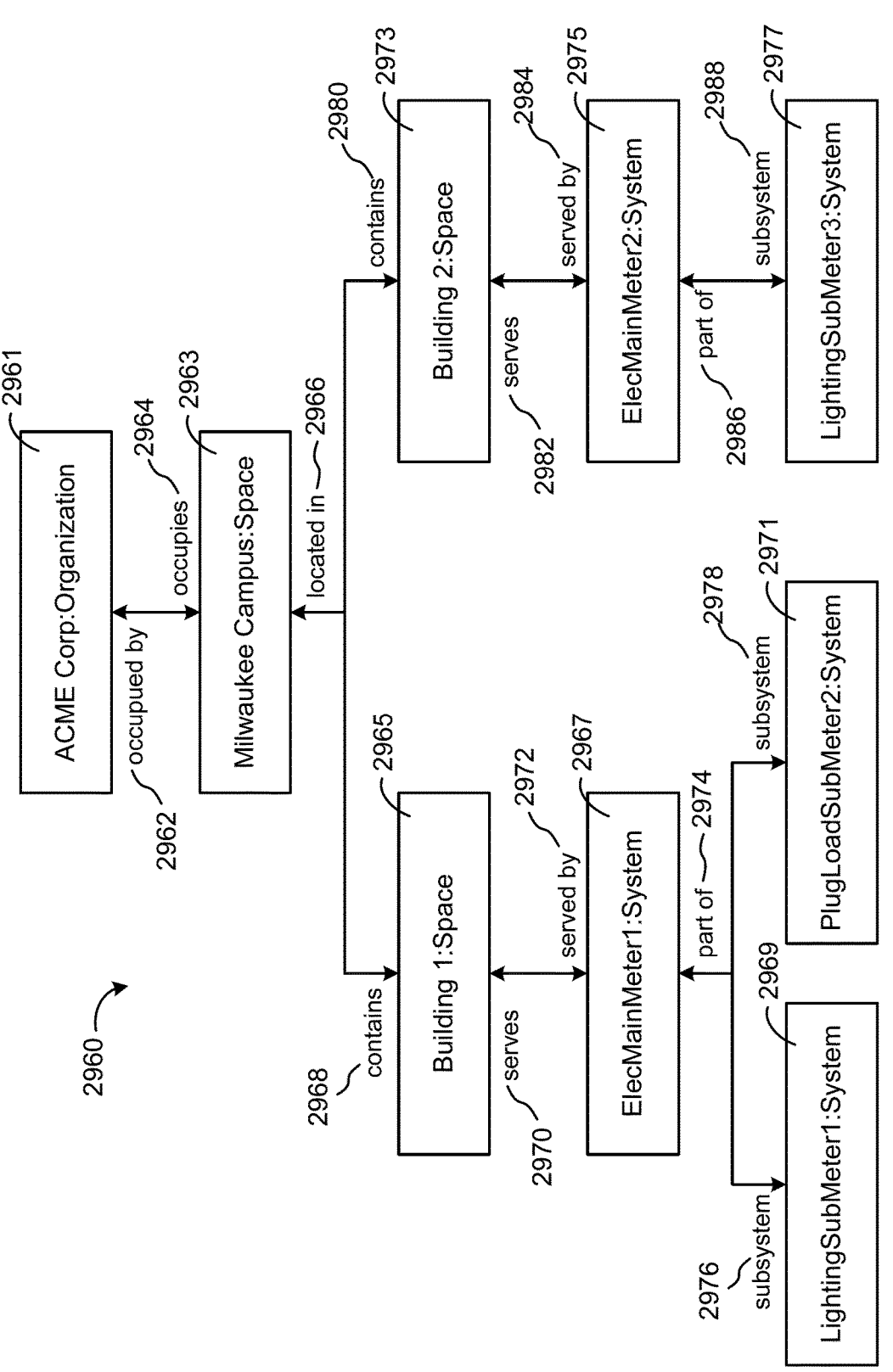
FIG. 29 is an example of an entity graph for a particular system of devices, according to an exemplary embodiment.

Referring now to FIG. 29, an example of an entity graph 2960 for a particular system of devices is shown, according to some embodiments. Entity graph 2960 is shown to include an organization 2961 ("ACME Corp"). Organization 2961 be a collection of people, a legal entity, a business, an agency, or other type of organization. Organization 2961 occupies space 2963 ("Milwaukee Campus"), as indicated by the occupies attribute 2964. Space 2963 is occupied by organization 2961, as indicated by the occupied by attribute 2962.

In some embodiments, space 2963 is a top level space in a hierarchy of spaces. For example, space 2963 can represent an entire campus (i.e., a collection of buildings). Space 2963 can contain various subspaces (e.g., individual buildings) such as space 2965 ("Building 1") and space 2973 ("Building 2"), as indicated by the contains attributes 2968 and 2980. Spaces 2965 and 2980 are located in space 2963, as indicated by the located in attribute 2966. Each of spaces 2965 and 2973 can contain lower level subspaces such as individual floors, zones, or rooms within each building. However, such subspaces are omitted from entity graph 2960 for simplicity.

Space 2965 is served by system 2967 ("ElecMainMeter1") as indicated by the served by attribute 2972. System 2967 can be any system that serves space 2965 (e.g., a HVAC system, a lighting system, an electrical system, a security system, etc.). The serves attribute 2970 indicates that system 2967 serves space 2965. In entity graph 2960, system 2967 is shown as an electrical system having a subsystem 2969 ("LightingSubMeter1") and a subsystem 2971 ("PlugLoadSubMeter2") as indicated by the subsystem attributes 2976 and 2978. Subsystems 2969 and 2971 are part of system 2967, as indicated by the part of attribute 2974.

Space 2973 is served by system 2975 ("ElecMainMeter2") as indicated by the served by attribute 2984. System

2975 can be any system that serves space 2973 (e.g., a HVAC system, a lighting system, an electrical system, a security system, etc.). The serves attribute 2982 indicates that system 2975 serves space 2973. In entity graph 2960, system 2975 is shown as an electrical system having a subsystem 2977 ("LightingSubMeter3") as indicated by the subsystem attribute 2988. Subsystem 2977 is part of system 2975, as indicated by the part of attribute 2986.

In addition to the attributes shown in FIG. 29, entity graph 2960 can include "ancestors" and "descendants" attributes on each entity in the hierarchy. The ancestors attribute can identify (e.g., in a flat list) all of the entities that are ancestors to a given entity. For example, the ancestors attribute for space 2965 may identify both space 2963 and organization 2961 as ancestors. Similarly, the descendants attribute can identify all (e.g., in a flat list) of the entities that are descendants of a given entity. For example, the descendants attribute for space 2965 may identify system 2967, subsystem 2969, and subsystem 2971 as descendants. This provides each entity with a complete listing of its ancestors and descendants, regardless of how many levels are included in the hierarchical tree. This is a form of transitive closure.

In some embodiments, the transitive closure provided by the descendants and ancestors attributes allows entity graph 2960 to facilitate simple queries without having to search multiple levels of the hierarchical tree. For example, the following query can be used to find all meters under the Milwaukee Campus space 2963:

```
/Systems?$filter=(systemType eq
Jci.Be.Data.SystemType'Meter') and
ancestorSpaces/any(a:a/name eq 'Milwaukee Campus')
``` and can be answered using only the descendants attribute of the Milwaukee Campus space 2963. For example, the descendants attribute of space 2963 can identify all meters that are hierarchically below space 2963. The descendants attribute can be organized as a flat list and stored as an attribute of space 2963. This allows the query to be served by searching only the descendants attribute of space 2963 without requiring other levels or entities of the hierarchy to be searched.

Figure 30:
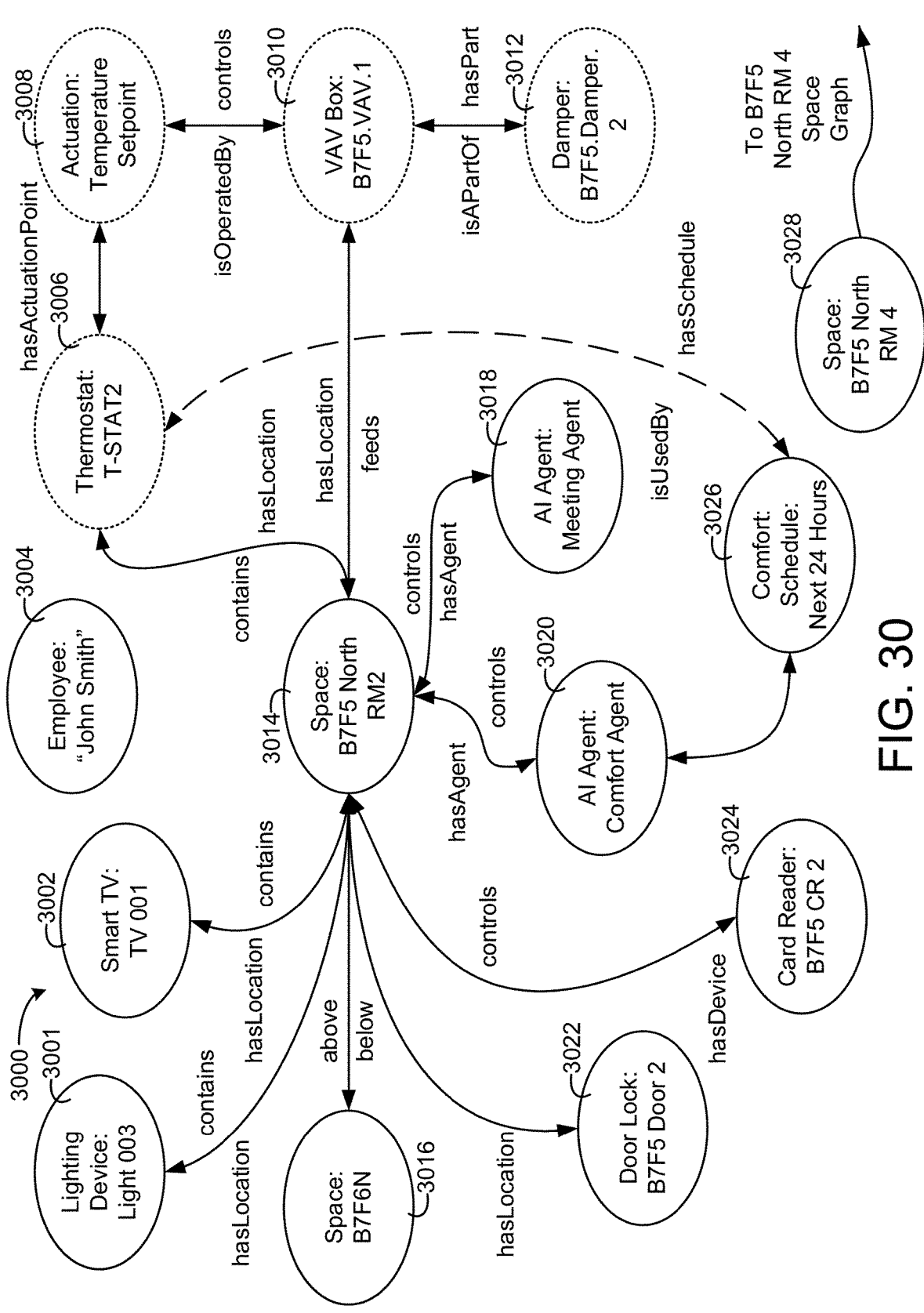
FIG. 30 is a block diagram of a space graph, according to an exemplary embodiment.

Referring now to FIG. 30, the space graph database 3000 is shown in greater detail, according to an exemplary embodiment. Space graphs are described in greater detail in U.S. patent application Ser. No. 16/260,078 filed Jan. 28, 2019, the entirety of which is incorporated by reference herein. The space graph database 3000 includes entities 3001-3028 (stored as nodes within the space graph database 3000) describing spaces, devices, people (e.g., business employees), and agents implementing artificial intelligence. Furthermore, relationships are shown between the entities 3001-3028 directionally describing relationships between two of the entities 3001-3028 (stored as edges within the space graph database 3000). With the space graph database 3000, various control application systems and/or agents can receive a description of what types of actions to take from a certain device, what the current status of a room is (e.g., occupied or unoccupied), etc. The space graph database 3000 is flexible in managing new entities and relationships that are very expensive with a conventional database such as a relational database management system (RDBMS).

As an example, the space graph database 3000, as shown in FIG. 30, illustrates an office space called "B7F5 North RM2" of a building. In some embodiments, the space graph learning service 1104 extracts the nodes of the space graph database 3000 from various data sources including a building automation system, a security system, a fire alarm, human resources system, and/or building information model (BIM) files through an entity name matching process. Furthermore, semantic relationships can be extracted from the building information by the building cloud platform 502. Even though the nodes and edges of the space graph database 3000 are generated based on the determination of existing entities and relationships between entities, many relationships may be missing but can be discovered from collected building data that is ingested into the space graph database 3000, e.g., sensing and actuation data. As an example, an employee entity 3004, John Smith, can be found from a cardholder database but a relationship between John Smith and his office cannot initially be determined. Similarly, the building cloud platform 502 is configured to identify a door lock and card reader (the entity card reader 3024) but without operational data, the building cloud platform 502 cannot determine whether a card reader "B7F5Cr2" is controlling a door lock "B7F5 Door 2".

For example, entity 3001, a lighting element referred to as "Light 0003" has a directional relationship to the space 3014 referred to as "B7F5 North RM2." The relationship may be an edge "hasLocation" indicating that the entity 3001 has a location, the entity 3014. Furthermore, a second edge "contains" from the entity 3014 to the entity 3001 indicates that the space 3014 includes the entity 3001 and 3002 within it.

As another example, space 3016 and space 3014 have relationships between them. A directional relationship from the space 3016 to the space 3014 indicates that the space 3016 is above the space 3014, i.e., that space 3016 is on a floor within a building above the space 3014. Furthermore, a second relationship from the space 3014 to the space 3016 indicates the location of the space 3014 relative to the space 3016, the relationship is a below relationship indicating that the space 3014 is below the space 3016.

In some embodiments, only a single relationship exists between entities. For example, door lock 3022 has a location within the space 3014 as represented by the "hasLocation" edge. As shown, there is no relationship between the space 3014 to the door lock 3022. Since door lock 3022 has a location within the space 3014, the space graph learning service 1104 could be configured to automatically add a corresponding relationship from the space 3014 to the door lock 3022, e.g., a "contains" edge indicating that the door lock 3022 is contained within the space 3014. Furthermore, additional relationships could be added between the door lock 3022 and the space 3014 in addition to the "hasLocation" and "contains" edges. For example, if the space graph learning service 1104 is configured to add a "controls" or "allowsAccessTo" edge from the door lock 3022 to the space 3014 indicating that the door lock 3022 is a security measure controlling access to the space 3014.

The entities 3006-3012 are shown in dashed lines indicating that the entities 3006-3012 are related to environmental conditioning. In this regard, each of the node of the space graph database 3000 may represent what subsystem, e.g., HVAC, security, fire, etc. that they belong to. In some embodiments, each of the entities 3006-3012 include relationships to a subsystem node. For example, a HVAC subsystem node may exist which includes a set of relationships "has" to entities 3006-3012 indicating that the HVAC subsystem has the entities 3006-3012. The entities 3006-3012 may each include a "isAPartOf" relationship from the entities 3006-3012 to the HVAC subsystem node to indicate that the entities 3006-1312 form an HVAC subsystem.

Comfort agent 3020 and meeting agent 3018 are configured to provide control of the space 3014, in some embodiments. The comfort agent 3020 is configured to control environmental conditions (e.g., temperature, lighting, humidity, etc.) for the space 3014, in some embodiments. The meeting agent 3018 can be configured to perform scheduling of meetings and/or communication with meeting organizers and/or meeting attendees. The comfort agent 3020 and the meeting agent 3018 each include an edge to the space 3014 indicating "controls," a semantic relationship indicating that the agents 3020 and 3018 are assigned to perform operations for the space 3014. The relationships "has Agent" can be the edges between the space 3014 to the agents 3018 and 3020 representing that the space 3014 has agents that it is assigned.

The comfort agent 3020 is configured to generate a schedule 3026. The schedule 3026 can be a temperature schedule for the space 3014. In some embodiments, the building cloud platform 502 is configured to learn a new relationship from existing relationships for the space graph database 3000. For example, the agent 3020 can cause the space graph database 3000 to include a new node for the schedule 3026 in response to being run for a first time. The building cloud platform 502 can identify that the agent 3020 controls the space 3014 and also that the thermostat 3006 has a relationship to other equipment, VAV box 3010, that feeds the space 3014. Based on these relationships, the building cloud platform 502 can add edges "hasSchedule" and "isUsedBy" between the thermostat 3006 and the schedule 3026 to indicate that the thermostat 3006 should run the schedule 3026 and that the schedule 3026 is used by the thermostat 3006.

Furthermore, the space graph database 3000 includes data points within it and their relationship to other pieces of equipment. For example, temperature setpoint 3008 may be an actuation point of thermostat 3006 as represented by the edge "hasActuationPoint" from the thermostat 3006 to the temperature setpoint 3008. The temperature setpoint 3008 controls VAV box 3010, i.e., changes in the value of the temperature setpoint 3008 adjusts the operation of the VAV box 3010. Furthermore, an edge between the VAV box 3010 and the temperature setpoint 3008 indicates that the VAV box 3010 is operated based on the temperature setpoint 3008 "isOperatedBy."

In some embodiments, the entities 3001-3028 have components. For example, VAV box 3010 may include the damper 3012. In this regard, an edge between the VAV box 3010 and the damper 3012 may indicate that the damper is a part of the VAV box 3010 "isAPartOf." Furthermore, an edge between the VAV box 3010 and the damper 3012 may indicate that the VAV box 3010 has the damper 3012 as a part, i.e., "hasPart."

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed:

1. A building system of a building comprising:
one or more memory devices configured to store one or more instructions that, when executed on one or more processors, cause the one or more processors to:
identify, based on a relational model, one or more first relationships between a first building entity and a second building entity and one or more second relationships between a third building entity and the first building entity, wherein the one or more first relationships indicate an expected effect on the first building entity caused by operation of the second building entity when the building is not experiencing a performance issue, and the one or more second relationships indicate an expected effect on the first building entity caused by operation of the third building entity when the building is not experiencing a performance issue;

select a first exercise for the second building entity to test the one or more first relationships between the first building entity and the second building entity;
exercise the second building entity by operating building equipment represented by the second building entity in accordance with an adjusted setting defined by the first exercise to generate first building entity data associated with the second building entity, the first building entity data indicating a result of the first exercise;
identify that the building is experiencing the performance issue by analyzing the first building entity data and the one or more first relationships, wherein the performance issue is identified in response to determining, based on the first building entity data, that operating the building equipment represented by the second building entity in accordance with the first exercise did not produce the expected effect on the first building entity;
determine, based on the first building entity data, that the building equipment represented by the second building entity did not cause the performance issue;
exercise, in response to determining that the building equipment represented by the second building entity did not cause the performance issue, the third building entity by operating building equipment represented by the third building entity in accordance with an adjusted setting defined by a second exercise to generate second building entity data associated with the third building entity, the second building entity data indicating a result of the second exercise;
determine, based on the second building entity data, that the building equipment represented by the third building entity caused the performance issue; and
automatically cause an action to be initiated in response to determining that the building equipment represented by the third building entity caused the performance issue, the action comprising attempting to repair the building equipment represented by the third building entity, shutting-down the building equipment represented by the third building entity, or working around the performance issue by directing control activities around the building equipment represented by the third building entity.

2. The building system of claim 1, wherein the one or more instructions cause the one or more processors to identify the performance issue by analyzing at least third building entity data of the first building entity, wherein performance of the building entity is related to performance of the first building entity.

3. The building system of claim 1, wherein the relational model is a building graph;
wherein the one or more instructions cause the one or more processors to: receive at least a portion of the building graph, the building graph comprising a plurality of nodes representing a plurality of building entities and a plurality of edges between the plurality of nodes representing relationships between the plurality of building entities; and
identify, based on the portion of the building graph, the first building entity by identifying a particular edge of the plurality of edges between a first node of the plurality of nodes representing the second building entity and one or more second nodes of the plurality of nodes representing the first building entity.

4. The building system of claim 1, wherein the second building entity is a space of the building;

wherein the building equipment represented by the second building entity is associated with the space of the building.

5. The building system of claim 1, wherein the one or more memory devices are devices of at least one of:

a cloud platform located remote from the second building entity and configured to collect the first building entity data via one or more networks;

an on-premises server located within the building, wherein the second building entity is located within the building, wherein the on-premises server is configured to receive the first building entity data via one or more building networks of the building;

a gateway device located within the building, the gateway device configured to collect the first building entity data via the one or more building networks and push at least one of the first building entity data an indication of the performance issue to a building control platform; or a piece of building equipment, wherein the second building entity and the first building entity are components of the piece of building equipment.

6. The building system of claim 1, wherein the performance issue is at least one of an equipment fault, a configuration error, or a user error.

7. The building system of claim 1, wherein the one or more instructions cause the one or more processors to:

perform a plurality of building entity exercises, wherein each exercise of the plurality of building entity exercises causes particular building entity data to be generated; and in response to completing each of the plurality of building entity exercises:

determine whether the performance issue is identified by the particular building entity data of the exercise and one or more results of one or more previous exercises of the plurality of building entity exercises; and perform a subsequent exercise in response to a determination that the performance issue is not identified by the particular building entity data and the one or more results of the one or more previous exercises.

8. The building system of claim 7, wherein each of the plurality of building entity exercises corresponds to one control level of a plurality of control levels of a control algorithm.

9. The building system of claim 1, wherein the second building entity is a first building subsystem of a plurality of building subsystems comprising a plurality of pieces of equipment;

wherein the one or more instructions cause the one or more processors to:

collect subsystem data of the plurality of building subsystems;

identify each of the plurality of building subsystems based on the subsystem data;

identify the first building subsystem of the plurality of building subsystems experiencing the performance issue by analyzing the subsystem data; and identify one piece of equipment of the plurality of pieces of equipment of the building based on equipment data of the plurality of pieces of equipment in response to an identification of the first building subsystem experiencing the performance issue.

10. The building system of claim 9, wherein the one or more instructions cause the one or more processors to:

identify the first building subsystem experiencing the performance issue by comparing the subsystem data to other subsystem data of buildings similar to the building; and identify the one piece of equipment of the plurality of pieces of equipment based on the equipment data by comparing the equipment data to other equipment data of equipment similar to the one piece of equipment of the buildings similar to the building.

11. The building system of claim 1, further comprising a building device comprising a processing circuit configured to:

collect building device data of the building device, the building device data indicating operations of the building device and environmental conditions measured by a sensor of the building device;

perform a self-analysis with the building device data to determine a device performance flag indicating performance of the building device; and send, via a network, the building device data with the device performance flag to at least one of an artificial intelligence (AI) platform or the one or more processors.

12. The building system of claim 11, wherein the processing circuit of the building device comprises a memory device configured to store manufacturer data indicating design characteristics of the building device;

wherein the processing circuit of the building device is configured to send, via the network, the manufacturer data to at least one of the AI platform or the one or more processors.

13. The building system of claim 11, wherein the processing circuit of the building device is configured to:

determine whether the one or more memory devices store a filter and one or more filter parameters for the filter;

filter the environmental conditions with the filter and the one or more filter parameters in response to a determination that the one or more memory devices store the filter;

generate a filter flag based on whether the one or more memory devices store the filter and the one or more filter parameters for the filter; and send, via the network, the building device data with the device performance flag and the filter flag to at least one of the AI platform or the one or more processors.

14. The building system of claim 11, wherein the processing circuit of the building device is configured to:

perform a calibration of the building device and record a calibration time indication identifying when the building device was calibrated;

generate a calibration flag based on the calibration time indication; and send, via the network, the device performance flag and the calibration flag to at least one of the AI platform or the one or more processors.

15. A method of a building system comprising:

identifying, by one or more processing circuits, based on a relational model, one or more first relationships between a first building entity of a building and a second building entity and one or more second relationships between a third building entity and the first building entity, wherein the one or more first relationships indicate an expected effect on the first building entity caused by operation of the second building entity when the building is not experiencing a performance issue, and the one or more second relationships indicate an expected effect on the first building entity caused by operation of the third building entity when the building is not experiencing a performance issue;

selecting, by the one or more processing circuits, a first exercise for the second building entity to test the one or more first relationships between the first building entity and the second building entity;

exercising, by the one or more processing circuits, the second building entity by operating building equipment represented by the second building entity in accordance with an adjusted setting defined by the first exercise to generate first building entity data associated with the second building entity, the first building entity data indicating a result of the first exercise;

identifying, by the one or more processing circuits, that the building is experiencing the performance issue by analyzing the first building entity data and the one or more first relationships, wherein the performance issue is identified in response to determining, based on the first building entity data, that operating the building equipment represented by the second building entity in accordance with the first exercise did not produce the expected effect on the first building entity;

determining, by the one or more processing circuits based on the first building entity data, that the building equipment represented by the second building entity did not cause the performance issue;

in response to determining that the building equipment represented by the second building entity did not cause the performance issue, exercising, by the one or more processing circuits, the third building entity by operating building equipment represented by the third building entity in accordance with an adjusted setting defined by a second exercise to generate second building entity data represented by the third building entity, the second building entity data indicating a result of the second exercise;

determining, by the one or more processing circuits based on the second building entity data, that the building equipment represented by the third building entity caused the performance issue; and automatically causing an action to be initiated in response to determining that the building equipment represented by the third building entity caused the performance issue, the action comprising attempting to repair the building equipment represented by the third building entity, shutting-down the building equipment represented by the third building entity, or working around the performance issue by directing control activities around the building equipment represented by the third building entity.

16. The method of claim 15, further comprising identifying, by the one or more processing circuits, the performance issue by analyzing at least second building entity data of the first building entity, wherein performance of the second building entity is related to performance of the first building entity.

17. The method of claim 15, wherein the relational model is a building graph;

wherein the method further comprises:

receiving, by the one or more processing circuits, at least a portion of the building graph, the building graph comprising a plurality of nodes representing a plurality of building entities and a plurality of edges between the plurality of nodes representing relationships between the plurality of building entities; and identifying, by the one or more processing circuits, based on the portion of the building graph, the first building entity by identifying one or more particular edges of the plurality of edges between a first node of the plurality of nodes representing the second building entity and a one or more second nodes of the plurality of nodes representing the first building entity.

18. The method of claim 15, wherein the second building entity is a space of the building;

wherein the building equipment represented by the second building entity is associated with the space of the building.

19. A building management system of a building comprising:

one or more memory devices configured to store instructions; and one or more processors configured to execute the instructions causing the one or more processors to:

identify, based on a relational model, one or more first relationships between a first building entity and a second building entity and one or more second relationships between a third building entity and the first building entity, wherein the one or more first relationships indicate an expected effect on the first building entity caused by operation of the second building entity when the building is not experiencing a performance issue, and the one or more second relationships indicate an expected effect on the first building entity caused by operation of the third building entity when the building is not experiencing a performance issue;

select a first exercise for the second building entity to test the one or more first relationships between the first building entity and the second building entity;

exercise the second building entity by operating building equipment represented by the second building entity in accordance with an adjusted setting defined by the first exercise to generate first building entity data associated with the second building entity, the first building entity data indicating a result of the first exercise;

identify that the building is experiencing the performance issue by analyzing the first building entity data and the one or more first relationships, wherein the performance issue is identified in response to determining, based on the first building entity data, that operating the building equipment represented by the second building entity in accordance with the first exercise did not produce the expected effect on the first building entity;

determine, based on the first building entity data, that the building equipment represented by the second building entity did not cause the performance issue;

exercise, in response to determining that the building equipment represented by the second building entity did not cause the performance issue, the third building entity by operating building equipment represented by the third building entity in accordance with an adjusted setting defined by a second exercise to generate second building entity data represented by the third building entity, the second building entity data indicating a result of the second exercise;

determine, based on the second building entity data, that the building equipment represented by the third building entity caused the performance issue; and automatically cause an action to be initiated in response to determining that the building equipment represented by the third building entity caused the performance issue, the action comprising attempting to repair the building equipment represented by the third building entity, shutting-down the building equipment represented by the third building entity, or working around the performance issue by directing control activities around the building equipment represented by the third building entity.

20. The building management system of claim 19, wherein the one or more processors are configured to execute the instructions causing the one or more processors to:

identify a data analysis problem associated with the first building entity data;

select an anomaly detection model from a plurality of anomaly detection models based on the data analysis problem, wherein each of the plurality of anomaly detection models is associated with one data analysis problem of a plurality of data analysis problems;

determine an anomaly score for the first building entity data based on the anomaly detection model and the first building entity data; and ingest the first building entity data with an artificial intelligence (AI) service in response to a determination that the anomaly score is less than a predefined level.

\* \* \* \* \*